United States Patent
Cope

[11] 3,761,692
[45] Sept. 25, 1973

[54] AUTOMATED CRYSTAL PULLING SYSTEM

[75] Inventor: Edward G. Cope, Dallas, Tex.

[73] Assignee: Texas Instruments Incorporated, Dallas, Tex.

[22] Filed: Oct. 1, 1971

[21] Appl. No.: 185,790

[52] U.S. Cl. .......... 235/151.1, 23/273 SP, 148/172, 444/1
[51] Int. Cl. ............................ G06g 7/58, H011 7/40
[58] Field of Search............ 235/150, 151.1, 151.12; 444/1; 23/273, 273 SP, 295, 301 SP; 29/580, 582, 584, 585; 148/1.5, 171, 172

[56] References Cited
UNITED STATES PATENTS

| | | | |
|---|---|---|---|
| 3,621,213 | 11/1971 | Jen et al. | 235/150 |
| 3,493,770 | 2/1970 | Dessauer et al. | 23/273 SP |
| 3,552,931 | 1/1971 | Doherty et al. | 23/273 SP |
| 3,617,392 | 11/1971 | Locke | 23/273 SP |

Primary Examiner—Joseph F. Ruggiero
Attorney—Harold Levine et al.

[57] ABSTRACT

An automated crystal pulling system utilizes a digital computer to control a Czochralski crystal puller. Crystal pull rate, crystal spin rate, crucible lift rate and crucible spin rate are monitored with tachometers, and the monitored signals are applied to controllers to control the respective motors and provide independent closed control loops, with each controller having a set point signal input from the computer. A sensor detects the output level of the radio frequency generator (induction heater) and applies a signal to a generator controller having a set point input from the computer, providing closed loop temperature control. A temperature control algorithm receives an input from a melt temperature sensor and calculates the set point to the generator controller. A diameter control algorithm receives an input from a crystal diameter sensor and calculates the set point to the crystal pull motor controller. A melt level control algorithm claculates the set point to the crucible lift motor controller to provide a constant melt level. An adaptive control algorithm adjusts melt temperature, via the temperature control algorithm, as required to maintain average pull rate within imposed limits. Crystal specifications are input to the computer via a card reader. Operators are required only to load the charge, read in the specification card, grow the crystal stem, initialize various procedures, and remove the crystal ingot and clean and reload the puller.

2 Claims, 49 Drawing Figures

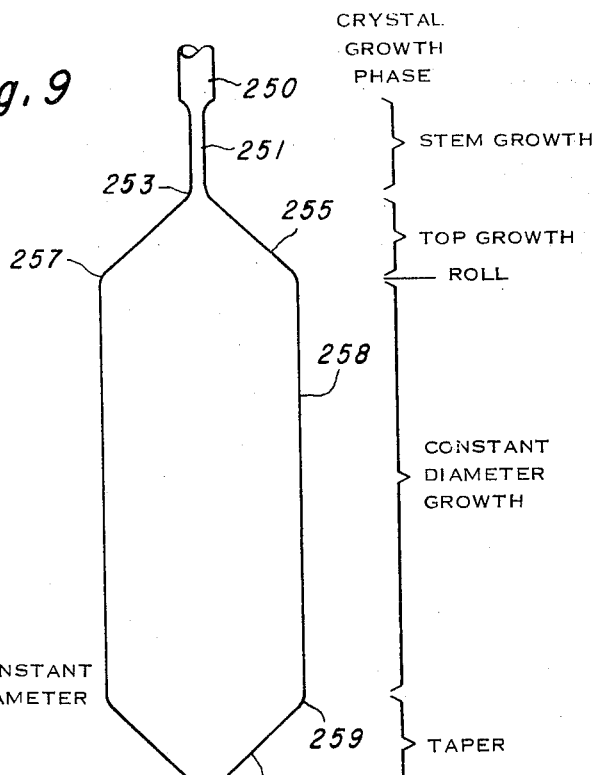
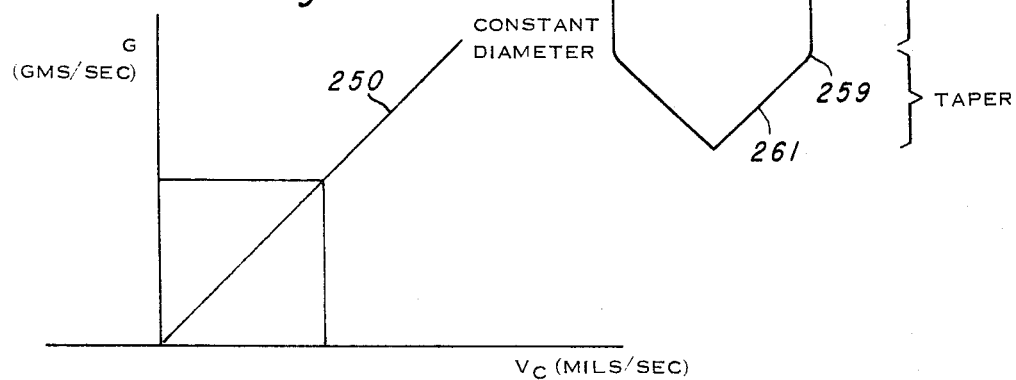
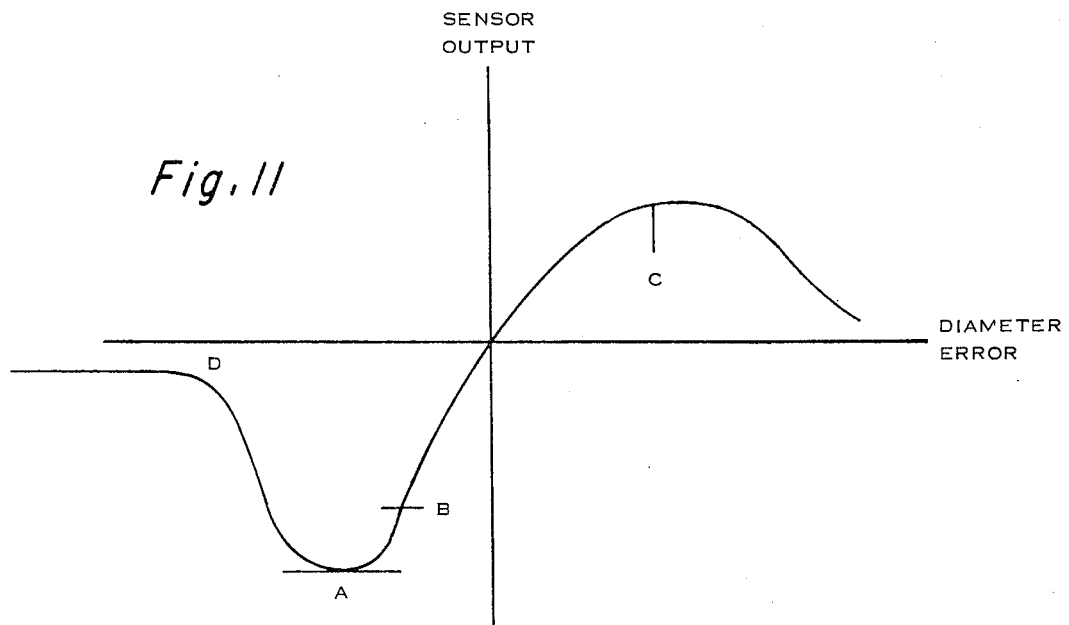

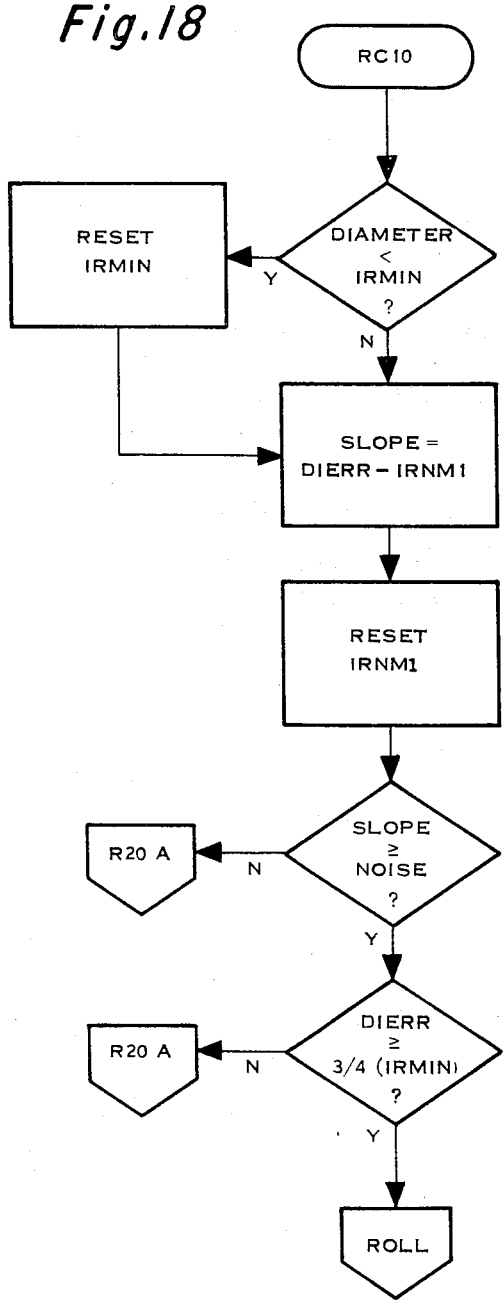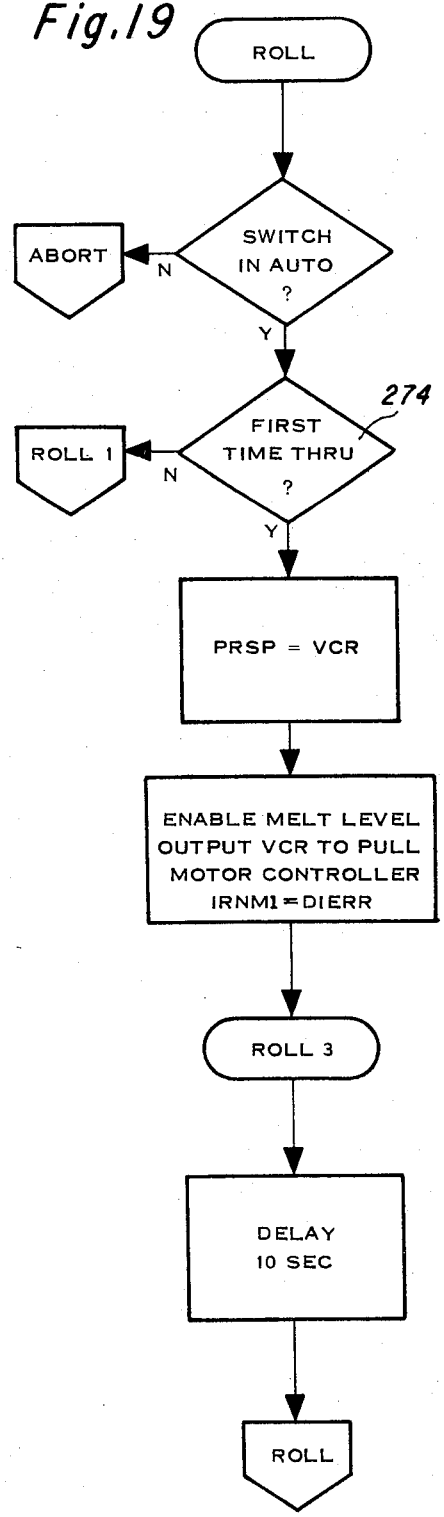

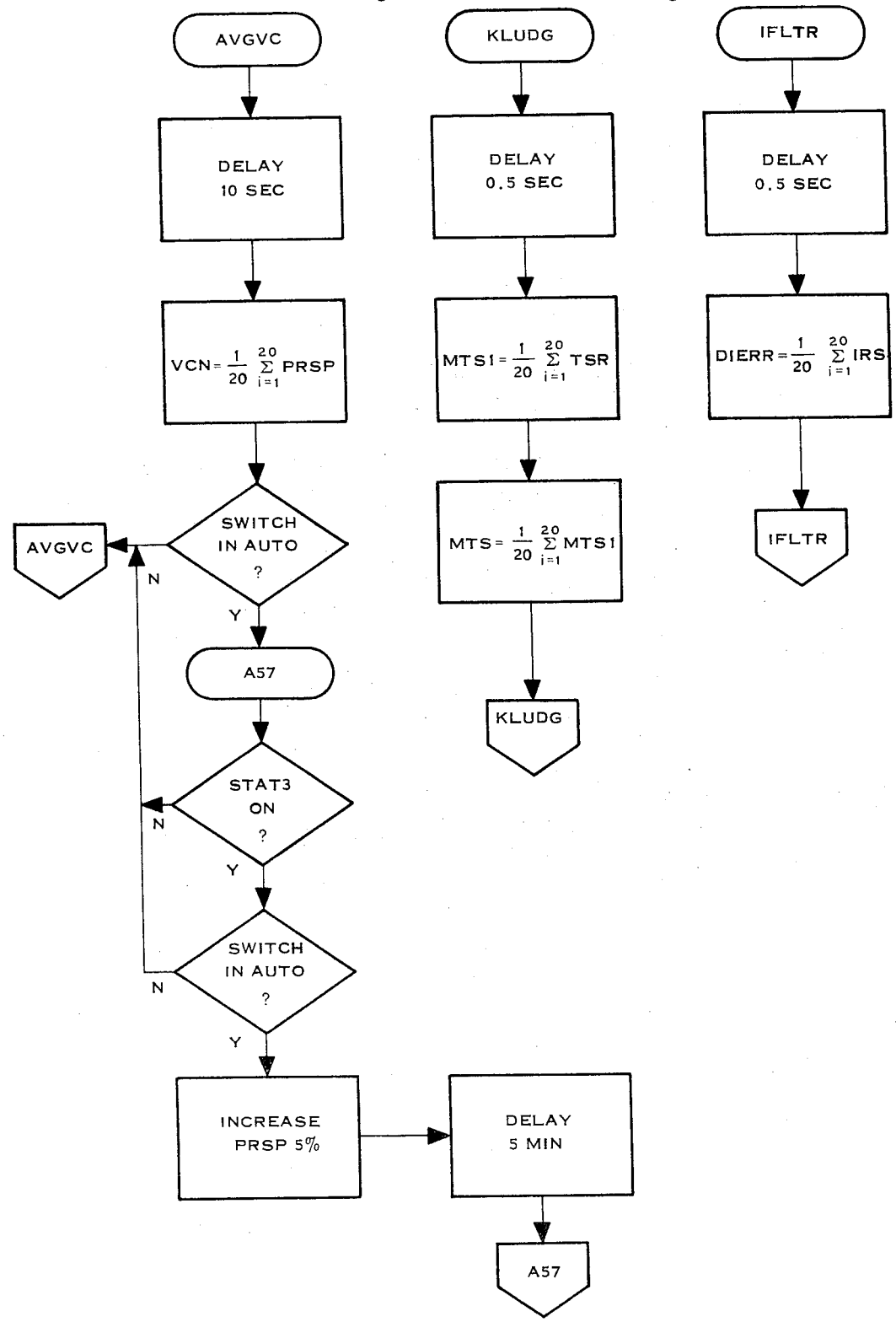

NORMAL SEQUENCE OF ALGORITHMS DURING GROWTH OF CRYSTAL

AUTOMATED CRYSTAL PULLING SYSTEM

This invention relates to systems and methods for pulling single crystal ingots of semiconductor quality, and more particularly to a crystal pulling system including a crystal puller of the Czochralski type directly controlled by a digital computer.

An initial and critical step in the manufacture of semiconductor devices is the growth of high quality single crystal ingots, which are ground, polished and cut into round "slices" of a desired diameter and thickness. These slices serve as substrates for the fabrication of the semiconductor devices. The electrical characteristics of the finished device are significantly affected by the perfection or quality of the substrate crystal. It is thus essential to control such features as dislocation density and resistivity of the crystal ingot as it is grown.

One approach well known to the art of growing crystals is the Czochralski method. According to this method a small single crystal, called a seed, is secured to a pulling mechanism and is dipped into a quartz-lined crucible containing semiconductor material, such as silicon or germanium, maintained slightly above the temperature of solidification by electrical resistance or radio frequency induction heating, and is rotated and withdrawn from the melt within the crucible. The crucible is commonly rotated countercurrent to the direction of rotation of the seed crystal. As the seed is slowly withdrawn, the melt adheres thereto and crystallizes as it cools, forming a substantially round single crystal ingot having the crystal orientation of the seed crystal. The crystal pulling process takes place within a closed atmosphere having an inert gas, typically helium, circulated therethrough. A conventional Czochralski crystal puller includes a set of manual controls to enable adjustment and control of the crystal pulling parameters and a viewing window to enable the operator to view the crystal as it is being pulled.

The diameter of the round crystal ingot, or crystal rod, is a first order function of the rate of crystallization and the rate at which the rod is withdrawn from the melt, or pull rate. If both rate of crystallization and pull rate are maintained exactly constant, then the crystal rod will be of uniform diameter (assuming constant melt level). However, crystal rods which have been grown with a conventional manually operated Czochralski crystal puller are not of uniform diameter. As a result, grinding and other tooling of the crystal is required. Grinding and tooling is expensive in terms of equipment and labor required, but is also very expensive as a result of waste of material ground away, as a quality single crystal rod may sell for several dollars per gram. Tooling may also have adverse effects on the structure of the crystal itself. There is thus an apparent need for a crystal pulling system for pulling semiconductor quality single crystal rods of substantially uniform diameter.

The crystal pulling process is very highly dependent on the skills of the individual operator, requiring specific knowledge of the effects of varying the different crystal pulling parameters. The specific knowledge required and the skill required to timely make often minute adjustments of controls requires a long period of on the job training. The length of the training period and waste of material caused by errors of novice trainees renders the training of puller operators very expensive. The quality of the product of crystal pulling is a direct result of the physical, mental and emotional stability of the human operator on a day to day basis. Thus, there is an apparent need for an improved crystal pulling system capable of pulling quality crystals without the continual close scrutiny of a highly skilled operator, and a further need for such a system capable of pulling crystals having quality superior to that attainable by direct human control.

The strive for an improved crystal pulling system is not without attendant difficulties. The process of crystal pulling is at present more of an art than a science, since many observed effects of varying crystal pulling parameters have not been successfully reduced to mathematical formulae or equations. There is no generally accepted equation for rate of crystallization of melt in a Czochralski crystal puller, although, of course, the crystallization rate is a first and higher order function of temperature as well as other parameters. However, temperature itself is a function of such factors as generator power output, induction coupling efficiency, crucible spin rate, rate of helium flow and quantity of melt. The process is further complicated by the fact that coupling efficiency and quantity of melt decrease as the pulling process progresses. The generator and motors of the puller are subject to electrical offset errors, power supply fluctuations, and the like, further rendering precise process control unattainable. An additional very important consideration is the desire to utilize conventional Czochralski crystal pullers in order to conserve the significant capital investment of established producers of semiconductor quality single crystals, as each crystal puller costs many thousands of dollars.

Accordingly, the system of the present invention is comprised of a conventional Czochralski crystal puller and a digital computer. Peripheral devices are provided for communication to and from the computer. An interface unit enables an operator to select a manual mode of operation or computer mode of operation and to selectively initiate various procedures during the computer, or automatic, mode of operation. The operator is only required to perform maintenance functions (load and unlaod the charge, clean the crucible, etc.), load a crystal specification card in a card reader, and grow an initial stem portion of the crystal. Thereafter the operator must only observe that the computer is maintaining proper control and stop and/or restart the process if crystal perfection is lost.

The crystal pulling parameters subject to control by the computer include the generator power output, crystal pull rate, crystal spin rate, crucible lift rate and crucible spin rate. Each of these parameters is continuously controlled by a closed loop comprised of a detector, a controller and the resepctive motor or generator, with each controller coupled to receive a set point signal from the computer. Crystal spin rate and crucible spin rate are maintained constant at a set point value input on the specification card. A temperature control algorithm, a diameter control algorithm and a melt level control algorithm receive inputs from sensing devices and calculate set point signals for the respective controllers. An adaptive control algorithm enables melt temperature to be adjusted in order to maintain average pull rate within imposed limits.

Objects and advantages of the invention will become apparent from the following detailed description in conjunction with the drawings, in which:

FIG. 9 is a section view of a single crystal rod;

FIG. 10 is a plot of constant diameter as a function of crystallization rate and pull rate;

FIG 11 is a plot of the error transfer characteristic of a preferred crystal diameter sensor;

FIGS. 12–46 are flow charts of the software by which the digital computer controls the crystal pulling process.

Figure 1:
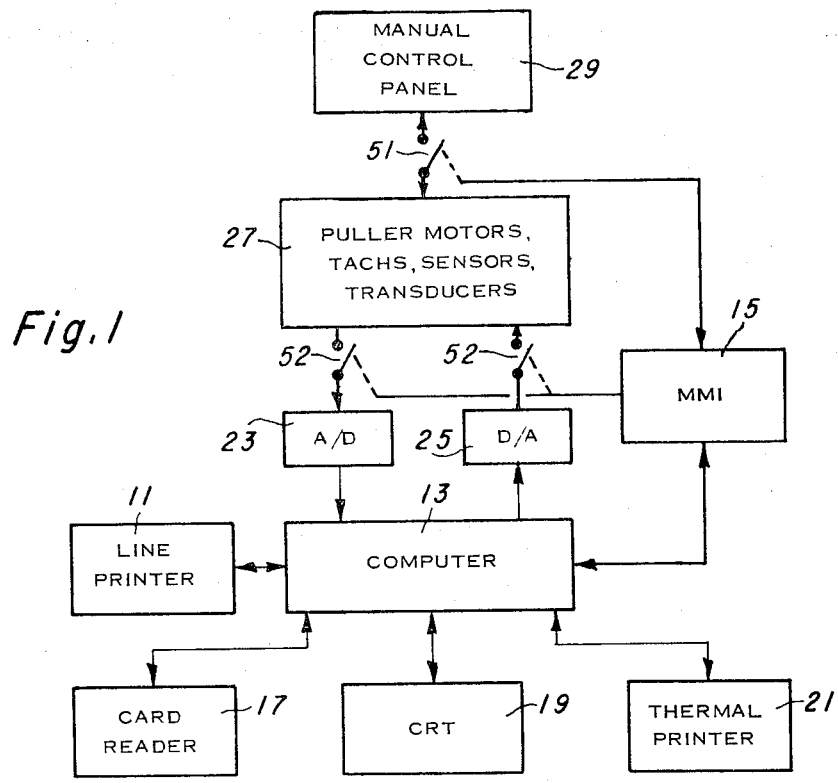
FIG. 1 is a general block diagram of the crystal pulling system of this invention.

Referring now to the drawings, FIG. 1 is a general block diagram of an automated crystal pulling system of this invention. Block 27 comprises the crystal puller and associated motors along with tachometers, sensors and transducers used to control the operation thereof. The digital computer 13 communicates with the crystal puller 27 via digital to analog (D/A) converter 25 and analog to digital (A/D) converter 23 in an automatic, or direct digital control, mode of operation. A manual control panel 29 enables direct manual control of the crystal puller when the direct digital control mode is not being utilized. The switches 51 and 52 are mutually exclusive, such that during the manual control mode switch S1 is closed and switches 52 are open, and during the automatic control mode switches 52 are closed and switch 51 is open. The position of the switches is controlled via man-machine interface unit 15. Interface unit 15 also enables manual interface, via status switches and indicator lights, with the crystal puller 27 and the computer 13 during the automatic control mode. The system further includes peripheral devices comprising line printer 11, card reader 17, thermal printer 21 and cathode ray tube display device 19, all of which communicate directly with the computer 13.

Figure 2:
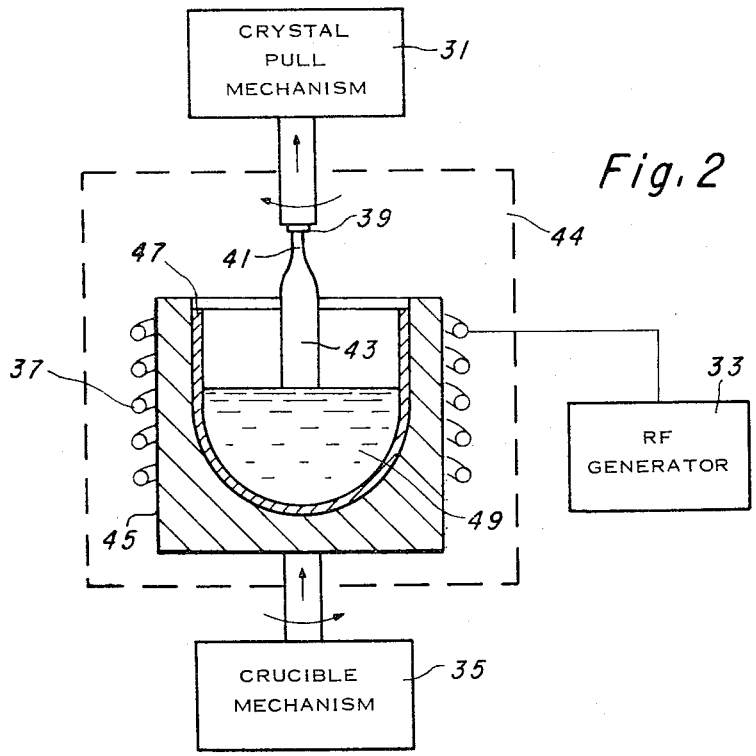
FIG. 2 is a combined section view and block diagram of a Czochralski crystal puller.

As previously stated herein, a crystal puller of the Czochralski type is employed in the present invention. A general diagram partially in section and partially in block form of such a crystal puller is illustrated in FIG. 2. Graphite susceptor 45 surrounds a quartz crucible 47 which contains molten material, such as silicon, 49. Radio frequency induction coils 37 circumvent the graphite susceptor to inductively couple energy thereinto in order to heat the silicon 49. Radio frequency (RF) induction coils 37 are electrically coupled to an RF generator 33. Although the disclosed embodiment employs RF induction heating, the invention is equally applicable to crystal pullers which employ electrical resistance heating.

During operation, a crystal rod 43 is pulled from the melt by pull mechanism 31. The pulling operation is initialized by dipping a crystal seed, which is held in the seed holder 39, into the melt and then initially pulling a stem 41 before the top of the crystal rod is rolled out into the full sized diameter rod 43. The pull mechanism 31 pulls the crystal rod from the melt and rotates the rod as it is being pulled. Simultaneously, the crucible mechanism 35 enables rotation of the crucible and raising of the crucible to maintain constant melt level. The crystal pulling process takes place within a closed atmosphere 44 having inlet and outlet means (not illustrated) for circulating helium or other inert gas therethrough.

Figure 3:
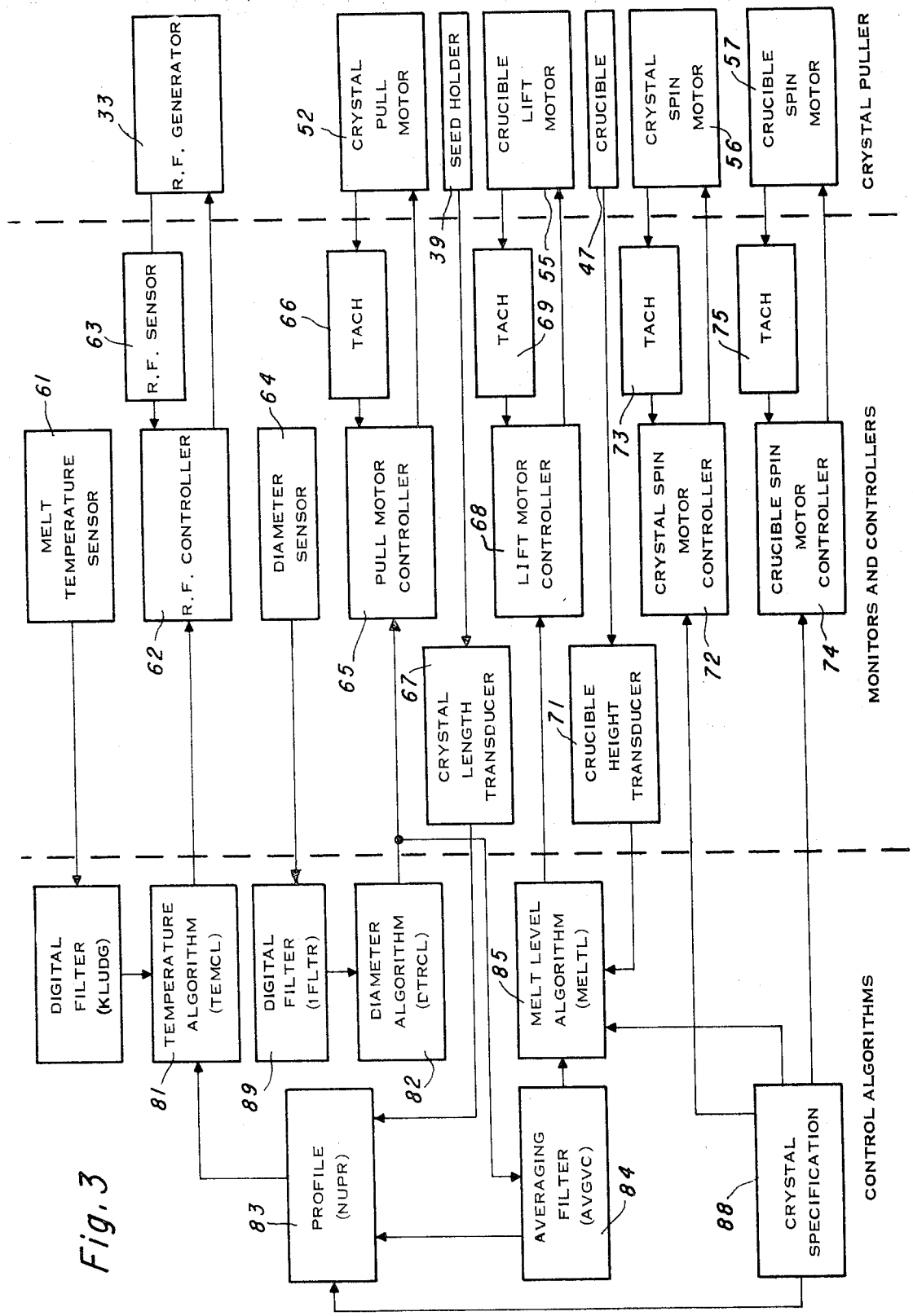
FIG. 3 is a control diagram of the crystal pulling control system of this invention.

FIG. 3 is a general block diagram of the control system for controlling the crystal pulling process, which will now be briefly described in order to lay a proper foundation for additional hardware description. The control system basically comprises control algorithms, monitors and controllers and a conventional induction heated Czochralski crystal puller. The motors of the crystal puller which enable control of the various crystal pulling parameters include the RF generator 33, crystal pull motor 52, crucible lift motor 55, crystal spin motor 56 and crucible spin motor 57. The basic control algorithms comprise a temperature control algorithm 81, a diameter control algorithm 82, and a melt level control algorithm 85. Crystal specification block 88 indicates crystal pulling specifications which are input by a card at the beginning of the run.

Crystal spin rate and crucible spin rate are typically maintained constant throughout the process. An initial crystal spin rate set point is input from the crystal specification 88 to control crystal spin motor controller 72. The spin rate of the crystal spin motor 56 is continuously monitored by tachometer 73 which is connected in closed feedback relationship to crystal spin motor controller 72. Therefore the feedback loop comprising motor controller 72, motor 56 and tachometer 73 maintains a constant crystal spin rate at the initial set point input from crystal specification 88. The crucible spin rate is similarly controlled. An initial crucible spin rate set point is input from specification card 88 to the crucible spin motor controller 74. The motor controller 74 controls crucible spin motor 57, the spin rate of which is continuously monitored by tachometer 75 which is coupled to crucible spin motor controller 74. Thus the closed control loop comprising motor 57, tachometer 75 and controller 74 maintains crucible spin rate constant at the set point value input on the specification card.

The parameters which are adjustably controlled during the pulling process include the temperature of the molten silicon (melt temperature), the level of the molten silicon (melt level), and the diameter of the crystal rod. Each of these parameters is controlled by an independent closed loop.

The temperature control algorithm 81 receives a filtered input signal from the melt temperature sensor 61 which senses the temperature of the molten silicon. The output of the temperature control algorithm is coupled to supply a set point to RF controller 62, which controls RF generator 33. The output level of the RF generator 33 is detected by RF sensor 63, the output of which is coupled to RF controller 62. Thus, in operation, RF controller 62, RF generator 33 and RF sensor 63 comprise a feedback control loop which maintains a generator output level, and a related melt temperature, specified by temperature control algorithm 81.

Diameter sensor 64 applies a signal through digital filter 89 to the diameter control algorithm 82, which is coupled to supply a set point signal to pull motor controller 65. The pull motor controller 65 controls the crystal pull motor 52. Tachometer 66 continuously monitors the pull rate and applies a signal to the pull motor controller 65. Thus the closed loop comprising pull motor controller 65, crystal pull motor 52 and tachometer 66 requires the controller 65 to maintain a crystal pull rate specified by diameter control algorithm 82.

Melt level control algorithm 85 specifies the crucible lift rate required in order to maintain a constant melt level. Lift motor controller 68 controls the lift rate of crucible lift motor 55, the rate of which is continuously monitored by tachometer 69 which applies a signal to the controller 68. Thus the lift motor controller 68, crucible lift motor 55 and tachometer 69 provide a feedback control loop which maintains a crucible lift rate which is specified by melt level control algorithm 85.

Inputs to melt level control algorithm 85 include the desired crystal diameter from the crystal specification 88, the height of the crucible from crucible height transducer 71 and the average pull rate which is input from averaging filter 84. The crucible height transducer 71 is connected to the crucible 47 within the puller, thus applying a signal representative of the position of the crucible to the melt level control algorithm. The output of diameter control algorithm 82 is input to the averaging filter 84 in order to provide the average pull rate for the crystal rod as it is pulled.

Inputs to the profile, or adaptive control, algorithm 83 include the average pull rate from the averaging filter 84, crystal length from the crystal length transducer 67 and the desired average pull rate from crystal specification 88. The crystal length transducer 67 is connected to the seed holder 39 in the crystal puller to indicate the length of the crystal that is being pulled. The output of the profile algorithm 83 is coupled to the temperature control algorithm 81. The principal function of profile algorithm 83 is to adjust melt temperature as required to maintain average pull rate within limits which are imposed for control of crystal quality.

Figure 4:
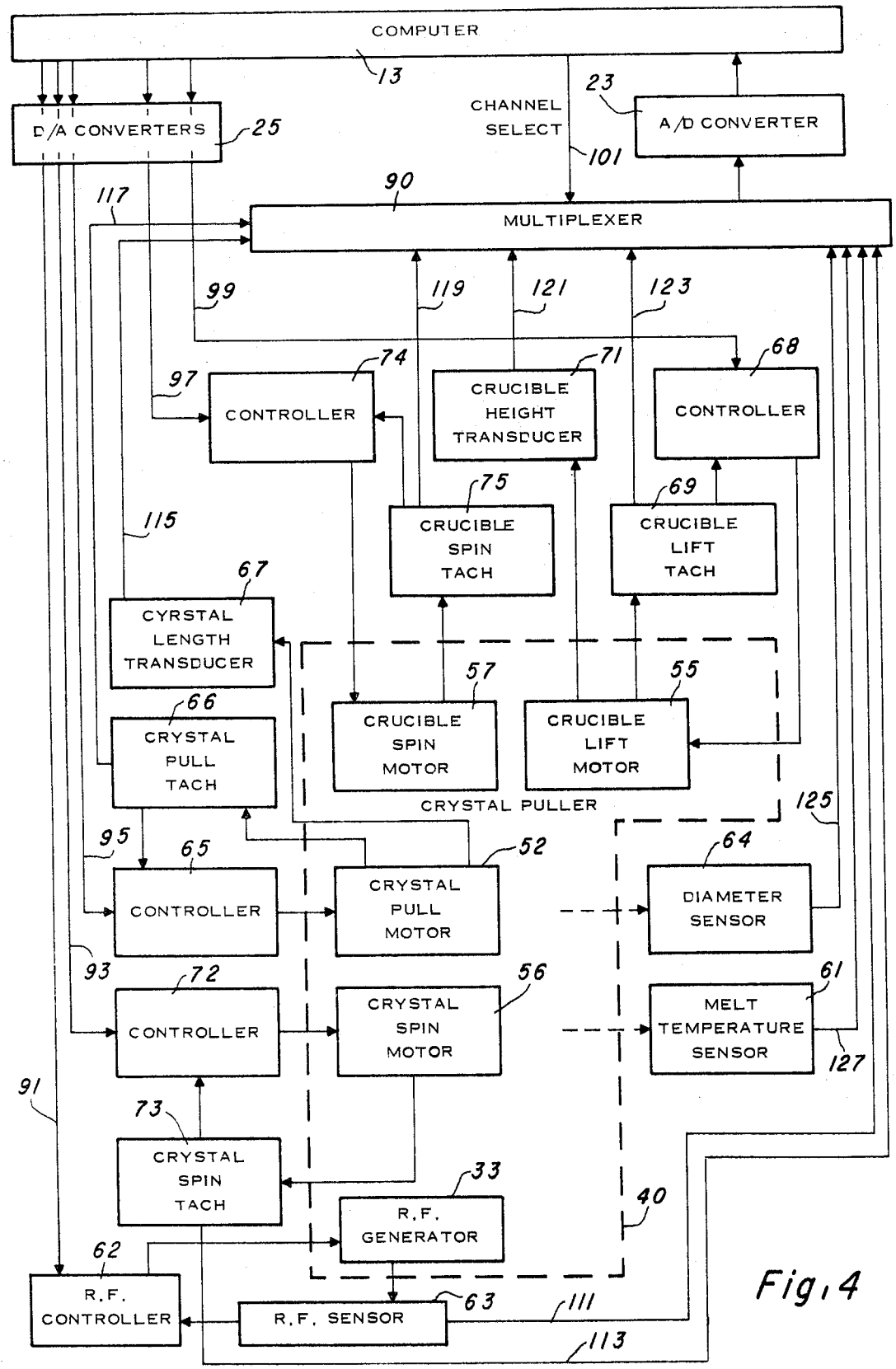
FIG. 4 is a block diagram of the hardware which implements the control system of FIG. 3.

The hardware which implements the control system of FIG. 3 will now be discussed with reference to the block diagram of FIG. 4. The crystal puller (designated generally as 40) comprises a crucible spin motor 57, crucible lift motor 55, crystal pull motor 52, crystal spin motor 56 and RF generator 33.

RF sensor 63 continuously monitors the output of the RF generator 33 and applies a control signal to the RF controller 62, which in turn controls the RF generator 33, thus maintaining the RF generator output at the set point level specified by the computer at input line 91 to RF controller 62. The output of RF sensor 33 is also coupled to the computer 13 via line 111 through multiplexer 90 and A/D converter 23.

Crystal spin tachometer 73 continuously monitors the spin rate of the crystal rod and applies a signal to controller 72 which controls the crystal spin motor 56 to maintain the spin rate at the set point rate specified to controller 72 by the computer on line 93. The tachometer output is also coupled to the computer via line 113 through the multiplexer and A/D converter.

The crystal length transducer 67 monitors the length of the crystal rod that is being pulled and applies a signal to the computer via line 115 and the multiplexer and A/D converter.

Crystal pull tachometer 66 monitors the rate at which the crystal is being pulled and applies a control signal to controller 65 which controls the pull rate of pull motor 52, thus to maintain the pull rate at the set point value input to controller 65 from the computer on line 95. The output of tachometer 66 is also coupled to the computer via line 117.

Crucible spin tachometer 75 continuously monitors the crucible spin rate and applies a signal to controller 74 which controls the spin rate of the spin motor 57, thus to maintain the spin rate specified by the computer on lin 97. The output of tachometer 75 is also coupled to the computer via the multiplexer and A/D converter and line 119.

Crucible height transducer 71 monitors the height of the crucible and applies a signal to the computer via line 121 and multiplexer 90 and A/D converter 23.

The crucible lift tachometer 69 continuously monitors the crucible lift rate and applies a signal to the controller 68 which controls the lift rate of the lift motor 55, in order to maintain the lift rate specified to the controller 68 from the computer via line 99. The output of the crucible lift tachometer 69 is also coupled to the computer via line 123.

The diameter sensor 64 continuously monitors the diameter of the crystal rod as it is being pulled and applies a signal via line 125 through the multiplexer and A/D converter to the computer.

The melt temperature sensor 61 monitors the temperature of the molten silicon within the crucible and applies a signal representative of the melt temperature to the computer via line 127 and the A/D converter and multiplexer.

The multiplexer 90 comprises nine channels which are coupled to the various tachometers, sensors and transducers. Channel select signals are applied from the computer to the multiplexer on line 101 in order to select a specific signal at any given time. Selected signals are converted to digital form by A/D converter 23 and received by computer 13. Output signals from the computer 13 are passed through individual D/A converter units 25. The analog output of the D/A converters 25 are input to the various controllers.

The following table (TABLE I) is a list of commercially available equipment employed in a preferred embodiment of this invention, listed by reference number (refer to FIG. 1 and FIG. 4), descriptive name, manufacturer and part number.

TABLE I

| Reference Number | Description | Manufacturer & Model Number |
| --- | --- | --- |
| 11 | Line Printer | Model 2310<br>Data Products Corp.<br>Woodland Hills, Calif. |
| 13 | Digital Computer | TI-960<br>Texas Instruments Inc.<br>Digital Systems Division<br>Houston, Texas |
| 17 | Card Reader | Model SR-300<br>Data Products Corp.<br>Woodland Hills, Calif. |
| 19 | CRT Display | Model 2000.<br>Hazeltine Corp.<br>Little Neck, N.J. |
| 21 | Thermal Printer | Model 720<br>Texas Instruments Inc.<br>Digital Systems Division<br>Houston, Texas |
| 23 | A/D Converter | ADC12Q<br>Analog Devices, Inc.<br>Cambridge, Mass. |

| | | |
|---|---|---|
| 25 | D/A Converter | DACH10<br>Analog Devices, Inc.<br>Cambridge, Mass. |
| FIG. 2 | Czochralski Crystal Puller | Model SYSTEM 7<br>Texas Instruments Inc.<br>Dallas, Texas |
| 66, 69, 73, 75 | Tachometer | Type SA-757A-2<br>Servo-Tek Products, Inc.<br>Hawthorne, N.J. |
| 67, 71 | Linear Transducer | Model TCC-PT-101-15TDA;<br>Model TCC-PT-101-50TDA<br>Transducer Controls Corp.<br>Covina, Calif. |
| 90 | Multiplexer | Model 160570<br>Phoenix Data, Inc.<br>Phoenix, Arizona |

Figure 5:
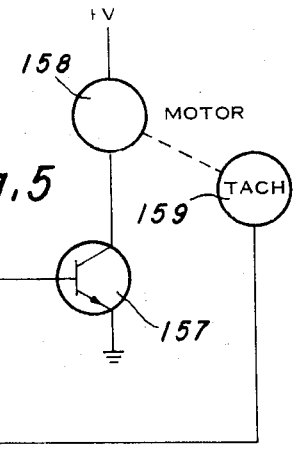
FIG. 5 is a schematic diagram of a motor controller.

Each of the controllers 65, 68, 72 and 74 are of the conventional type schematically illustrated in FIG. 5. In the closed loop controller the speed of a motor 158 is continuously monitored by tachometer 159. The output of tachometer 159 is an electrical signal directly proportional to the actual motor speed. The output signal of tachometer 159 is coupled through the A/D converter to the computer, and is also coupled through resistor 154 to summing point 155. In this embodiment the electrical output of tachometer 159 is a negative d.c. voltage. This negative d.c. voltage is summed with a positive d.c. voltage which is coupled through resistor 153 to summing point 155. This positive d.c. voltage is specified by the computer as required to obtain a program calculated or specification motor speed, thus to control the crystal pull rate, crystal spin rate, crucible spin rate or crucible lift rate. The summed signal is integrated by operational amplifier 156 and applied to the base of grounded emitter transistor 157. Transistor 157 is connected in series with the power supply circuit of motor 158 and thus controls the current drawn by the motor, hence controlling the motor speed. The output of amplifier 156 biases transistor 157 "on." The magnitude of this bias determines the current drawn by transistor 157 through motor 158.

The melt temperature sensor 61 employed in a specific embodiment of this invention is comprised of a single opto-electrical sensing device, e.g., a photosensitive diode. Such a device produces an electrical output which is a function of the intensity of the radiation incident upon a surface thereof. As the intensity of the radiation emitted from the molten silicon within the crystal puller is a function of the temperature thereof, the electrical output of the device is a function of the melt temperature. As the functional relationship between actual melt temperature and the electrical output is extremely complex, the electrical output has not been calibrated to indicate actual temperature. Rather, the melt temperature, as indicated by the electrical output of the sensing device, is initially maintained constant at the value thereof at the time the computer takes control of the crystal from the operator, and is subsequently incrementally adjusted as required by the profile algorithm in order to maintain average pull rate within imposed limits.

A crystal diameter sensor of the type employed in a preferred embodiment (diameter sensor 64) of this invention is described in copending application Ser. No. 68,282, filed Aug. 31, 1970, entitled "Crystal Pulling System" (TI-3908), by Dmetro Andrychuk, now U.S. Pat. No. 3,692,499 and assigned to the assignee of this invention. The diameter sensor detects the position of a narrow band of high intensity radiation, or a halo, which surrounds a crystal rod at the melt interface as the rod is being pulled. Changes in the position of the halo indicate changes in the diameter of the crystal rod. The preferred sensor employs two monitors which are selectively spaced 180° apart around a circle of the desired diameter, and an optical system is employed to direct radiation from the halo upon the monitors. The use of such a two monitor sensor eliminates the effect of crystal wobble and reduces the effect of crystal asymmetry. Each monitor is comprised of a plurality (five in a specific embodiment) of opto-electrical sensor devices (e.g., photovoltaic silicon diodes) which are equally spaced apart radially across the halo image. The electrical output of each of the five sensor devices is manipulated by electrical circuitry and then the electrical signals are combined to produce a linear electrical signal of a desired shape. These electrical signals, one derived from each of the two monitors, are then electrically combined to produce a linear electrical error signal of the general shape shown in FIG. 11. The diameter sensor further includes a pair of micrometer screws for adjusting the position of the two monitors, thereby to enable adjustemnt of the diameter sensor to grow crystal rods of various nominal diameters. For a selected nominal diameter the position of the monitors is initially adjusted to produce a null, or zero, electrical error signal. Thereafter the electrical output of the diameter sensor is a true error signal indicative of variations in the actual diameter of the crystal rod from the desired nominal diameter. The above-identified application Ser. No. 68,282 is hereby incorporated by reference to further describe the preferred diameter sensor.

An RF sensor and an RF controller of the type employed in a preferred embodiment of this invention (RF sensor 63 and RF controller 62) are described in copending application Ser. No. 171,673, filed Aug. 13, 1971, entitled "Duty Cycle Control System" (TI--4614), by Harold A. Cox and assigned to the assignee of this invention. The preferred RF sensor 63 is basically a wire loop antenna which is twisted into a figure-eight configuration to form two equal loops. The sensor is placed adjacent to a conductor which couples the RF generator to the RF induction heating coils of the crystal puller, with the conductor positioned through the center of the sensor. The electrical field from the conductor cuts the two equal loops in opposite directions, inducing voltages which add. The voltage induced across the sensor terminals is then rectified, filtered and limited to a desired calibration level at maximum RF power.

The preferred RF controller 62 comprises, connected in the following order, a summing point, an integrator, a Schmidt Trigger and control logic. At the summing point the RF sensor output is summed with a set point signal from the computer. The integrator integrates the summed electrical signal, producing a sawtooth waveform. The Schmidt Trigger has a logic output the condition of which is dependent on the magnitude of the sawtooth waveform. As the sawtooth output of the integrator reaches the upper trip point of the Schmidt Trigger, the output of the Schmidt Trigger changes from a logic "0" to a logic "1." Upon occurrence of this logic "1" the control logic turns on the RF generator. While the generator is "on," the integrator output has a negative slope. When the integrator output reaches the lower trip point of the Schmidt Trigger, the output thereof changes to a logic "0," and the control logic turns off the generator. In a preferred embodiment the RF generator is a three phase generator, and the control logic controls the generator so that the output thereof is dependent on the most positive of the three phases at all times while the generator is "on." In this manner the average generator output is controlled by controlling the generator duty cycle, and the melt temperature is maintained constant for a given set point. A change in the set point will of course result in a change in the melt temperature. The above-identified application Ser. No. 171,673 (TI-4614) is hereby incorporated by reference to further describe the preferred RF sensor and RF controller.

Figure 6:
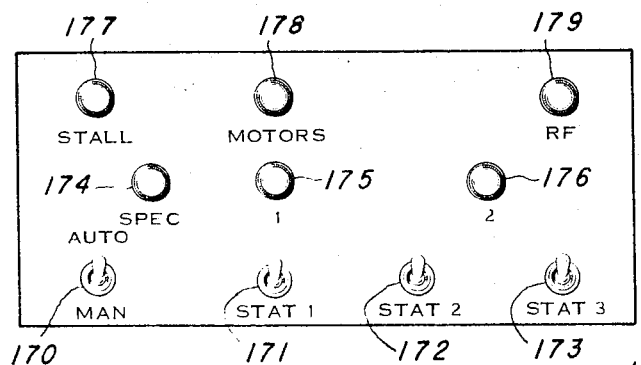
FIG. 6 is a diagram of the control panel on the man-machine interface unit illustrating the interface switches and indicators.

Referring now to FIG. 6 there is schematically illustrated the control panel of the man-machine interface unit. The mode switch, or auto-manual switch, 170 enables the operator to select a manual mode of operation, in which the operator may control the crystal growing process by manipulation of the controls on the manual control panel of the crystal puller, or an automatic mode of operation, in which the computer controls the crystal pulling process. In addition to the requirement that the mode switch be in the auto position, a digital signal must be received from the computer before the computer can take control of the crystal puller. Thus, in the event of a power failure or other cause for inoperability of the computer, the operator cannot switch the mode of operation from manual to automatic, and the controls of the manual control panel remain operative regardless of the position of the mode switch. In the event of a computer failure, a STALL light 177 is turned off to warn the operator. Similarly, a MOTORS light 178 is turned off in the event one or more of the puller motors malfunctions, and an RF light 179 is turned off in the event of an RF generator malfunction. Thus, during the automatic mode of operation, if the system is performing normally indicator lights 177, 178 and 179 are all turned on. If any of the lights 177, 178 or 179 goes out, this serves to warn the operator to switch the mode switch to manual and take over control of the crystal pulling process via the manual control panel.

The SPEC light 174 serves to indicate to the operator whether the specification card has been loaded and read into the computer via the card reader. The SPEC light is turned off when the specification card has been read in. The control panel has three status switches 171, 172 and 173, respectively designated STAT1, STAT2 and STAT3. The operator may flip the STAT1 switch on to indicate to the computer that a melt-back is required, and then flip the mode switch to the manual position, take control of the puller and melt the crystal rod back into the crucible. The operator may flip the STAT2 switch on to indicate to the computer that a reseed is required, and then, in the manual mode of operation, speed up the pull rate to neck in the crystal to a desirable seed diameter, then begin the crystal pulling process anew. The operator flips the STAT3 switch on to cause the computer to taper the crystal at the end of the run. Indicator lights, or status lights, 175 and 176, respectively labeled 1 and 2, are used only during the melt-back procedure. The position of the crucible must be within imposed limits before the pulling process can be again turned on to the computer. If the crucible position is too low, either status light 1 or 2 will be turned on; if the crucible position is too high, both status lights 1 and 2 will be turned on. The operator can adjust the position of the crucible via the manual control panel until both status lights are turned off.

Figure 7:
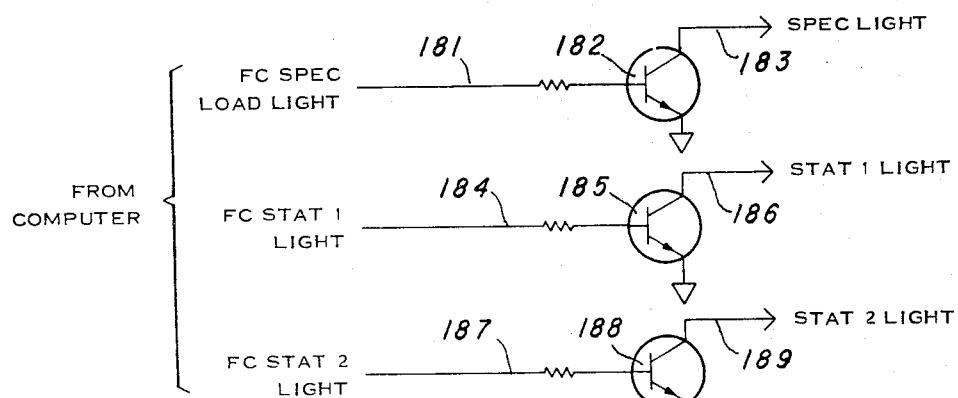
FIG. 7 is a schematic of the indicator light driver amplifiers.
Figure 8:
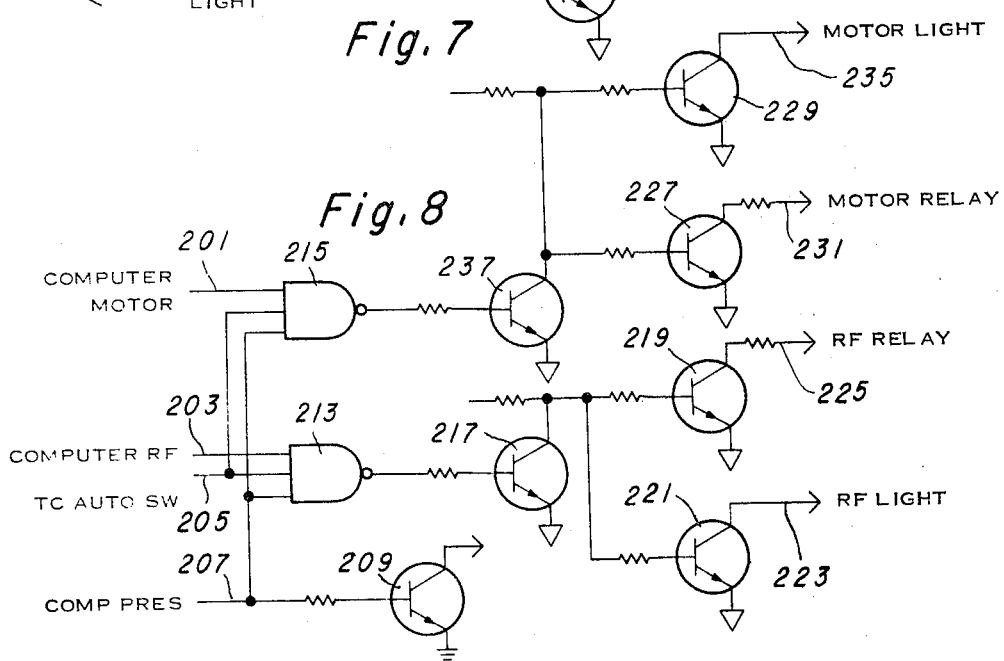
FIG. 8 is a schematic of the control circuitry for controlling generator and motor indicator lights and relays.
Figure 12:
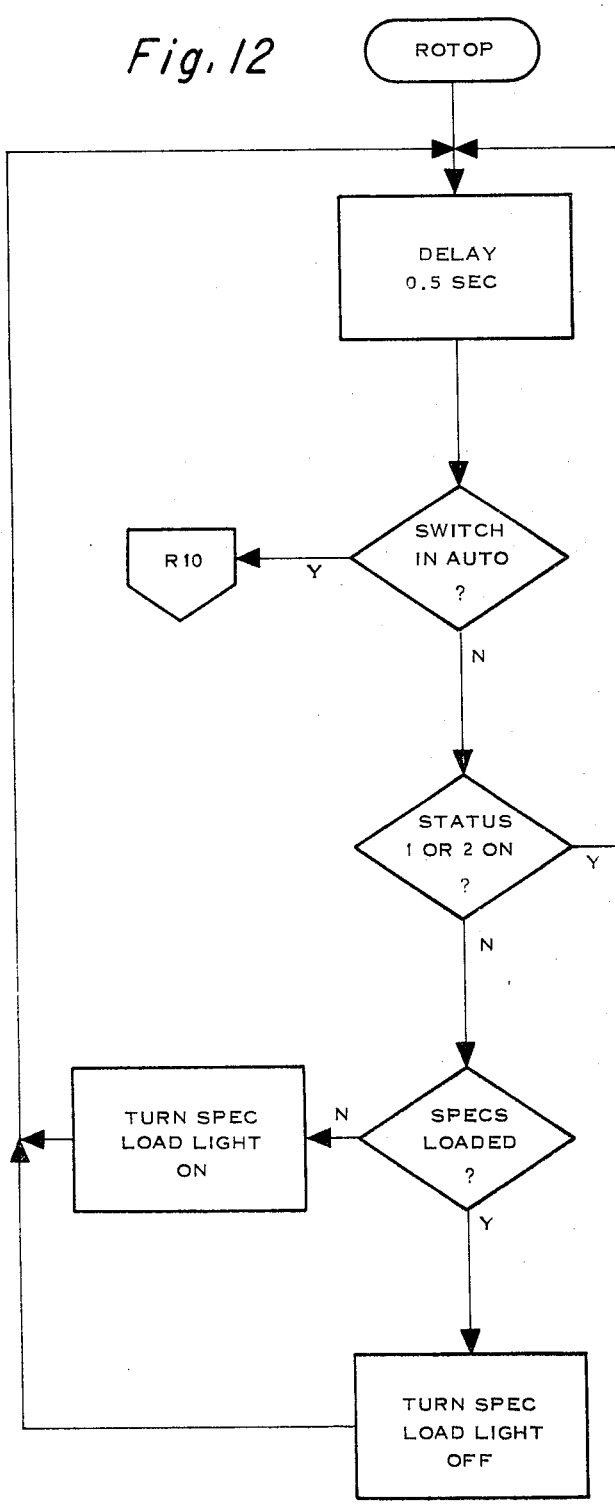
Figure 13:
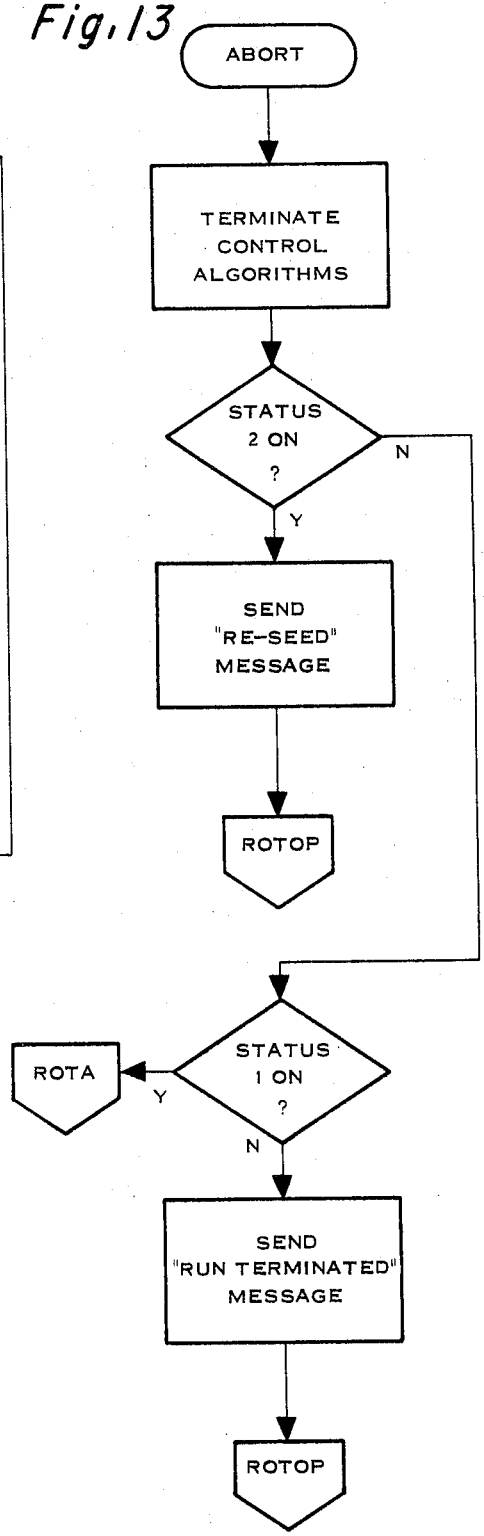
Figure 15:
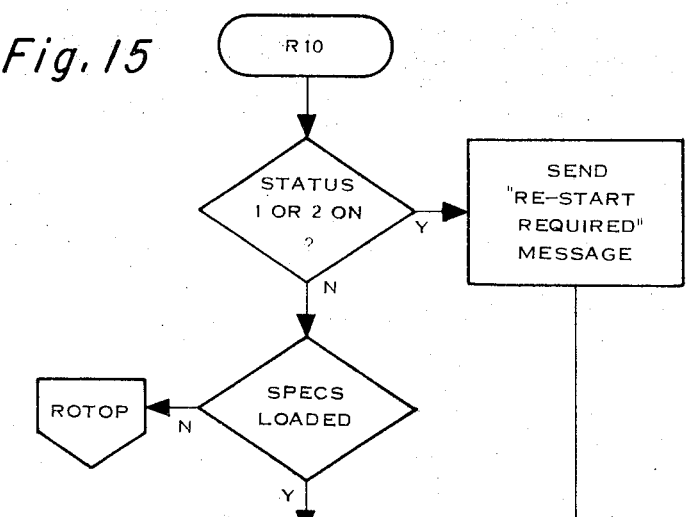
Figure 14:
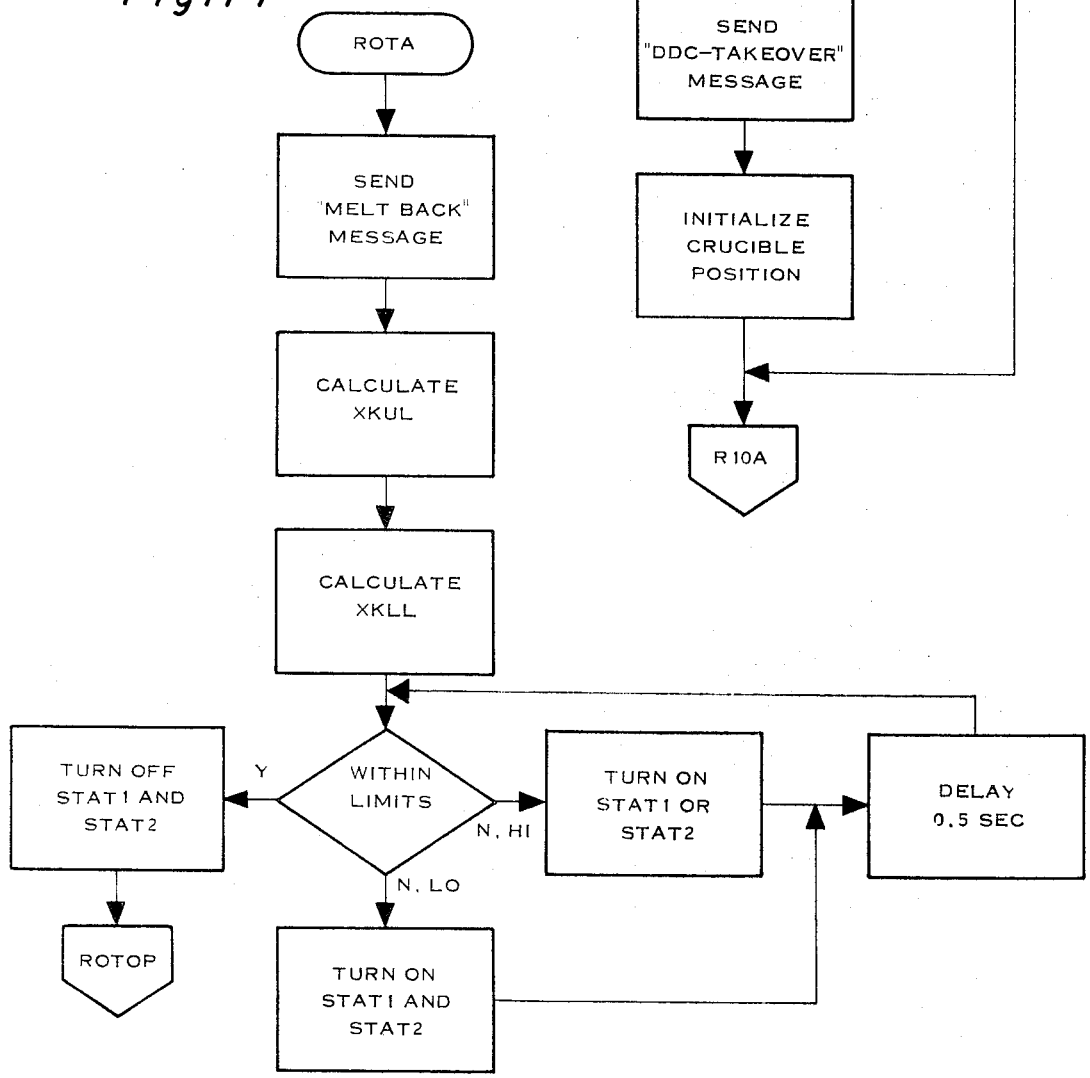
Figure 16:
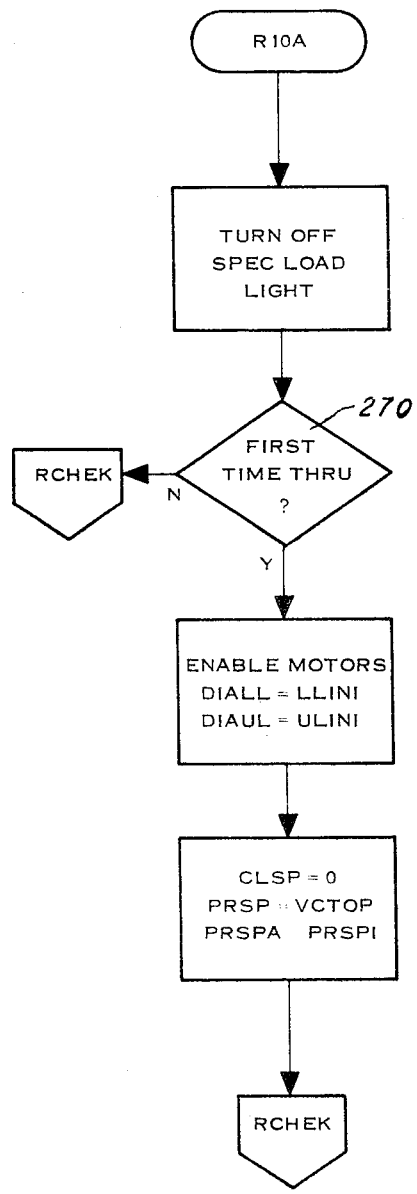
Figure 17:
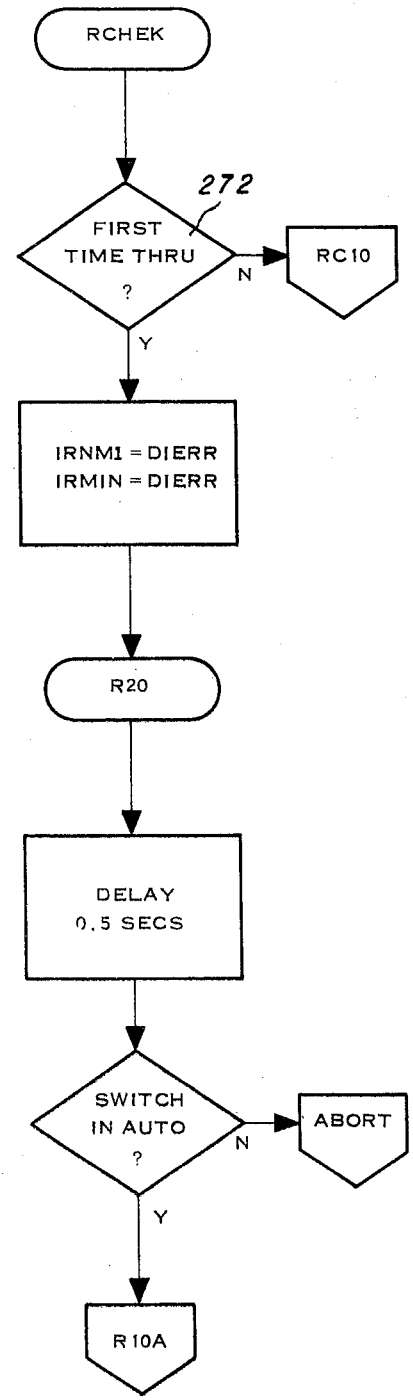
Figure 20:
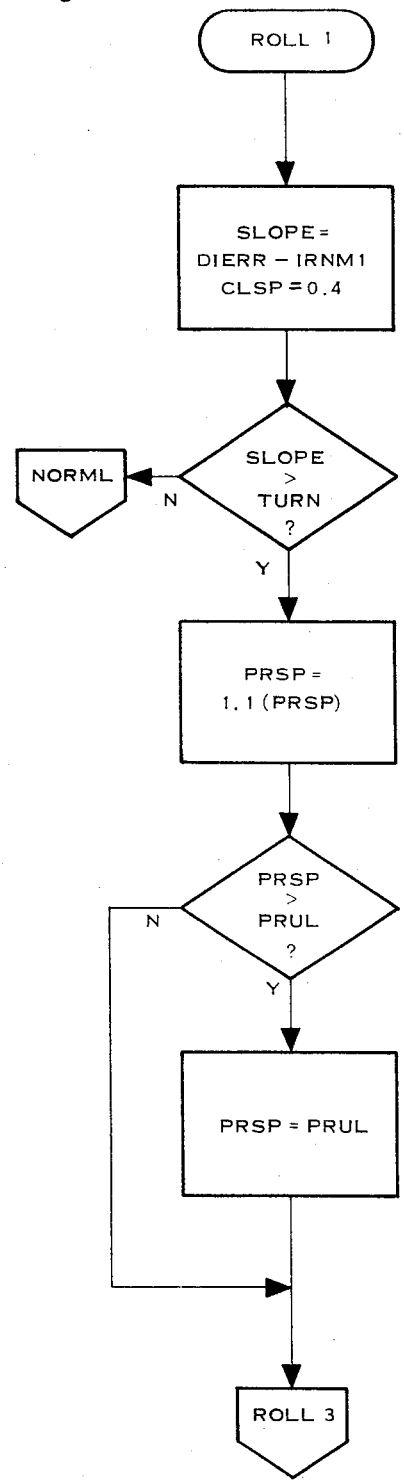
Figure 21:
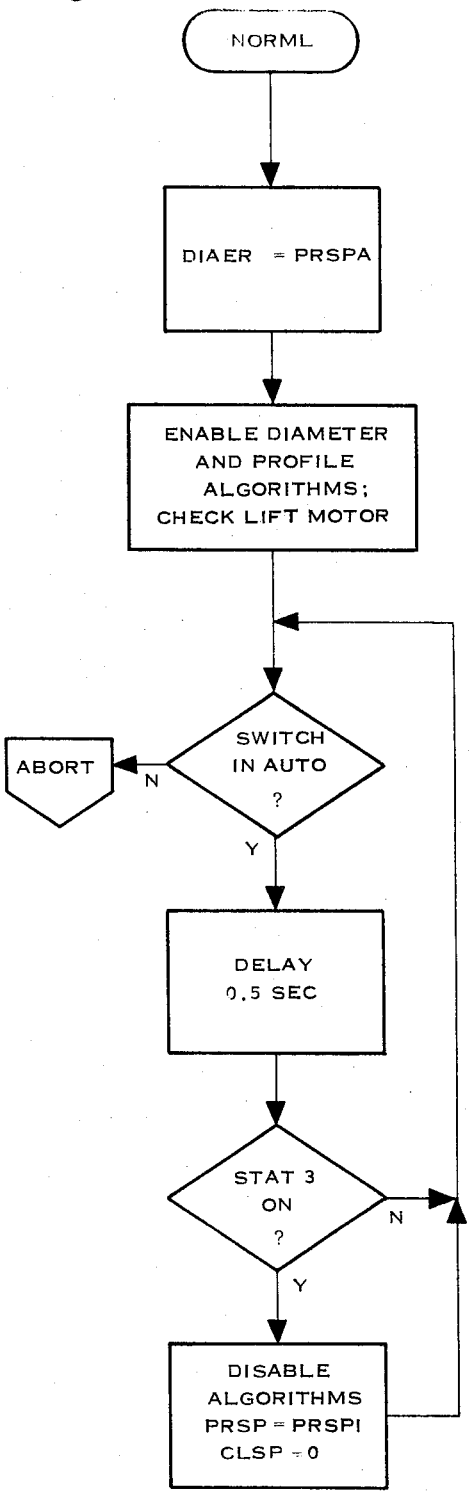
Figures 22, 23:
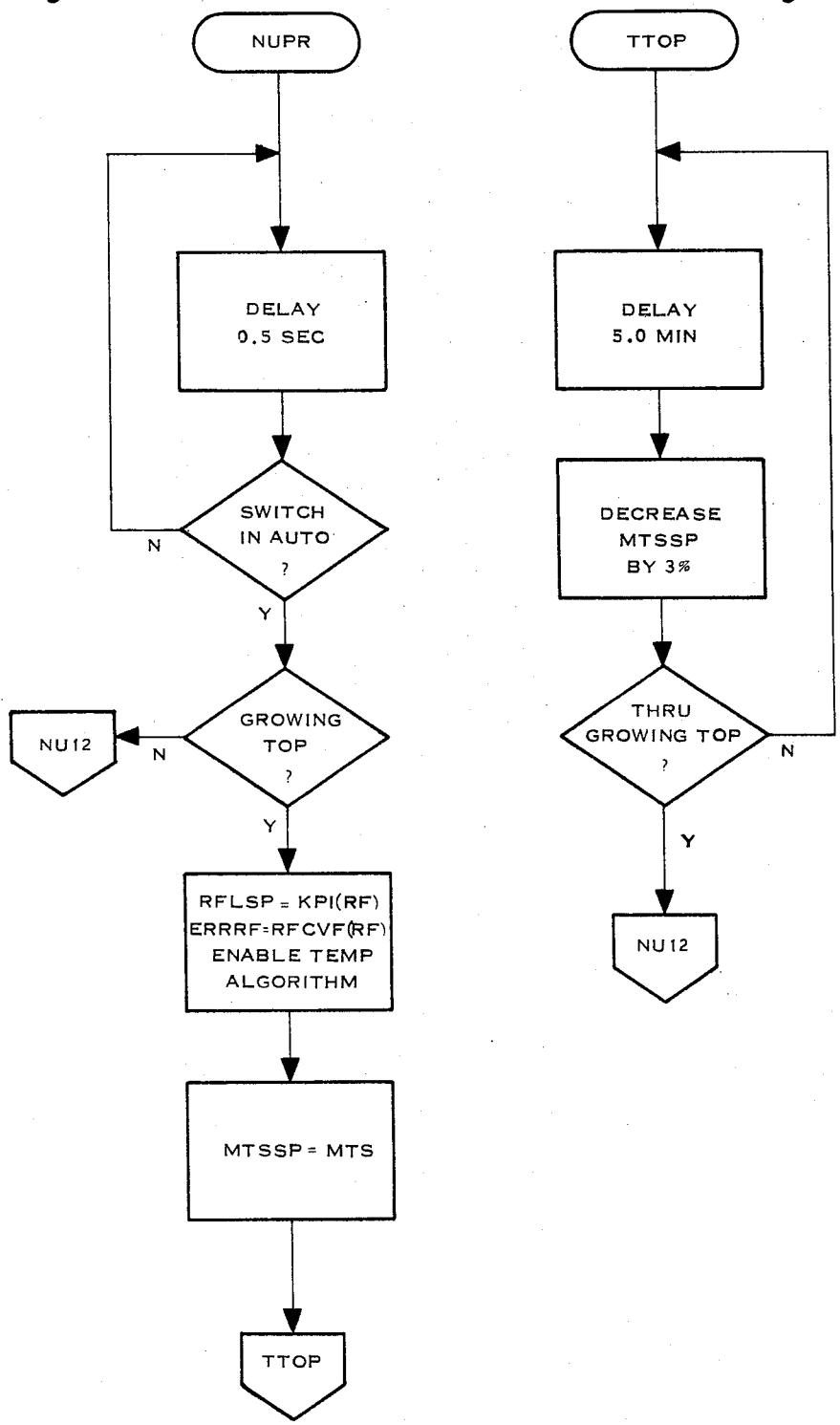
Figure 24:
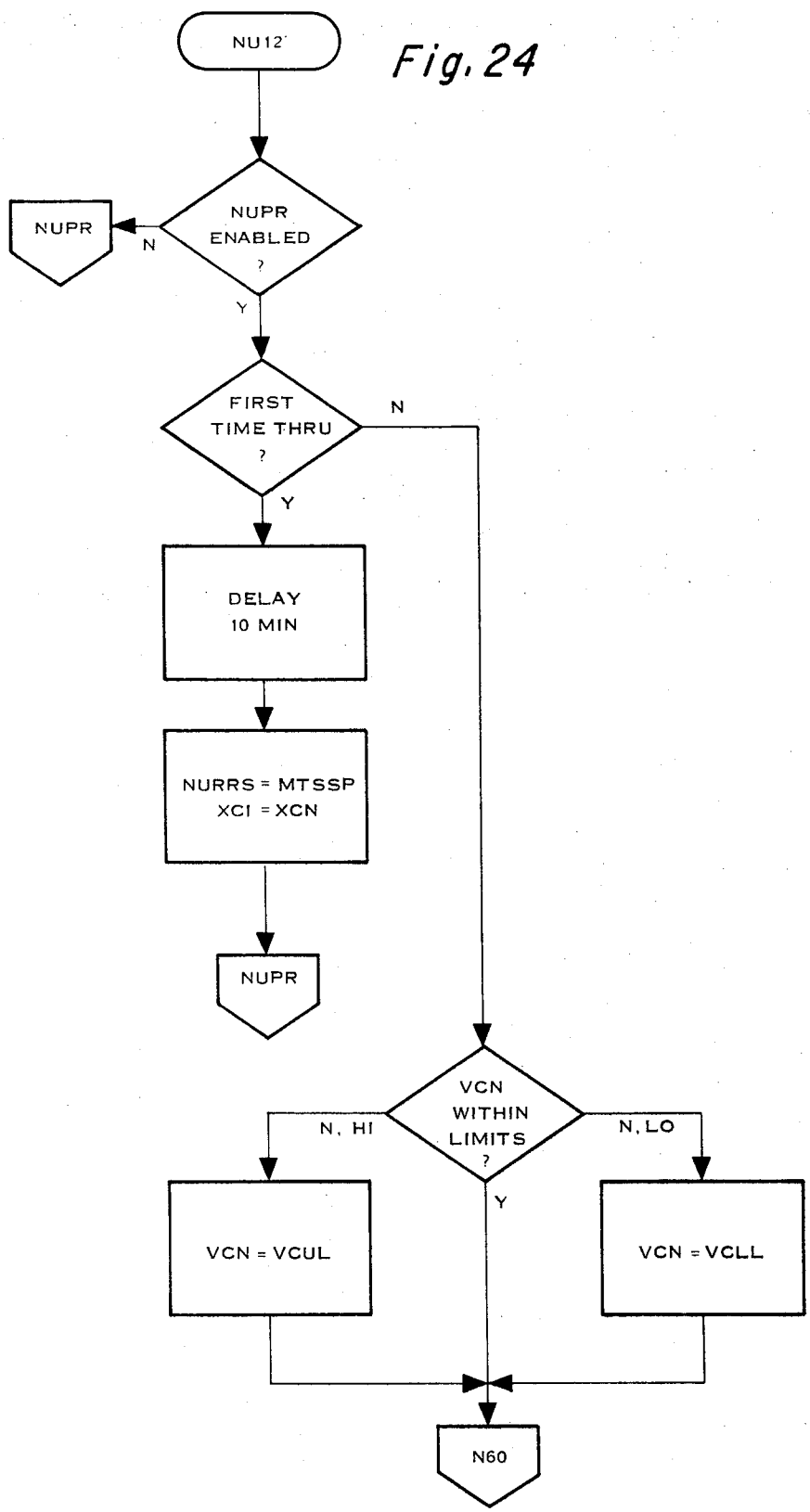
Figure 25:
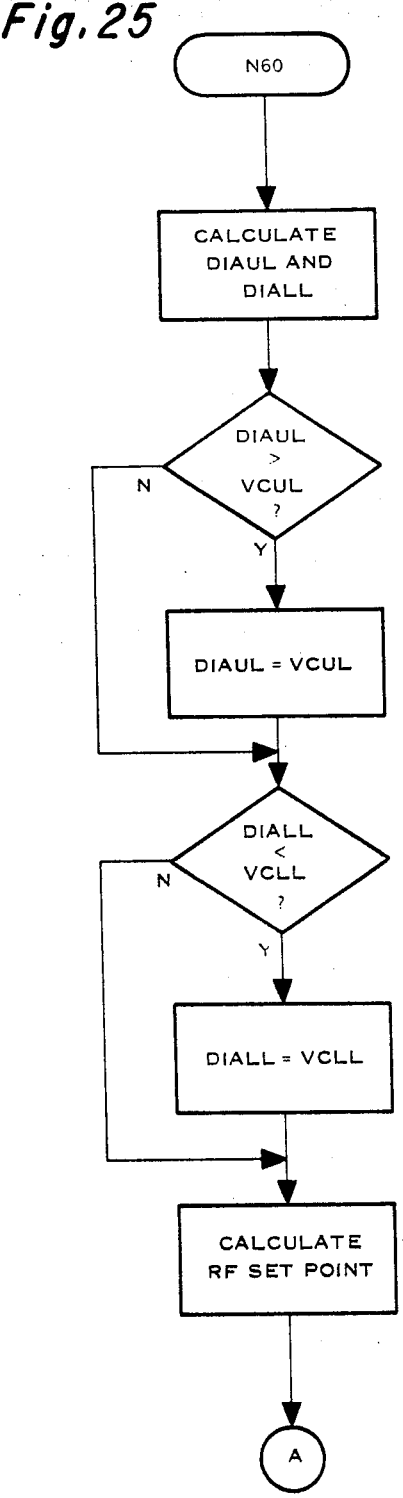
Figure 26:
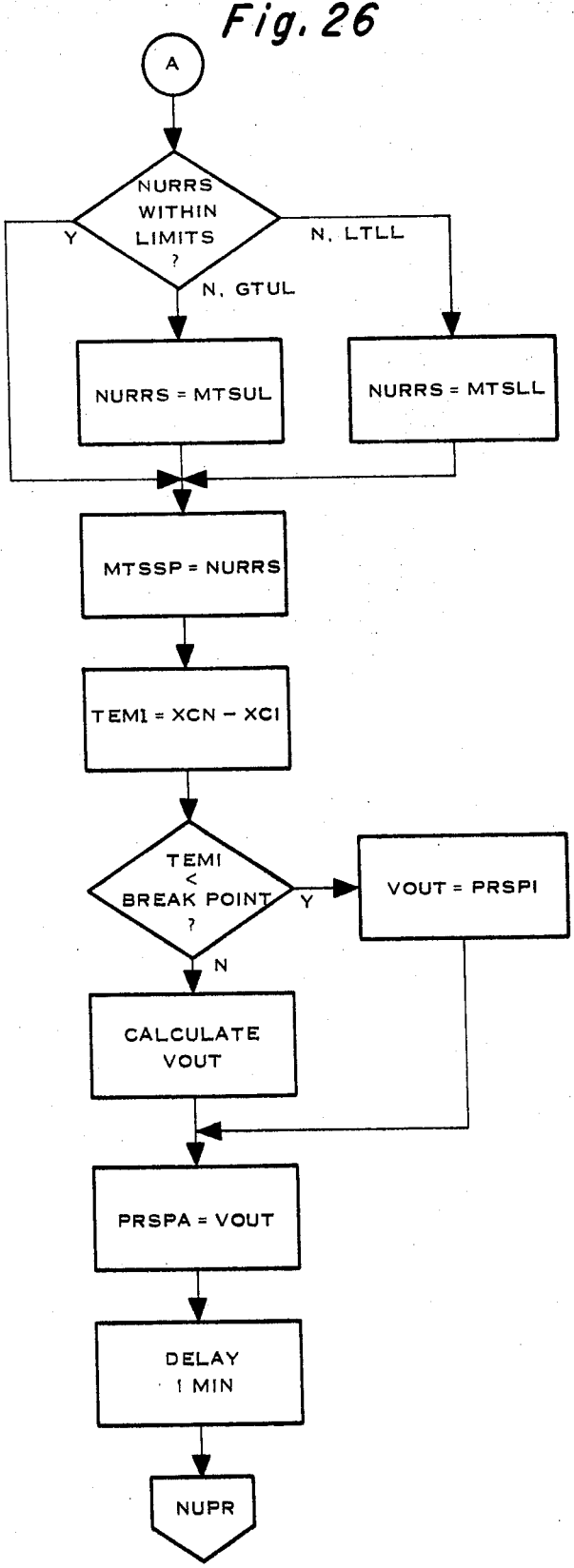
Figure 27:
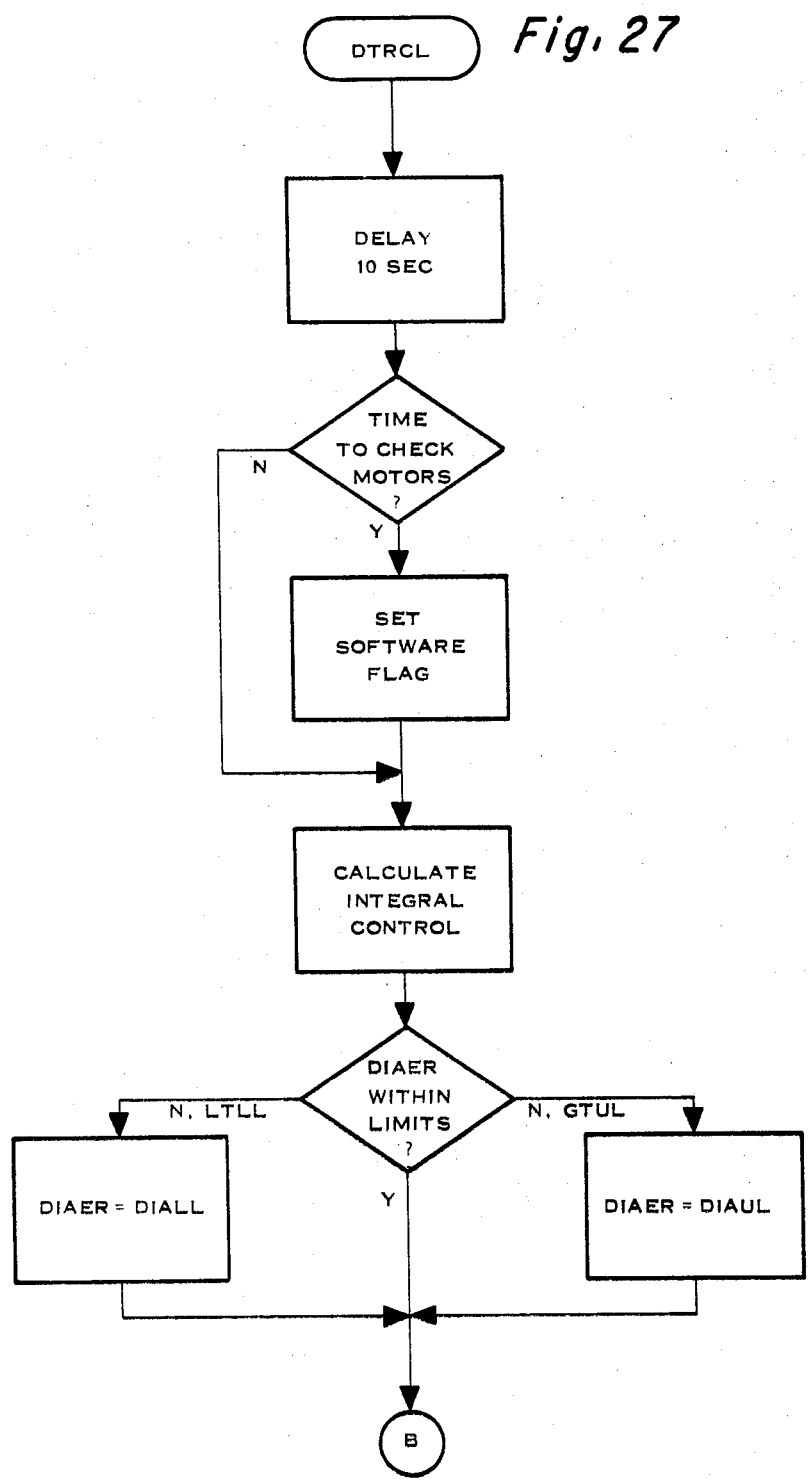
Figure 28:
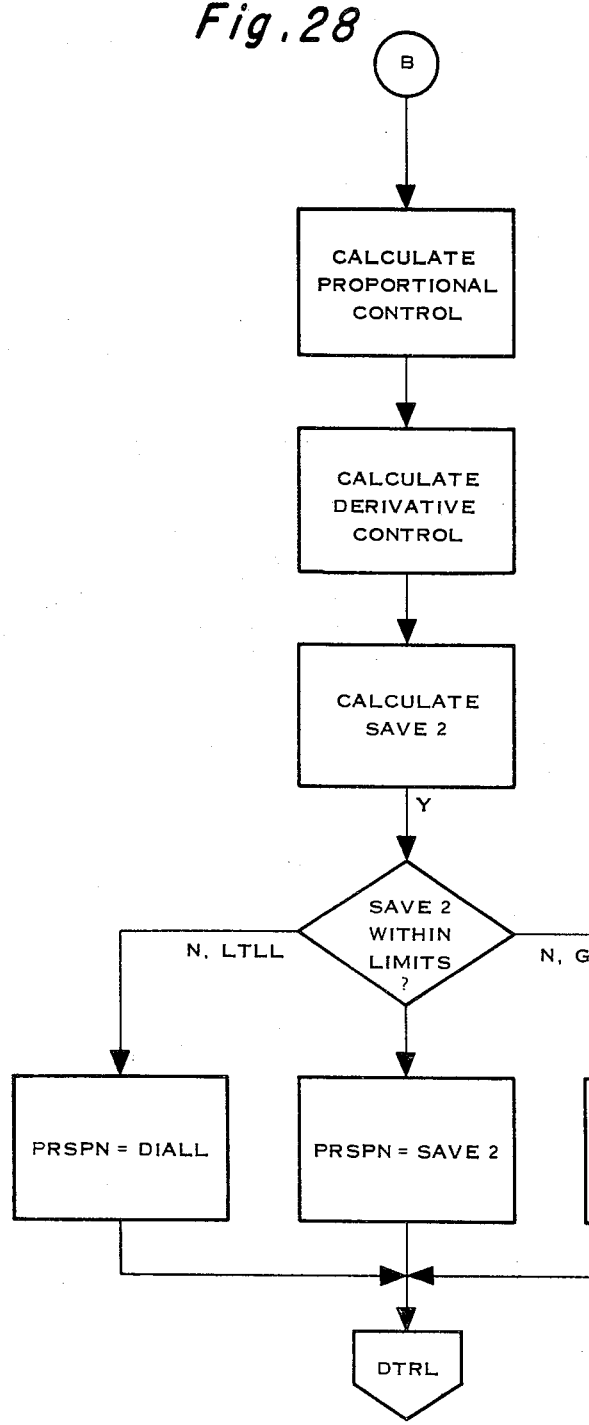
Figure 29:
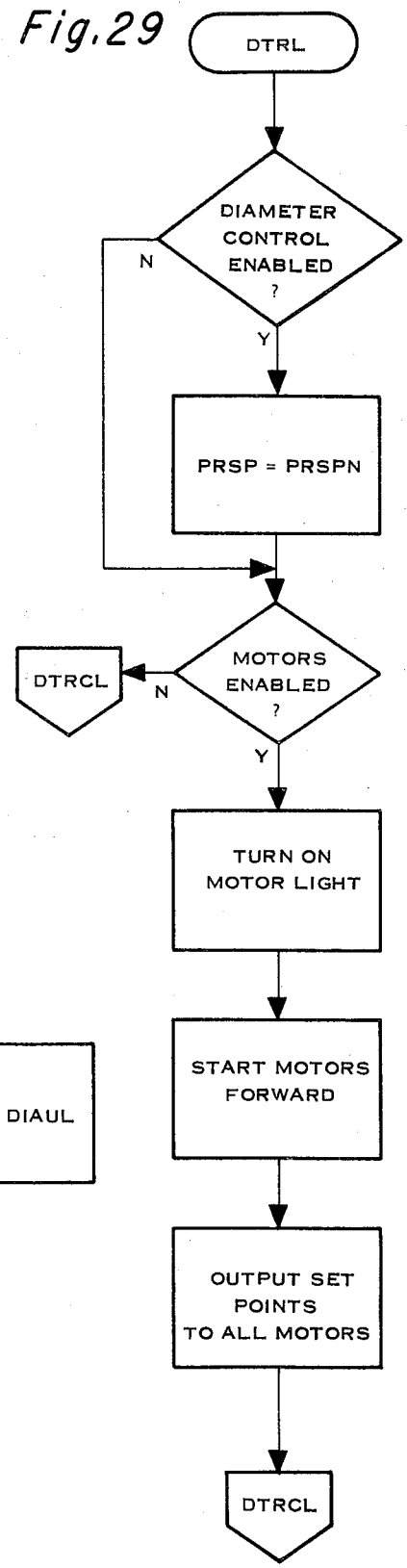
Figures 30, 31:
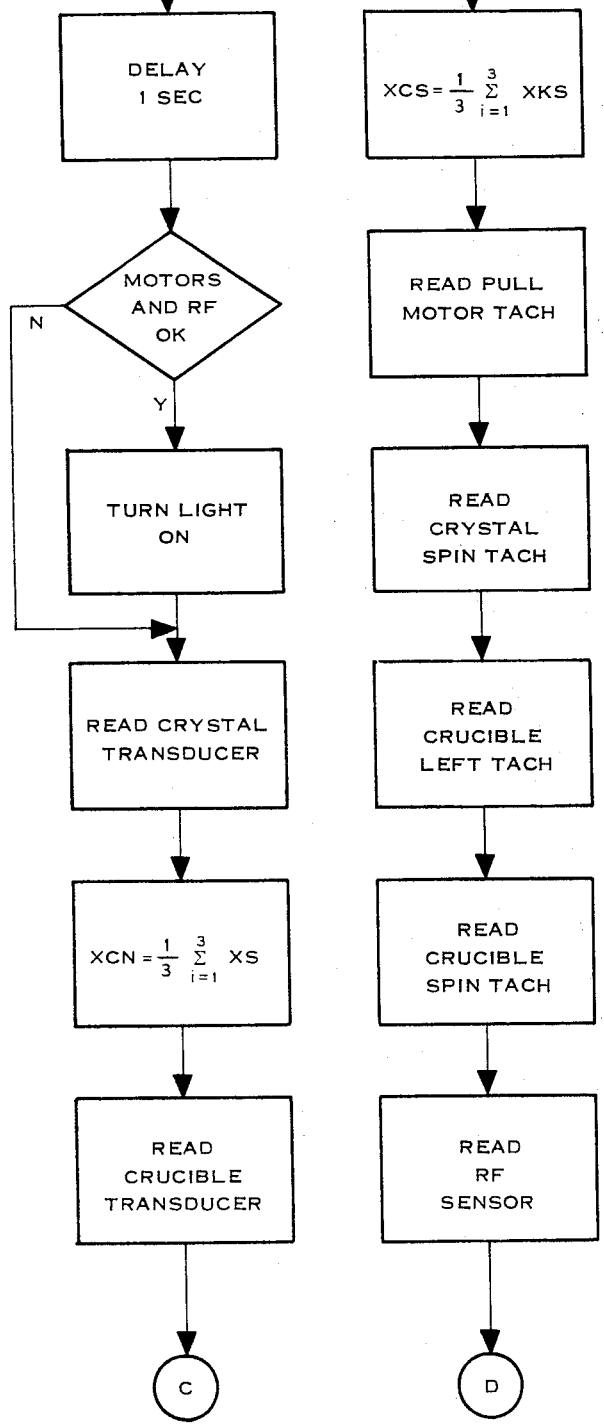
Figure 32:
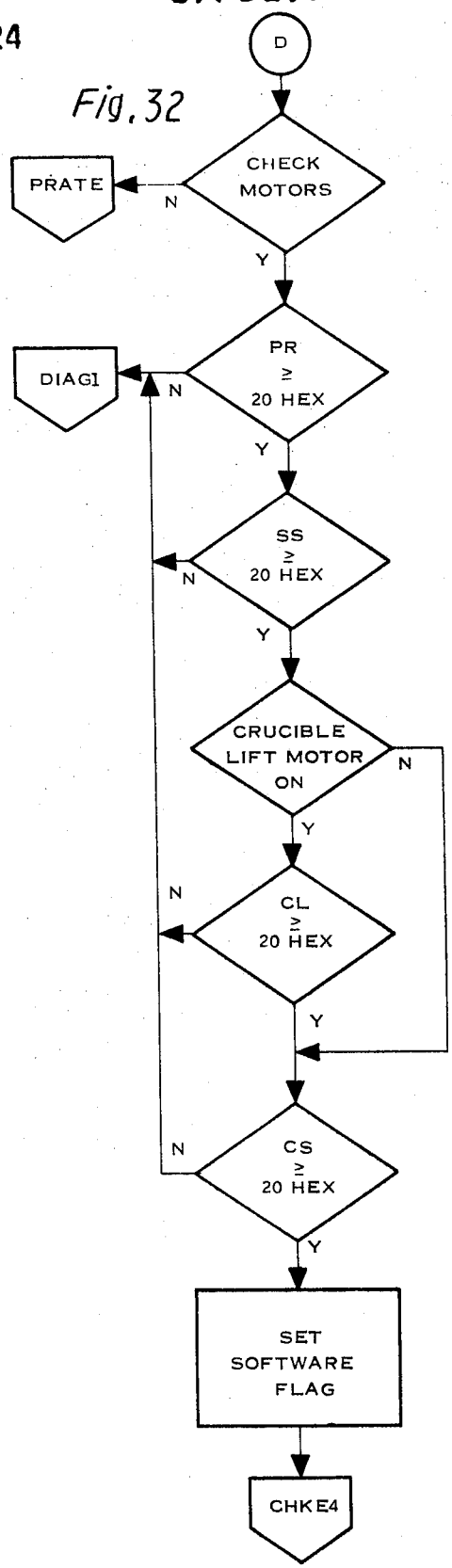
Figure 33:
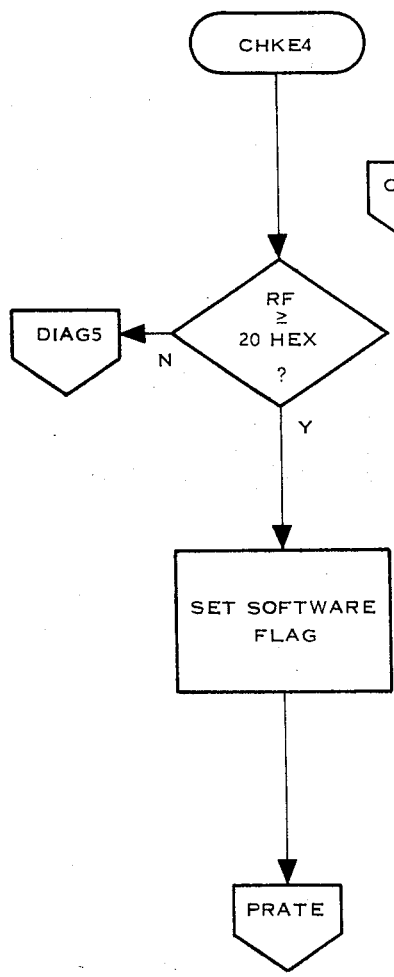
Figure 34:
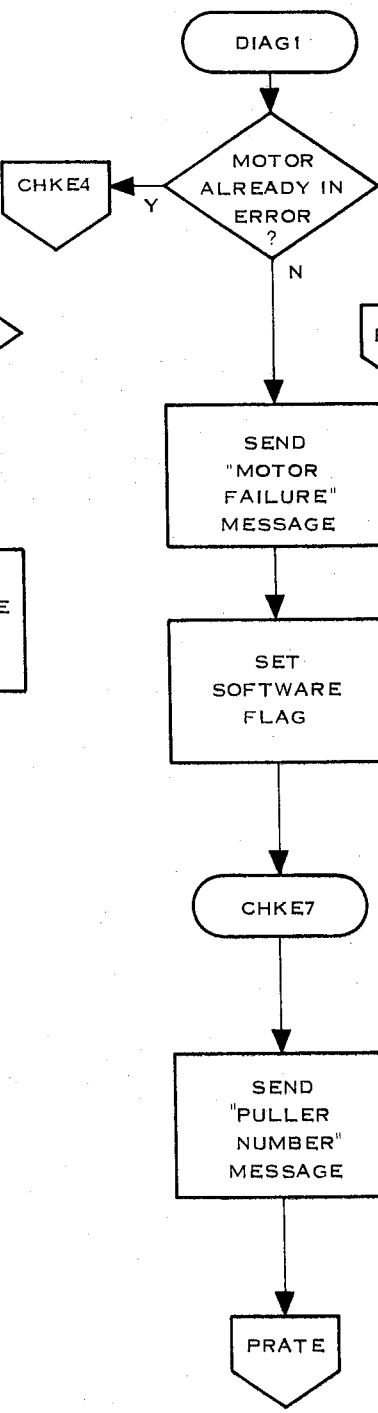
Figure 35:
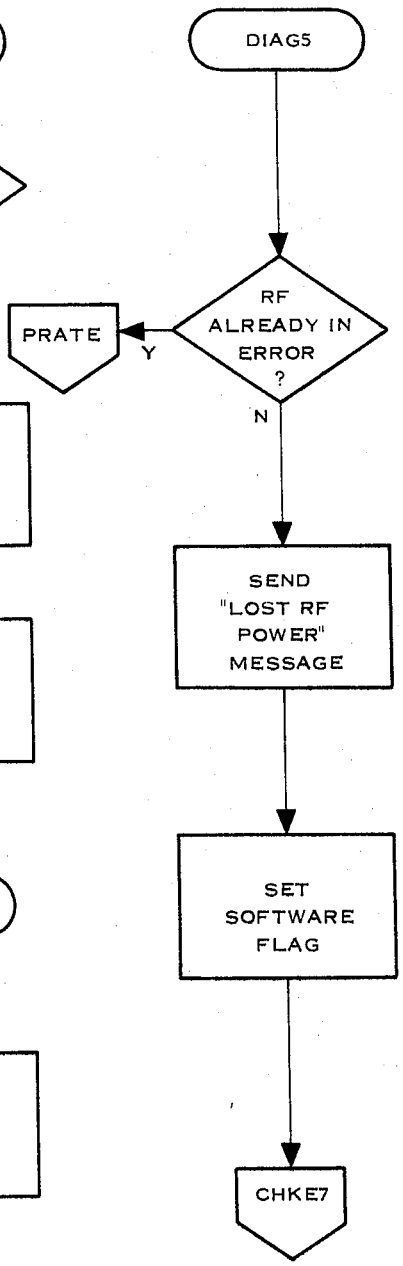
Figures 39, 40:
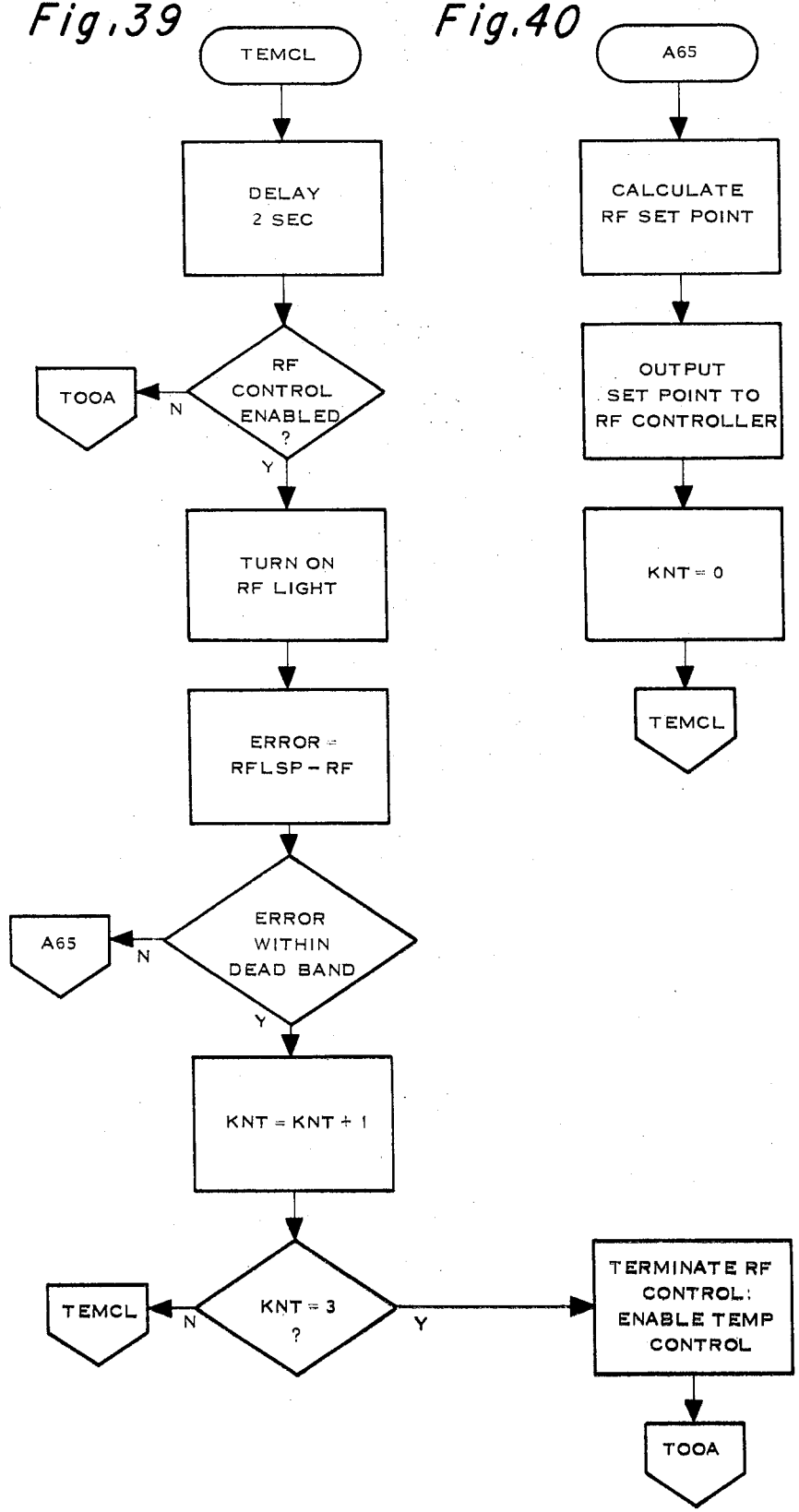
Figure 41:
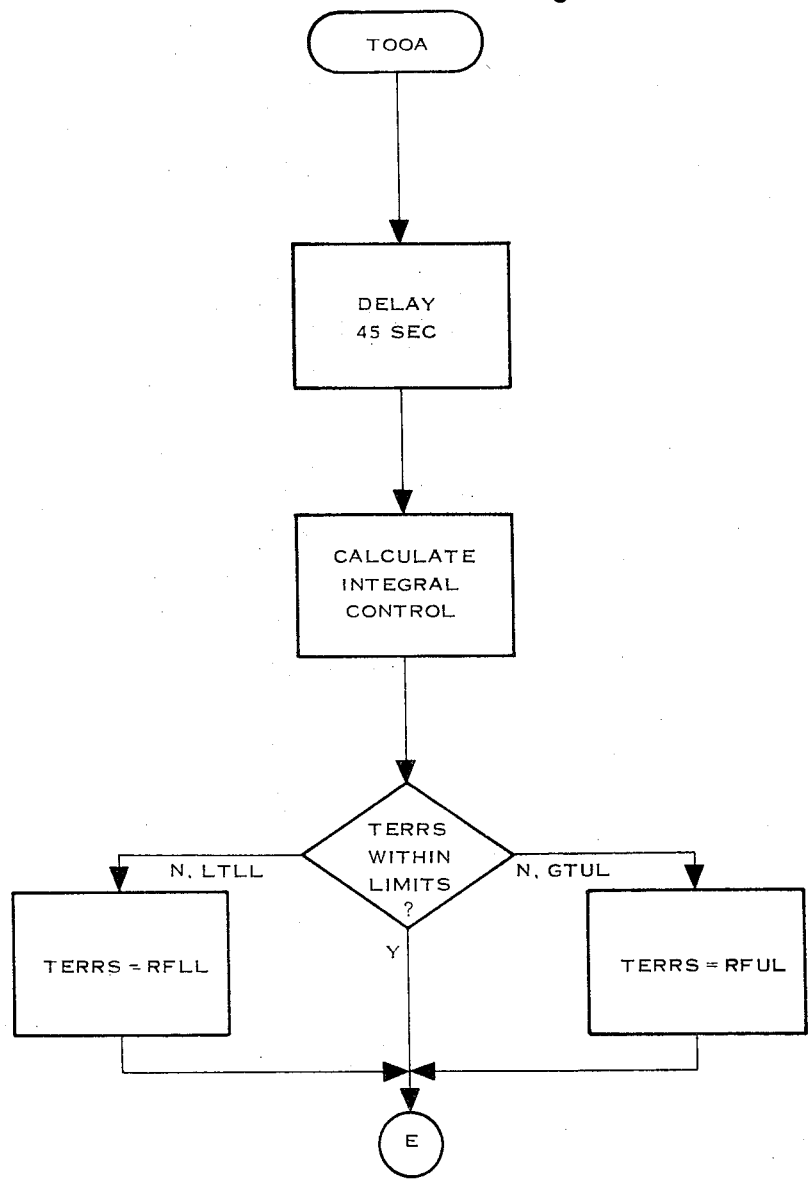
Figure 42:
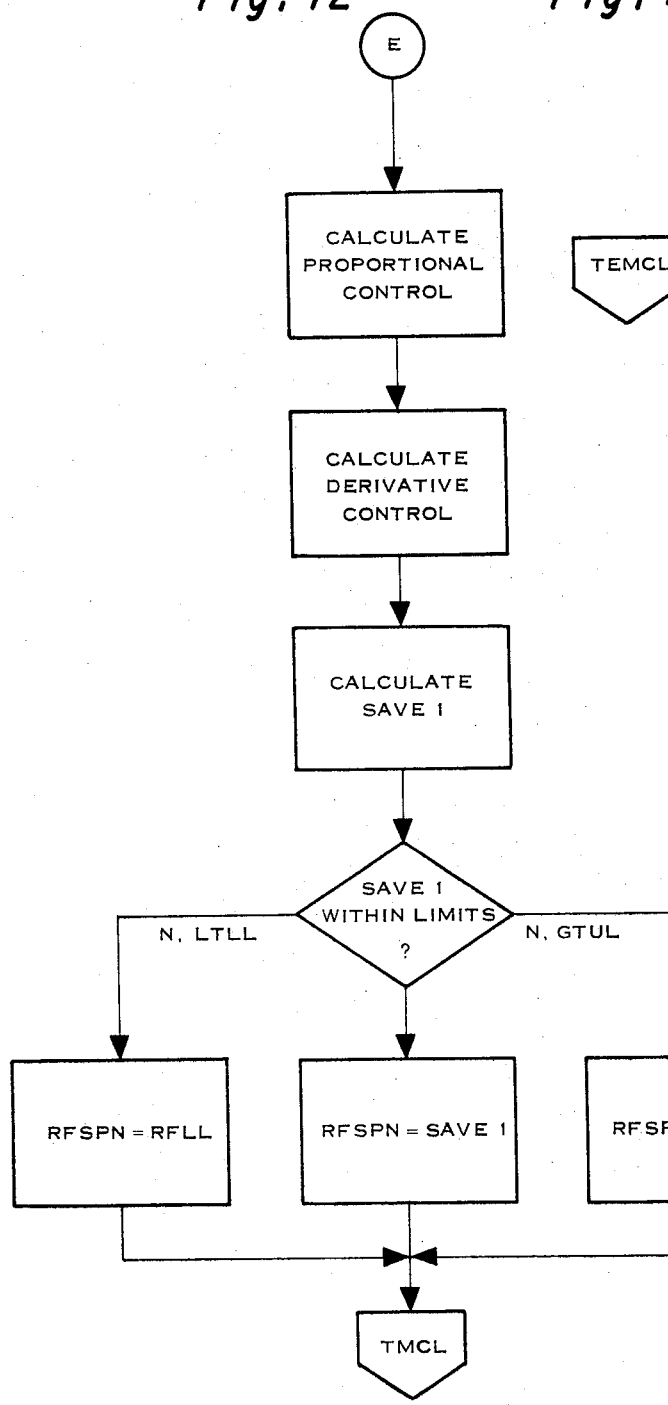
Figure 43:
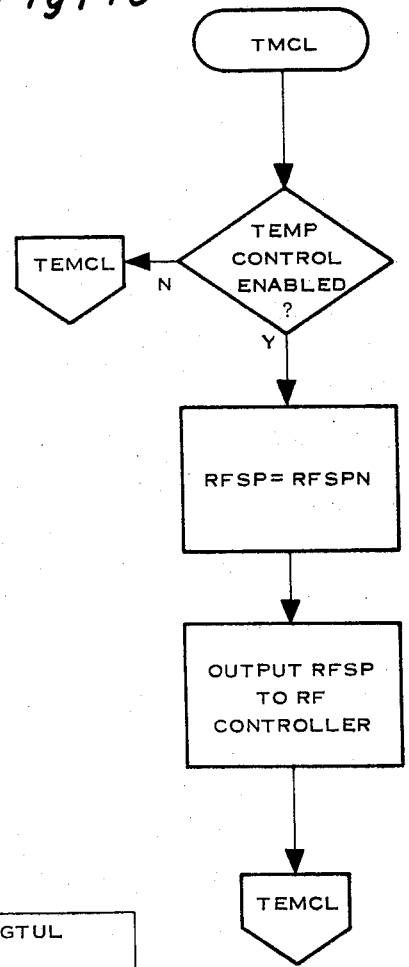
Figure 44:
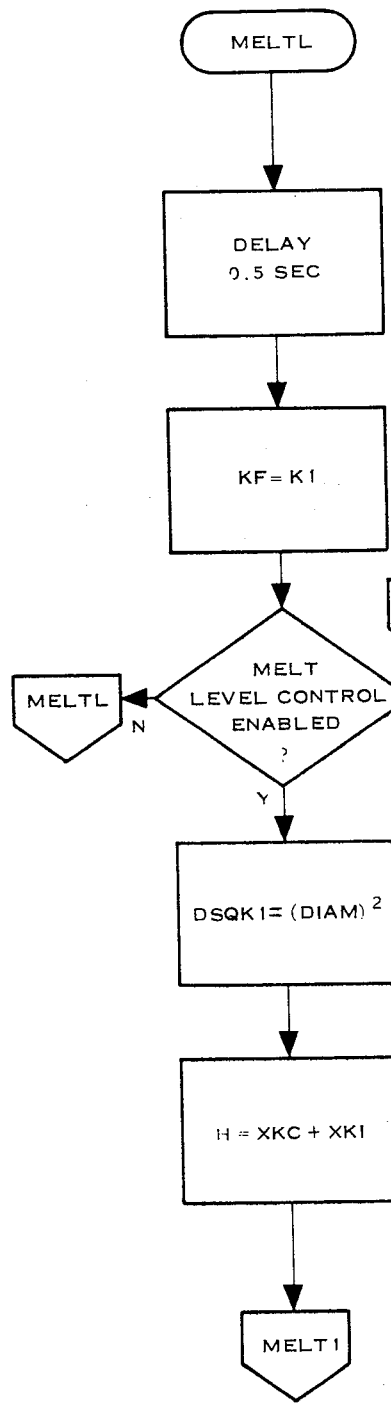
Figure 45:
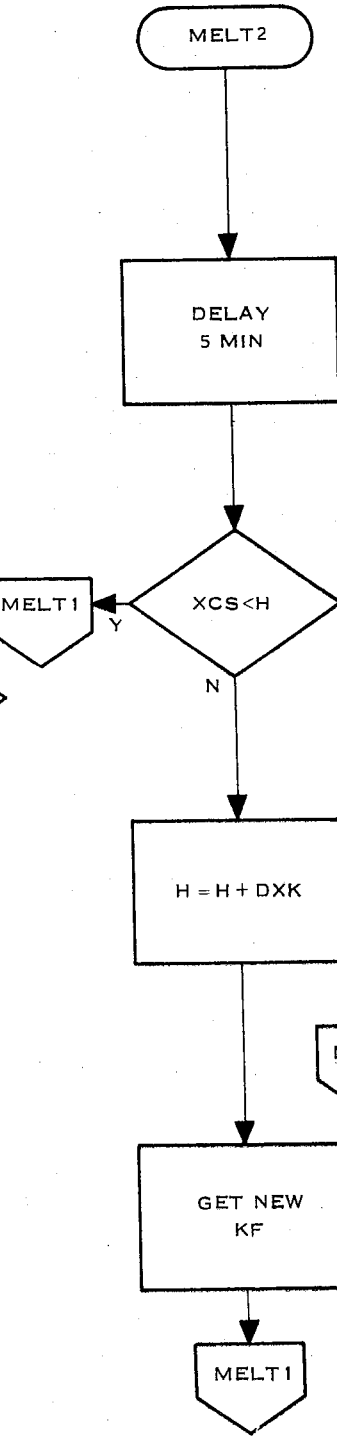
Figure 46:
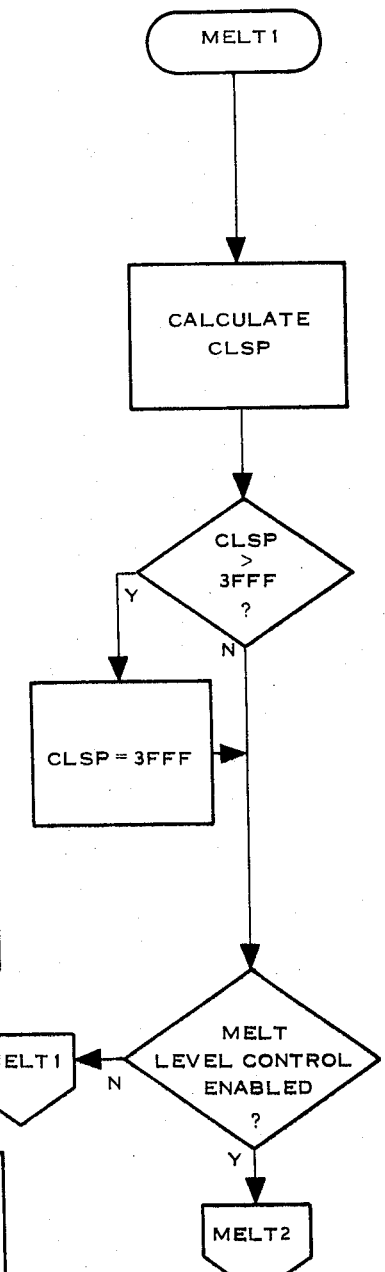

A conventional grounded emitter transistor amplifier is coupled to receive a digital signal from the computer and control the condition of the status lights 1 and 2 and the SPEC light. Referring specifically to FIG. 7, a pulse received from the computer on line 181 will bias transistor 182 on. Line 183, connected to the collector of transistor 182, is coupled to enable current to be drawn through the SPEC light, thereby turning it on. A pulse received from the computer on line 184 turns on transistor 185, causing it to draw current through and turn on status light 1. Similarly, a pulse received from the computer on line 187 turns on transistor 188, thereby causing it to draw current through and turn on status light 2. Referring to FIG. 8, a pulse received from the computer on line 207 biases on transistor 209, thereby turning on the STALL light.

In the event of a malfunction or failure of the crystal puller motors or RF generator, the MOTORS light 178 or RF light 179 will be turned off, and in the event of a computer failure, the STALL light will be turned off. Referring now to FIG. 8, NAND gate 215 controls the MOTORS light and NAND gate 213 controls the RF light. When the mode switch is in the auto position, a logic "1" is applied to NAND gates 213 and 215 via line 205. When the computer is functioning normally a logic "1" is also applied to NAND gates 213 and 215 via line 207. Thus NAND gates 213 and 215 are enabled to be responsive to the logic conditions of lines 203 and 201, respectively. While all puller motors are functioning properly, a logic "1" is applied to NAND gate 215, and thus the output thereof is a logic "0." The logic "0" output of NAND gate 215 biases off transistor 237. Thus transistors 227 and 229 will be biased on by the supply voltage +V. The current drawn through transistor 229 causes the MOTORS light to be turned on, thus indicating that the motors are functioning properly. The current drawn through transistor 227 maintains a motors relay closed, enabling the computer to have control thereof. In the event that one of the puller motors malfunctions, a logic "0" is received from the computer on line 201, causing a logic "1" output of NAND gate 215 to bias on transistor 237, thereby coupling the bases of transistors 229 and 227 to the reference potential and biasing them off, thus turning off the MOTORS light and tripping the motors relay. The same result obtains when the computer fails or the mode switch is switched to manual.

Similarly, when the RF generator is functioning normally, a logic "1" is applied to NAND gate 213 on line 203, transistor 217 is biased off and transistors 219 and 221 are biased on. The "on" condition of transistor 219 maintains the RF relay in the closed position to enable computer control of the RF generator. The "on" condition of transistor 221 maintains the RF light on. Upon occurrence of an RF generator malfunction, a computer failure or switching of the mode switch to the manual position, transistors 219 and 221 are biased off, turning off the RF light and opening the RF relay.

FIG. 9 depicts a single crystal rod and illustrates the phases of growth of the crystal. The seed crystal 250 is dipped into the crucible of molten silicon by manually raising the crucible until the seed contacts the melt. THe operator then manually controls the pull rate while growing the stem 251 of the crystal. After the stem is of satisfactory length, at point 253 the operator turns over control of the crystal pulling process to the computer by flipping the mode switch to auto. The computer initially progressively decreases the RF generator output to decrease the melt temperature and thus increase the rate of crystallization. As rate of crystallization increases and pull rate remains constant, the diameter of the crystal progressively increases to grow the top, or shoulder, 255 of the crystal. As the crystal diameter approaches the desired nominal diameter at point 257, the computer goes into a roll procedure to adjust the pull rate to grow the crystal uniformly at the nominal diameter, thus growing the constant diameter portion 258. When the uniform diameter portion of the crystal rod has grown to the desired length, or when the melt has been substantially usurped, at point 259 the operator flips the STAT3 switch to initialize the taper procedure under computer control. At this point the crucible lift rate is set to zero, fixing the position of the crucible, and pull rate remains constant while generator output is increased, thus growing a tapered bottom 261 of the crystal.

In retrospect, the operator initially dips the seed crystal into the melt and grows the stem of the crystal, and then flips the mode switch to change the mode of operation to computer control. The computer automatically grows the top portion of the crystal, rolls the top out to the nominal diameter, and grows the crystal substantially uniformly at the nominal diameter. At the end of the run the operator flips on the STAT3 switch and the computer automatically tapers the end of the crystal. However, if at any time after the operator has turned control over to the computer, he determines by observation of the crystal that the quality thereof is unsatisfactory, he may start the process anew. Either of two procedures may be used, a melt back procedure or a re-seed procedure. The re-seed procedure is initiated by flipping the STAT2 switch on and the mode switch to manual. The operator then takes control of the pulling process with the manual control panel, necks the crystal in, grows a new stem and once again turns the process over to the computer by placing the STAT2 switch off and the mode switch in auto. Alternatively, when the crystal is of unsatisfactory quality the operator may utilize the melt back procedure to melt the crystal back into the crucible and begin the process anew, perhaps with a new seed crystal. The melt back procedure is initiated by placing the STAT1 switch on and the mode switch into manual.

Referring now to FIG. 10, the abscissa represents pull rate $V_C$ in mils/sec and the ordinate represents crystal growth rate, or rate of crystallization, $G$ in grams/sec. Assuming that the crystal rod is a right cylinder and that melt level is maintained exactly constant, a constant diameter crystal may be grown by maintaining a constant fixed relationship between growth rate and pull rate, as indicated by straight line 250. The crystal growth rate is inversely proportional to the melt temperature, but is also affected by higher order functions of temperature and by other variables, and melt temperature is in fact dependent on many factors, including generator output, helium flow rate, crucible spin rate, and others. In recognition of the fact that crystal growth rate (and even melt temperature itself) is inherently difficult to accurately control, the basic crystal diameter control technique of this invention involves sensing the diameter of the crystal rod as it is grown and adjusting pull rate to offset growth rate fluctuations. In addition, crystal growth rate is maintained near constant by closed loop feedback control of crystal spin rate, crucible spin rate and RF generator output. Melt level is maintained constant by closed loop feedback control of crucible lift rate.

The preferred diameter sensor, previously described herein, provides an electrical signal which is a true error signal directly proportional to variation of crystal diameter from the nominal diameter over the linear range of the sensor. The error transfer characteristic of the preferred diameter sensor is illustrated in FIG. 11, wherein the abscissa is diameter error in mils and the ordinate is sensor output in millivolts. The left side of the abscissa designates negative diameter error, caused by the diameter being too small, and the right side designates positive diameter error, caused by the diameter being too large. Similarly, the upper end of the ordinate represents positive sensor output and the lower end thereof represents negative sensor output. While the top portion of the crystal is being grown the diameter progressively expands toward the nominal diameter, thus approaching the ordinate from the left, or negative side. Until the diameter has reached a point D, the sensor output is an approximately constant, very small value. At point D the sensor output begins to increase negatively and continues to increase negatively until point A, a transition point of zero slope, is reached. At point A the negative sensor output decreases as the diameter continues to increase, until the ordinate is reached, and thereafter the sensor output increases positively to point C. As the diameter has surpassed point C on the error transfer curve the positive sensor output decreases and asymptotically approaches zero. The region of the curve between points B and C is substantially linear, and within this linear region the diameter can be accurately sensed and controlled. Once the diameter sensor has been adjusted for zero output at the desired nominal diameter, variations in the crystal diameter result in true diameter error signals.

The software according to which the digital computer is programmed to carry out the crystal pulling process in the automatic mode of operation will now be described. The software is comprised of nine functional segments, or subroutines, which are executed under the supervision of a monitor program. In the following description each of the nine segments is functionally described with reference to the flow charts in the drawings.

At each block labeled *DELAY*, a predetermined fixed time delay is incurred. During this time, control is transferred back to the monitor program. After this time has elapsed, control is returned to the program under execution, and execution thereof proceeds from the point of delay.

The first segment, called *ROTOP*, first checks the mode switch on the man-machine interface unit. If the switch is in the auto position, then control is transferred to control state R10. If the switch is not in the auto position, it is in the manual position and the computer will check status switches 1 and 2 and test for these switches to be on. If neither of the status switches is on, then the computer will see if the specification card for the crystal has been loaded. If the crystal specification card has been loaded, then the computer will turn the SPEC light off. If the specification card has not been loaded, it will turn the SPEC light on and go back to the beginning of segment *ROTOP*. If either status light 1 or 2 is on, this is a restart condition, and the specs have already been loaded. The puller operator will have turned one of these MMI status switches on to cause a re-start, after physically observing that the crystal is not being pulled satisfactorily. Program control is transferred back to control state ROTOP and this cycle is repeated until the operator has switched the mode switch to the auto position.

Control state ABORT is entered each time the mode switch goes from the auto position to the manual position. It first terminates all the control algorithms and then checks to see if this is a re-seed. If it is a re-seed, the status 2 switch is on and a re-seed message is sent to the line printer. The operator will have turned the status 2 switch on if in his judgment a re-seed is required, typically when the crystal is of poor quality. If the status 2 switch is not on, then the program looks at the status 1 switch. If this status switch is on it designates a melt-back condition, and program control is directed to control state ROTA. The operator will have turned the status 1 switch on if in his judgment a melt-back is required, typically when the crystal is of poor quality. If the status 1 switch is not on, then a "run terminated" message is sent to the line printer and program control is transferred back to control state ROTOP.

Procedure ROTA first sends a "melt-back" message to the line printer, and then calculates the initial upper and lower limits for crucible position, according to the following equations:

$$XKUL = XKI + 0.066 \qquad 1$$

where XKUL is the upper limit and XKI is the initial crucible position, and $$XKLL = XKI - 0.066 \qquad 2$$

where XKLL is the lower limit. As the bit resolution of the TI-960 process control digital computer is only of typical degree, the use of an exact value for crucible position would be impractical, and hence the crucible position is kept within imposed limits. The constant 0.066 is somewhat arbitrary, but must be kept within the ±0.1 inch tolerance required for accurate diameter sensing.

The computer then checks for the actual crucible position, as input from the crucible height transducer, to be within these calculated limits. If the crucible position is too high, the computer will turn either status light 1 or status light 2 on. If the crucible position is too low, both status 1 and status 2 will be turned on. In response to the condition indicated by these status lights, the operator may adjust the crucible position via the manual control panel, since the system is in the manual mode of operation at this time. When the crucible position is within the limits, both status lights will be turned off, and program control is transferred to control state ROTOP for a re-start. When the operator has grown a new stem, he switches the mode switch to auto and the computer again takes control.

Control state R10 is entered each time the auto-manual switch is placed in the auto position. It first checks to see if this is a re-start or a new run. It does this by looking at the status switches 1 and 2. If either of these switches is on (turned on by operator), it is a re-start condition and a re-start message is sent to the line printer. If neither status 1 or 2 is on, this is a new start and the crystal specification card must be read in. If the specifications have already been loaded, the computer will print out a "DDC take-over" message. If the specifications have not been loaded, it goes back to the beginning of the program segment at control state ROTOP. There is no way that the computer will take control of the puller without the specifications being loaded. After printing the "DDC take-over" message, the computer will monitor the crucible transducer reading and will initialize the crucible position XKI to this reading. This is the variable XKI referenced in Equation 1. It then turns the SPEC light off.

If it is the first time through decision state 270, then the lower limit DIALL for diameter control is initialized to LLINI, which is equal to 0.5 mils per second. The upper limit DIAUL for diameter control is initialized to 2.0 mils per second. Both the lower limit and upper limit are program constants, the value of which is empirically based on operator experience in order to pull a high quality crystal. The initial limits are used only for the first 5 minutes after the computer takes control, at which time new limits are calculated by the profile algorithm. Then all four motors (crystal pull motor, crystal spin motor, crucible lift motor, crucible lift motor, crucible spin motor) are enabled and the set point CLSP for the crucible lift motor is set to zero. The set point PRSP for the pull motor (the motor which lifts the crystal from the melt) is initialized to VCTOP, which is an empirically derived program constant equal to 0.7 mils per second. The initial average pull-rate set point PRSPA is initialized to PRSPI, the value of which is input on the crystal specification card. PRSPI is typically equal to about 1 mil per second for a 2 inch diameter crystal.

If it is not the first time through decision state 272, then program control is directed to control state RCHEK, since the preceding initialization procedures need not be repeated. If it is the first time through decision state 272, two memory locations in the computer are initialized. Memory locations (i.e., program variables) IRNMI and IRMIN are initialized to the present value of variable DIERR, which is the present reading of the diameter sensor. After a 0.5 second time delay, the mode switch is checked to be sure that it is still in the auto position. If the switch is in the auto position, then program control goes to control state R10A. If the switch is in the manual position, then program control goes to control state ABORT.

If it is not the first time through decision state 272, program control goes to control state RC10. The program then checks the signal from the diameter sensor to see if the present crystal diameter sensor reading DIERR is less than a minimum IRMIN. Referring to FIG. 11, the program is looking for point A on the diameter sensor error transfer curve. If the output (absolute value) from the diameter sensor is less than the minimum, then the minimum value is reset to the present diameter sensor reading. Then the program calculates the slope of the diameter error signal, setting it equal to the present reading DIERR of the diameter sensor minus the last reading IRNM1 of the diameter sensor. Then the last value IRNM1 is reset to be equal to the present value of DIERR. The slope is checked to ensure that it is greater than or equal to the noise level, which in this system is a program constant of 0.05. If it is not greater than or equal to the noise level, then program control is transferred to R20A. If it is greater than or equal to the noise level, then the program checks to see if the diameter sensor reading is greater than or equal to 75 percent of the minimum *IRMIN*. At this time the computer is looking for point B on the curve of FIG. 11, which is equal to three-fourths (empirically determined) the absolute value of point A. If point B has not yet been reached, program control is directed to control state R20A. As soon as the diameter sensor reading reaches point B, control state ROLL is entered. Thus, the roll procedure is begun slightly before the crystal reaches the desired nominal diameter.

The ROLL procedure first checks to see if the mode switch is in the auto position. If this switch is in the manual position, then the pulling process is aborted. If this is not the first time through decision state 274, program control goes to control state ROLL 1. If it is the first time through, the initialization procedure for ROLL is executed. The pull-rate set point PRSP is set equal to the ROLL pull-rate *VCR*, which is an empirically derived program constant equal to 1.9 mils per second. Then melt level control is enabled and 1.9 mils per second is output as a set point to the pull-rate motor controller. IRNM1 is initialized to the actual reading of the diameter sensor, *DIERR*. Then program control is returned to the monitor program for 10 seconds. After 10 seconds, control goes back to control state ROLL. This will be the second time through, and thus program control is transferred to ROLL 1.

The ROLL 1 procedure traces the curve in FIG. 11 from point B to point C. As soon as point C is reached, program control goes into the normal procedure NORML.

ROLL 1 calculates a slope which is equal to the present signal *DIERR* from the diameter sensor minus the previous reading *IRNM1*. The crucible lift set point *CLSP* is initialized to 0.4 inches per hour (empirically derived) to start lifting the crucible at that rate. Then the program checks to see if point C has been reached, by checking to see if the slope is greater than program constant TURN, which is equal to an empirically determined program constant of 0.125. If the slope is less than TURN, then point C has been reached and the NORML procedure is entered. If the slope is still greater than TURN, the pull-rate set point is increased by 10 percent. This newly calculated pull-rate set point must be less than the maximum *PRUL* that can be sent to the motor. The value of *PRUL* in this system is 5.0 mils per second, but is determined by the limitations of the hardware interface via the D/A converter. If it is less than the maximum, control returns to control state ROLL 3. If the calculated pull-rate set point is greater than this maximum, then the pull-rate set point is set equal to the maximum *PRUL* and then program control is transferred to ROLL 3.

NORML initializes the diameter integral error summation *DIAER* used in the diameter control algorithm *DTRCL* (subsequently described) to the initial average pull-rate set point *PRSPA*, which is input on the specification card. It then enables the diameter control and profile algorithms and begins checking for proper operation of the crucible lift motor by checking the integrity of the crucible lift tachometer reading. Every 0.5 seconds the mode switch is monitored to ensure that it is still in the auto position. If it is in the manual position, the crystal pulling process aborts. The program also monitors the STAT3 switch. If the STAT3 switch is on (turned on by operator), this means that the puller operator wants to taper the crystal. Melt level, diameter, and temperature control are then disabled. The pull-rate set point *PRSP* is set equal to the initial pull-rate set point *PRSPI*, as input on the specification card. The crucible lift set point *CLSP*, which determines how fast the crucible is lifted, is set equal to zero to stop the crucible lift motor. The cycle of checking the STAT3 switch and mode switch is repeated once each 0.5 seconds during the NORML procedure, i.e., while the uniform diameter crystal is being pulled under computer control.

Segment two, called *NUPR*, is the profile algorithm 83 of FIG. 3. It first checks for the mode switch to be in the auto position. If it is in the auto position, it checks to see if it is now growing the top portion of the crystal, which is indicated by a software flag set by *ROTOP*. If not, program control goes to control state NU12. If it is, then the program initializes the *RF* level set point *RFLSP* to be equal to the reading RF from the RF sensor times a constant *KP1*. This empirical program constant, equal to 0.9, accounts for the difference between the manual and automatic RF controllers. It also initializes the *RF* error summation *ERRRF* (used in TEMCL) to be equal to the reading from the *RF* sensor times *RFCVF*, which is an empirical program constant equal to 0.45. It also enables the temperature control algorithm. This sequence of events is only performed once while the crystal is being grown. Then the program initializes the set point *MTSSP* of the temperature control algorithm to the present output *MTS* of the temperature sensor digital filter to grow the top of the crystal. Control state *TTOP* is then entered and temperature is decreased by 3 percent every 5 minutes. After growing the top is completed, as indicated by a software flag set by *ROTOP*, program control is transferred to NU12. First it ensures that *NUPR* is enabled. If it is enabled, then the program determines if this is the first time through this loop. If it is the first time through, after a 10 minute delay the temperature error summation *NURRS* is initialized to MTSSP and initial crystal seed length *XCI* is set equal to the output *XCN* from the crystal length transducer. Then program control is transferred back to *NUPR*. If it is not the first time through, it checks to see if the average pull rate is within limits. The upper limit *VCUL* is 2.0 mils/sec and the lower limit *VCLL* is 0.5 mils/sec. If pull rate is within these limits, then program control is transferred to N60. If it is high, then the average pull-rate is set equal to the high limit. If it is too low, then it is set equal to the lower limit. Starting at control state N60, a new upper limit *DIAUL* and lower limit *DIALL* for diameter control are calculated. The equations used to calculate the upper and lower limit for diameter control are as follows:

$$DIAUL = VCN (1 + KR) \qquad 3$$

where *DIAUL* is the upper limit, *VCN* is the calculated average pull rate set point and *KR* is an empirically derived fixed constant of 0.6, and $$DIALL = VCN (1 - KR) \qquad 4$$

where *DIALL* is the lower limit. Then the calculated upper and lower limits are compared against *VCUL* and *VCLL*, respectively. If the diameter lower limit is less than *VCLL*, then the diameter lower limit *DIALL* is reset to be equal to *VCLL*. If it is greater than its upper limit, *DIAUL* is set equal to *VCUL*. Then a new set point for temperature control is calculated according to the following equation:

$$NURRS = NURRS + (VCN - PRSPA)(KII) \qquad 5$$

where *PRSPA* is the initial average pull rate set point input on the crystal specification card and *KII* is an empirically derived constant of 0.03. Then new temperature set point *NURRS* is checked against its empirical limits *MTSLL* = 2.0 and *MTSUL* = 5.0. If either the lower or the upper limit is violated, then *NURRS* is reset to either the lower or upper limit, whichever is violated. The set point *MTSSP* to the temperature control algorithm is then set equal to *NURRS*.

The next function of *NUPR* is to decrease the average pull rate set point *PRSPA* given in the specification card after the crystal has grown to a fixed length, referred to herein as breakpoint, which is also specified in the specification card. Dependent on dopant type and concentration, it may be necessary to pull the crystal at a progressively slower rate in order to maintain an acceptable longitudinal resistivity. Variable *TEM1* is set equal to the actual crystal length *XCN* minus the initial crystal length *XCI*. If *TEM1* is less than the crystal breakpoint, a parameter specified in the specification card, then variable *VOUT* is set equal to *PRSPI* and the average pull rate set point *PRSPA* is set to *VOUT*, then program control is transferred to *NUPRA* after a 1 minute time delay. If *TEM1* is greater than or equal to the crystal breakpoint, a new average pull-rate set point is calculated according to the following equation:

$$VOUT = PRSPI - KS (XCN - XCB) \qquad 6$$

where *KS* is a constant input on the specification card, *XCN* is the present crystal transducer reading, and *XCB* is the crystal length breakpoint from the specification card. The average pull rate set point *PRSPA* is then set equal to variable *VOUT*. After the new average pull rate set point is calculated, a 1 minute time delay is incurred. Program control is transferred back to the monitor program and *NUPR* is executed again at the end of the minute.

The third segment, called *DTRCL*, is the diameter control algorithm 82. Its function is to calculate a new set point for the pull motor, using proportional-integral-derivative (PID) control. *DTRCL* is executed every ten seconds. The first thing it does is to see if it is time to check the motors, as indicated by a software flag set by *ROTOP* when the motors are enabled. If it is time to check the motors, it will set a software flag to tell segment PRATE to begin checking the motors. It then calculates the integral control parameter as follows:

$$DIAER = DIAER + KID (DIERR) \qquad 7$$

where *DIAER* is the integral control parameter, *DIERR* is the output of the diameter sensor averaging filter *IFLTR* (subsequently described) and *KID* is an empirically derived program constant of 1/256. Then the integral value is checked against limits *DIALL* and *DIAUL* calculated by segment *NUPR*, and, if either is violated, *DIAER* is set equal to the limit which is violated. Next, it calculates the proportional control parameter as given by:

$$DPRPE = KPT (DIERR) \qquad 8$$

where *DPRPE* is the proportional control parameter and *KPD* is an empirical constant of 0.125. Then it calculates the derivative control as given by:

$$DDERR = KDD (DIERR - DIERL) \qquad 9$$

where *DDERR* is the derivative control parameter, *DIERL* is the previous value of *DIERR* and *KDD* is an empirical constant of 2.1. A new pull rate set point is calculated as follows:

$$SAVE2 = DIAER + DPRPE + 2(DDERR) \qquad 10$$

The new pull rate set point *SAVE2* is checked against limits *DIAUL* and *DIALL*, and variable *PRSPN* is set equal to a violated limit. If it is within limits, then *PRSPN* is set equal to *SAVE2*. If the diameter control algorithm is enabled (by *NORML* of *ROTOP*), then the set point *PRSP* for the pull motor is reset to *PRSPN*. The program then checks to see if the motors are enabled (by R10 of *ROTOP*). If they are enabled, the MOTORS light on the man-machine interface unit is turned on, the motors are started in the forward direction and the respective set points are sent to the four motor controllers. Control is then transferred back to the beginning of *DTRCL*.

The fourth segment, called *PRATE*, is principally a diagnostic segment. It examines all the signals coming into the computer and detects failures in the hardware interface. After a one second time delay, it checks the condition of a software flag (set by *PRATE*) to see if the motors and the *RF* generator are operating properly. If they are, the computer turns on the *STALL* light on the *MMI* unit to indicate to the operator that motors and generator are functioning properly. If one of the motors or the *RF* generator is not functioning properly, then the STALL light is turned off and the relays are tripped to transfer control to the manual control panel. It then reads the crystal transducer and computes a three sample average *XCN*. As the three readings of crystal length are taken close together in time, the average of the three readings is essentially the present crystal length. Due to system noise problems it is necessary to use the filtered average reading in order to assure a reading of sufficient integrity. It then performs another three element average filter on the signal *XKS* from the crucible transducer and sets it equal to *XCS*. Similarly, *XCS* is essentially the actual crucible position. It then reads the pull motor tachometer and stores this reading in memory location PR. It then reads the seed spin tachometer and stores it in SS. Then the computer reads the crucible lift tachometer and stores this reading in memory location CL. It does the same thing for the crucible spin tachometer and stores the reading in memory location CS. It then reads the RF sensor and stores its reading in memory location RF. The computer then decides whether to check the motors, as indicated by the condition of a software flag set by DTRCL. If it is not time to check the motors, program control is transferred back to control state PRATE. If it is time to check the motors, then the values stored in memory locations PR, SS, CL and CS are checked to be sure they are greater than or equal to a hexadecimal value 20. If any one of them is not greater than or equal to 20 hex, then the respective motor is not functioning properly and program control is transferred to DIAG1. If all the motors are functioning properly, then a software flag is set to indicate that all the motors are functioning properly. After program control state CHKE4, the RF sensor reading is checked to be sure that it is greater than or equal to 20 hex. If it is less than 20 hex, then the temperature control loop is not functioning properly and program control is transferred to DIAG5. If the RF is functioning properly, a software flag is set to indicate that the RF is functioning properly. Then program control is transferred back to PRATE, which is executed once every second. After control state DIAG1, the computer checks a software flag to determine if a motor is already malfunctioning. If a motor is not already in error, then a "motor failure" message is sent to the line printer and a software flag is then set to indicate that there is a motor problem. If a motor is already in error, then program control is transferred to CHKE4, since the motor failure message need not be repeated. At control state CHKE7, the number of the puller at which a motor is malfunctioning is sent to the line printer. Program control is then transferred back to PRATE. At control state DIAG5 the computer checks the condition of a software flag to determine if the RF generator is already in error. If it is already in error, program control is transferred to control state PRATE. If the RF generator was not previously in error, then a "lost RF power" message is sent to the line printer and a software flag is set to indicate an RF failure. Program control is then transferred to control state CHKE7.

The fifth segment, AVGVC, performs a 20 element running average filter (sum of last 20 readings divided by 20) on the pull rate set point PRSP to calculate a new average pull rate VCN, which is used by segment NUPR. AVGVC is executed at the same rate (once each 10 seconds) as DTRCL, the diameter control algorithm. At program control state A57 the computer will check both the STAT3 switch and the mode switch. If the STAT3 switch is on, this means that the operator wants to taper the crystal and the computer begins to increase the set point to the RF controller by 5 percent every 5 minutes. When tapering the crystal is completed and the operator has returned the mode switch to the manual position, program control is transferred back to the beginning of segment AVGVC.

The sixth segment, called KLUDG, performs a 20 element infinite average filter (i.e., average of the averages) on the melt temperature sensor reading MTSS. The filter output is stored in memory location MTS. KLUDG is executed once every half second.

The seventh segment, called IFLTR, performs a 20 element infinite average filter on the diameter sensor signal IRS. It output is stored in memory location DIERR. IFLTR is also executed every 0.5 seconds.

The eighth segment, called TEMCL, is the temperature control algorithm. TEMCL is divided into two parts — RF control and temperature control. RF control is enabled when the computer initially takes control of the crystal. Its function is to calculate an ititial value for the temperature error summation to be used in temperature control. An error is obtained by subtracting the present RF sensor reading RF from RFLSP, which has been calculated by NUPR. If this error falls within a dead-band of ±0.1 for three consecutive sampling periods (6 seconds total), then the error value is satisfactory and RF control is terminated and temperature control is enabled. If the error does not fall within the dead-band, program control is directed to control state A65. A new RF set point ERRRF is calculated as follows:

$$ERRRF = ERRRF + KIRF \ (ERROR) \qquad 11$$

where KIRF is 0.5, an empirical program constant. This set point is output to the RF controller, variable KNT is initialized to zero and program control returns to TEMCL.

The temperature control loop starts at control state TOOA. The control loop, which uses PID control, is executed once every 45 seconds. The integral control parameter is calculated as follows:

$$TERRS = (MTSSP - MTS) \ (KIT) + TERRS \qquad 12$$

where TERRS is the integral control parameter, MTSSP is the set point to the temperature control algorithm (calculated by NUPR), MTS is the output of the temperature sensor averaging filter KLUDG, and KIT is 0.03, an empirical program constant. The calculated integral control parameter TERRS is compared to upper limit $RFUL = 3.0$ and lower limit $RFLL = 0.85$, and is set equal to whichever, if either, it violated. Equation 13 shows how the proportional control is calculated and equation 14 shows how the derivative control is calculated.

$$TPRPE = KPT \ (MTSSP - MTS) \qquad 13$$

where TPRPE is the proportional control parameter and KPT is 0.03, an empirical constant.

$$TDERR = KDT \ (TERRP - TERRL) \qquad 14$$

where TDERR is the derivative control parameter, KDT is an empirical constant of 1.7, TERRP is the valve of $(MTSSP - MTS)$ and TERRL is the previous value of $(MTSSP - MTS)$. The error summation SAVE1 is the sum of the proportional, integral and derivative parameters, as follows:

$$SAVE1 = TERRS + TPRPE + TDERR \qquad \text{equation 15}$$

Error summation SAVE1 is then compared to upper limit $RFUL = 3.0$ and lower limit $RFLL = 0.85$, and variable RFSPN is set to whichever, if either, is violated. If the limits are not violated, then RFSPN is set equal to *SAVE*1. The set point *RFSP* is then set equal to *RFSPN*. If the temperature control loop is enable, then *RFSP*, the new *RF* set point, is output of the *RF* controller. If temperature control is not enabled, program control is transferred back to the beginning of *TEMCL*.

The ninth segment, called *MELTL*, is the melt level control algorithm. The program first initializes a variable *KF* to the first value *K*1 in an 11 element array. The hexadecimal values stored in this array are as follows: 0.523; 0.53B; 0.552; 0.576; 0.58D; 0.5A0; 0.600; 0.6A0; 0.700; 0.A00, and 0.C00. Each value stored in array *KF* is a crucible lift velocity calculated as follows:

$$V_k = \rho_s/4\rho_e; \; (D^2/[R^2 - \Delta x^2]) \; V_c$$

(16)

where $V_k$ is the crucible lift rate, $\rho_s$ the density of solid silicon, $\rho_e$ is the density of liquid silcon, $D$ is the normal diameter of the crystal, $R$ is the radius of the crucible, $\Delta x$ is the total distance the crucible has moved and $V_c$ is the crystal pull rate.

If melt level is not enabled, the program control is transferred back to control state *MELTL*. If melt level control is enabled, then the program calculates a diameter square *DSQK*1, which is equal to the square of the diameter *DIAM* specified in the specification card. Then a variable *H*, equal to the initial crucible position *XKI* plus constant *XKC* = 0.632 inch, is calculated. Program control is then transferred to control state *MELT*1. At *MELT*1, a new set point *CLSP* for the crucible motor is calculated as follows:

$$CLSP = KF \; (DSQK1) \; VCN.$$

(17)

The crucible lift set point is then compared to the maximum hexadecimal value 3FFF which can be output to the crucible lift motor controller. If it is greater, then it is set equal to the maximum. If melt level control is enabled, then program control is transferred to the beginning of the segment *MELT*1. At control state *MELT*2, 5 minutes' delay is incurred. Then the program compares the present crucible position *XCS* to the previously calculated variable *H*. If it is less, the control goes to *MELT*1. If the crucible position is greater than or equal to *H*, a new *H*, is calculated by incrementing the past value of *H* by constant *DXK*, which is 0.32 inches. Then variable *KF* is set to the next value in the array and program control is transferred to control state *MELT*1.

A complete listing of the hereinbefore described softward procedures in TI-960 assembly language comprises TABLE II. As the assembly language for the TI-960 computer is substantially identical to the assembly language of the II-2540, those who are unfamiliar with the TI-960 assembly language may find it helpful to refer to copending application Ser. No. 134,387, filed Apr. 16, 1971, entitled "Segmented Asynchronous Operation of an Automated Assembly Line" by Claude D. Head, III, and assigned to the asignee of this invention, in which the TI-2540 assembly language is described.

FEP ASSEMBLY    PROCEDURE FOR CONSTANT DIAMETER-CRYSTAL PULLER                                    TIME 14.17.39

```
HLOC      INSTRUCTION  LINE   ERR  SOURCE TEXT 0010      7080047B     0041                 MELT0     JUMP  MELT1
0012      7080042?     0042                 T00A      JUMP  T00A
          0043                               *
          0044                               * THE FOLLOWING SEGMENT ROLLS THE TOP
0014      14050004     0045                             MOVM  FLAGS-1,FLAGS-2
0016      1438C000     0046                             DELY1 T6                    DELAY .1 SEC.
0018      70240000     0047                             DELY2
001A      84001840     0048                 ROTOP       TJME  1(1),ROTX             ARE WE GOING TO CALIBRATE MOTORS
001C      3830C814     0049                             SJNE  DDC(1),ROTOP-2        AND RE, YES
001E      8840207?     0050                             OUTDE MOTOR(2),C43
0020      4401FFF8     0051                             I     1,=-5
0022      80005004     0052                 LOOP        OUTDE DOCT(12),FLAGS-2
0024      0CC10022     0053                             ADD   7,=12
0026      22048018     0054                             ARR   1,1,LOOP
0028      1C0487FE     0055                             AMI   FLAGS-2,/001E
002A      7080030     0056                              COMPV FLAGS-2,/07FF         THRU
002C      7080036     0057                              JUMP  *+4                   NO
002E      14828C00     0058                             JUMP  ROTOP                 YES
0030      70840000     0059                             DELY1 TROL                  DELAY 10 SECONDS
0032      7080C01A     0060                             DELY2
0034      70840000     0061                             JUMP  ROTOP
0036      14828C00     0062                 ROTOP       DELY1 TROL
0038      70840000     0063                             DELY2
003A      80091000     0064                             SET   1(0)
003C      88420060     0065                             OUTDE MOTOR(2),ZERDA
003E      7080001E     0066                             JUMP  ROTOP
          0067                               *
0040      20300006     0068                 ROTX        SJNE  DDC(OFF),R10          DDC ON
0042      20310016     0069                             SJNE  STA1(0),ROTOP         MELT-BACK ?
0044      30320016     0070                             SJNE  STA2(0),ROTOP         RE-SEED ?
0046      84000846     0071                             TJME  0(1),ROT1             SPECS BEEN LOADED
0048      24410000     0072                             TURN  SPEC1(OFF)            YES
004A      7080C016     0073                             JUMP  ROTOP
004C      24410000     0074                 ROT1        TURN  SPEC1(1)              NO, TURN SPEC LOAD LIGHT ON
004E      7080001E     0075                             JUMP  ROTOP
0050      14660016     0076                 ARCOT       MOVM  ZERDA,FLAGS           TERMINATE
0052      88010000     0077                             SET   16(0)
0054      88018000     0078                             SET   27(0)                 ALL
0056      8801E000     0079                             SET   31(0)                 CONTROL
```

```
FEP ASSEMBLY     PROCEDURE FOR CONSTANT DIAMETER-CRYSTAL PULLER                        TIME 14.17.39

HLOC   INSTRUCTION  LINE  ERR  SOURCE TEXT 0058   08485060     0080              OUTPE  MOTOR(5),ZEROA        ALGORITHMS
005A   14690008     0081              MOVM   ZEROA,FLAGS+2         DIAMETER
005C   14690008     0082              MOVM   ZEROA,FLAGS+3         PRATE
005E   14690008     0083              MOVM   ZEROA,FLAGS+5         TEMPERATURE
0060   14080606     0084              MOVM   ZEROA,(6,3)
0062   00965000     0085              SET    111(0)                MELT LEVEL
0064   20720965     0086              SJMF   STA2(1),ABUR          RE-SEED
0066       7480     0087              DC     /7480                 SEND MESSAGE
0067       0002     0088              DC     MS000                 SAYING SO
0068       1502     0089              DC     /1502
0069   74000000     0090              SEND
006B       00FE     0091              DC     MSG6
006C   70800016     0092              JUMP   ROTOP                 TERMINATE MELT-LEVEL CONTROL
006E   20310078     0093   ABUR       SJMF   STA1(0),ROTA          M ELT-BACK
0070       7480     0094              DC     /7480                 NO
0071       00C2     0095              DC     MS000                 TERMINATION
0072       0502     0096              DC     /0502                 SEND
0073   74000000     0097              SEND                         MESSAGE
0075       00C5     0098              DC     MSG6
0076   70800016     0099              JUMP   ROTOP
0078       7480     0100   ROTA       DC     /7480                 MELT-BACK
0079       00C2     0101              DC     MS000                 MESSAGE
007A       0502     0102              DC     /0502
007B   74000000     0103              SEND
007D       00C6     0104              DC     MSG6
007E   44410000     0105              LOAD   1,XKT
0080   4C010100     0106              ADD    1,=/0100              CALCULATE UPPER
0082   4AC10075     0107              STOR   1,XKUL                AND LOWER LIMIT
0084   4A010200     0108              SUBT   1,=/0200              FOR INITIAL
0086   4AC10075     0109              STOR   1,XKLL                CRUCIBLE POSITION
0088   14080000     0110   MELTB      DELYI  T6
008A   70040000     0111              DELY2                        DELAY 0.5 SECONDS
008C   18400076     0112              CWTI   XCS,XKLL              WAIT UNTIL
008E   70A00067     0113              JUMP   M1                    CRUCIBLE IS AT
0090   70A00067     0114              JUMP   M2                    CORRECT HEIGHT
0092   08402066     0115              OUTBE  STAT1(2),ZEROA        TURN OFF STATUS LIGHTS
0094   70800016     0116              JUMP   ROTOP
0095   08422077     0117   M1         OUTBE  STAT1(2),CH3          TOO LOW, ROTH
0098   70800088     0118              JUMP   MELTB                 LIGHTS ON
```

FEP ASSEMBLY    PROCEDURE FOR CONSTANT DIAMETER-CRYSTAL PULLER                                   TIME 14.17.39

HI OC    INSTRUCTION LINE   ERR  SOURCE TEXT

| | | | | | | |
|---|---|---|---|---|---|---|
| 02CA | 00422076 | 0119 | | | OUTPF | STAT1(2),CH2 | TOO HI, ONE |
| 02CC | 70840088 | 0120 | | | JUMP | MFLTR | LIGHT ON |
| 02CD | 00310004 | 0121 | | P10 | SJNE | STA1(0),R10AA | IS IT A FRESH-START |
| 02D0 | 30320004 | 0122 | | | SJNE | STA2(0),R10AA | NO |
| 02D2 | 86700016 | 0123 | | | TJMF | 0(1),RCTOP | YES |
| 02D4 | 14400008 | 0124 | | | MOVM | XFCS,XKT | INITIALIZE CRUC. POSITION |
| 02D6 | 7480 | 0125 | | | DC | /7480 | SEND |
| 02D7 | 00C2 | 0126 | | | DC | MSG00 | DDC TAKEOVER MESSAGE |
| 02D8 | 0A02 | 0127 | | | DC | /0A02 | |
| 02D9 | | 0128 | | | SEND | | |
| 02DA | 74800000 | 0129 | | | DC | MSG6 | |
| 02DC | 00E6 | 0130 | | | TURN | SPECL(OFF) | |
| 02DD | 24420004 | 0131 | | | TJMF | 11(0),RCHEK | FIRST TIME THRU |
| 02DF | | 0132 | | * | | | |
| 02E0 | 64011800 | 0133 | | | TJME | 17(1),P20A | YES |
| 02E2 | 08010000 | 0134 | | | SET | 16(1) | SET GROW TOP FLAG ON |
| 02E3 | 08011000 | 0135 | | | SET | 17(0) | |
| 02E4 | 14500030 | 0136 | | | MOVM | IITNT,DTALL | INIT. LOW AND UPPER |
| 02E6 | 14500038 | 0137 | | | MOVM | IHTNT,DTAUL | LIMITS FOR DTRCL |
| 02E8 | 08024800 | 0138 | | | SET | 42(1) | ENABLE MOTORS |
| 02EA | 14400044 | 0139 | | | MOVM | ZERRA,CLSP | SET CRUC. LIFT TO ZERO |
| 02EC | 14540036 | 0140 | | | MOVM | VCTOP,PRSP | INITIAL PULL RATE = VCTOP |
| 02EE | 14330040 | 0141 | | | MOVM | PRSPT,PRSPA | |
| 02F0 | | 0142 | | * | | | |
| 02F2 | 70380004 | 0143 | | | JUMP | RCHEK | GO TO RANGE-CHECK PROCEDURE |
| 02F3 | 7480 | 0144 | | | DC | /7480 | SEND |
| 02F4 | 00C2 | 0145 | | | DC | MSG00 | |
| 02F5 | 0E02 | 0146 | | | DC | /0E02 | RE-START-REQ'D |
| 02F6 | | 0147 | | | SEND | | MESSAGE |
| 02F7 | 74800000 | 0148 | | | DC | MSG6 | |
| 02F8 | 14250000 | 0149 | | | JUMP | R10A | |
| 02FA | 70040000 | 0150 | | P20A | DELY1 | TRA | |
| 02FD | 20380000 | 0151 | | | DELY2 | | |
| 02FE | 70800050 | 0152 | | | SJNF | DDC(0),R10A | |
| 0300 | | 0153 | | | JUMP | ABORT | |
| 0301 | | 0154 | | * | RCHEK | | |
| 0304 | 64000005 | 0155 | | | TJMF | 11(0),PC10 | FIRST TIME THRU |
| 0306 | 08000800 | 0156 | | | SET | 11(1) | INITIALIZE |
| 0308 | 14380083 | 0157 | | | MOVM | DIERR,TDNM1 | |

FEP ASSEMBLY    PROCEDURE FOR CONSTANT DIAMETER-CRYSTAL PULLER                        TIME 14.17.39

HI LOC   INSTRUCTION LINE   FPR SOURCE TEXT

```
00DA   14389094   0159           MOVM   DIERR,R20A
00DD   70840000   0160           JUMP   R20A
                  0160  *
00DE   10389084   0161   PC10    COMP   DIERR,IRMIN           IRMIN READ.LT.MIN
00E0   14389084   0162           MOVM   DIERR,IRMIN           YES
00E2   70070000   0163           NOP                          NO
00E3   46410038   0164           LOAD   1,DIERR               GET
00E4   52410082   0165           SUBT   1,IRMIN               SLOPE
00E6   4AC1006A   0166           STOR   1,TEM1
                  0167  *
00E8   14389087   0168           MOVM   DIERR,TRNM1
00EA   1C648CC0   0169           COMPV  TEM1,/00C0            IS SLOPE .GT. NOISE LEVEL
00EC   70840000   0170           JUMP   R20A                  NO
00EE   70070000   0171           NOP                          YES
00EF   46410084   0172           LOAD   1,IRMIN               IS DIERR.GT. 2/3 OF IRMIN
00E2   4482DF00   0173           I      2,=/0F00
00E4   74900000   0174           MULT
00E5   4AC1006A   0175           STOR   1,TEM1
00E6   10389087   0176           COMP   DIERR,TEM1
00E8   70840000   0177           JUMP   R20A                  NO
00EF   70070000   0178           NOP                          YES
                  0179  *
                  0180  *
                  0181  *
0100   80380850   0182   ROLL    PROCEDURE
0102   84090118   0183           SJME   DDC(ON),ABORT
0104   14860030   0184           TJNE   9(0),ROLL1
0106   8806FA30   0185           MOVM   VCR,PRSP
0108   88010000   0186           SET    111(1)
010A   14389093   0187           SET    16(0)
010C   08000800   0188           MOVM   DIERR,TRNM1
010E   14389096   0189           SET    9(1)
010E   66640066   0190           MOVM   PRSP,TEM1             FIRST TIME THRU
0110   66640066   0191           MRA    TEM1,4                YES. INITIALIZE PULL RATE
0112   08000866   0192           OUTDE  PRCT1(10),TEM1        ENABLE MELT-LEVEL
0114   14828F00   0193           DELY1  TDDI                  DISABLE TOP GROWTH
0116   70840000   0194           DELY2
0118   70840100   0195           JUMP   ROLL                  OUTPUT VCR TO
011A   46410038   0196           LOAD   1,DIERR               PULL MOTOR
011C   52410087   0197           SUBT   1,TRNM1
                                                              GET
                                                              SLOPE
```

FEP ASSEMBLY    PROCEDURE FOR CONSTANT DIAMETER-CRYSTAL PULLER                                    TIME 14.17.39

```
HLOC    INSTRUCTION LINE  ERR  SOURCE TEXT 011F    4AC10060    0197                   STOR    1,SAVE1              INITIALIZE CRUC LIFT
0120    14990044    0198                   MOVM    VKT,CLSP             SAVE1 = SLOPE
0122    14389082    0199                   MOVM    DIFOR,TRNM1          SLOPE .GT. TURN
0124    10500087    0200                   COMP    SAVE1,TURN           NO
0126    70940136    0201                   JUMP    NORML                YES
0128    70940126    0202                   JUMP    **4                  NO
012A    70940136    0203                   JUMP    NORML                INCREMENT
012C    46410030    0204                   LOAD    1,PPSP               THE PULL PULL
012E    46420080    0205                   LOAD    2,KP5                RATE BY
0130    74000086    0206                   MULT                         FIVE PER-CENT
0132    4AC10030    0207                   STOR    1,PPSD               IS IT .GE. TO MAX
0134    10300061    0208                   COMP    PRSD,PRUL            NO
0136    70940100    0209                   JUMP    POLL3                YES
0138    14610030    0210                   MOVM    PRUL,PPSP
013A    70940100    0211                   JUMP    POLL3
013C    14490034    0212           NCP4    MOVM    PRSPA,PTAEP          PUT AVG PULL RATE SET POINT
013E    88018900    0213                   SFT     31(1)                IN DTA ERROR SUM.
0140    8902F800    0214                   SFT     47(1)                ENABLE PROFILE & DIAM.
0142    89038900    0215                   SFT     56(1)                START CHECKING CRUC MOTOR
0144    20300850    0216           NORMA   SJNE    DDC(DM),ABORT        ARE WE STILL IN AUTO
0146    14998C00    0217                   DFLY1   T6                   YES
0148    70940000    0218                   DFLY2
014A    20330044    0219                   SJNE    STA3(1),NORMA
014C    88065000    0220                   SFT     111(0)               TAPER?
014E    14220030    0221                   MOVM    PPSPT,PRSD           YES, DISABLE MELT LEVEL
0150    8902F000    0222                   SFT     47(0)                DISABLE DIAMETER AND
0152    89075000    0223                   SFT     65(0)                TEMPERATURE CONTROL
0154    14660044    0224                   MOVM    ZEPPA,CLSP           STOP CRUC. LIFT
0156    70940144    0225                   JUMP    NORMA
                    0226           *       CALCULATE INITIAL VALUES FOR MTSSP AND BE INITIALIZATION ALGORITHM
                    0227           *
                    0228           *
0158    14980C00    0229           NUPP    DFLY1   T6
015A    70940000    0230                   DFLY2
015C    44000092    0231                   TJNE    Q(1),NU117-2
015E    20300050    0232                   SJNE    DDC(1),NUPR
0160    46410044    0233                   LOAD    1,RF
0162    46420008    0234                   LOAD    2,KP1                CALCULATE
0164    74000086    0235                   MULT
```

FEP ASSEMBLY    PROCEDURE FOR CONSTANT DIAMETER-CRYSTAL PULLER                                      TIME 14.17.39

| HLOC | INSTRUCTION | LINE | ERR | SOURCE TEXT | | |
|------|-------------|------|-----|-------------|---|---|
| 0166 | 4AC1005C | 0236 | | | STOR | 1,PELSP |
| 0168 | 46410044 | 0237 | | | LOAD | 1,RE |
| 016A | 46420068 | 0238 | | | LOAD | 2,RECVE |
| 016C | 7480009E | 0239 | | | MULT | |
| 016E | 4AC10060 | 0240 | | | STOR | 1,ERRRE |
| 0170 | 14420041 | 0241 | | | MOVM | MTS,MTSSP |
| 0172 | 89348800 | 0242 | | | SET | 74(1) |
| | | 0243 | | | | |
| | | 0244 | | * * TOP GROWTH ALGORITHM | | |
| | | 0245 | | * * | | |
| 0174 | 14C06C00 | 0246 | | TTOP | DELY1 | TNA |
| 0176 | 70040000 | 0247 | | | DELY2 | |
| 0178 | 46410041 | 0248 | | | LOAD | 1,MTSSP |
| 017A | 4482DEEA | 0249 | | | LOAD | 2,=/OFFA |
| 017C | 74800008 | 0250 | | | MULT | |
| 017E | 4AC10041 | 0251 | | | STOR | 1,MTSSP |
| 0180 | 84000174 | 0252 | | | TJNE | 0(0),TTOP |
| 0182 | 85001000 | 0253 | | | SET | 1(1) |
| 0184 | 8400F950 | 0254 | | NUL2 | TJNE | 15(1),NUL2 |
| 0186 | 8400B100 | 0255 | | | TJNE | 11(0),NULL |
| 0188 | 14C06C00 | 0256 | | | DELY1 | TNA |
| 018A | 70040000 | 0257 | | | DELY2 | |
| 018C | 14C06C00 | 0258 | | | DELY1 | |
| 018E | 70040000 | 0259 | | | DELY2 | |
| 0190 | 1441C04F | 0260 | | | MOVM | MTSSP,NURRS |
| 0192 | 1440C0BF | 0261 | | | MOVM | VCN,XCT |
| 0194 | 8A000000 | 0262 | | | SET | 11(1) |
| 0196 | 70340150 | 0263 | | | JUMP | NUPR |
| 0198 | 1835C00E | 0264 | | NUL1 | CWTL | VCN,VCELL |
| 019A | 7040204 | 0265 | | | JUMP | N61 |
| 019C | 7040208 | 0266 | | | JUMP | N62 |
| 019E | 70A0030E | 0267 | | | JUMP | |
| 01A0 | 46410063 | 0268 | | | LOAD | 1,VCN |
| 01A2 | 46420053 | 0269 | | | LOAD | 2,KR |
| 01A4 | 74800068 | 0270 | | | MULT | |
| 01A6 | 4AC1006A | 0271 | | | STOR | 1,TEM1 |
| 01A8 | 4F410035 | 0272 | | | ADD | 1,VCN |
| 01AA | 4AC1003E | 0273 | | | STOR | 1,DIAUL |
| 01AC | 46410063 | 0274 | | | LOAD | 1,VCN |
| 01AE | 5241006A | 0275 | | | SUBT | 1,TEM1 |

CALCULATE
INITIAL VALUE FOR

INITIALIZE F MTS SET-POINT

DECREASE MTS SET POINT
BY 3 PER CENT EVERY
5 MINUTES
TOP GROWTH TERMINATED
YES
PROFILE ENABLED
YES, FIRST TIME THRU
YES, DELAY 10 MINUTES

INITIALIZE MTS EORDR SUM
INITIALIZE INITIAL CRYSTAL
POSITION
IS AVG. PULL RATE WITHIN LIMITS
NO
NO
YES
GET LOW & UPPER
LIMITS
FOR DIAMETER
CONTROL

```
FEP ASSEMBLY     PROCEDURE FOR CONSTANT DIAMETER-CRYSTAL PULLER                    TIME 14.17.39

HLOC  INSTRUCTION  LINE  ERR  SOURCE TEXT

01AF  46C10030    0275              STOR   1,DIALL
0180  10300004    0276              COMP   DIALL,NULL      CHECK LOW LIMITS AGAINST
0181  70A02005    0277              JUMP   N63             ITS LOW LIMIT
0182  70070000    0278              NOP
0183  10350008    0279              COMP   DIAHL,NULL      SAME FOR UPPER LIMITS
0184  7040018E    0280    N104      JUMP   N10
0185  70070000    0281              NOP
0186  70A02210    0282              JUMP   N54
0187                      0283
0188  46410035    0284    N10       LOAD   1,XCN           CALCULATE
0189  52410040    0285              SUBT   1,DRSPA         A NEW
01CA  46420007    0286              LOAD   2,KIT           MTS SET POINT
01CB  74000005    0287              MULT
01CC  46410045    0288              ADD    1,NUPRS
01CD  46410045    0289              STOR   1,NUPRS
01CE  18650001    0290              CWTL   NUPRS,MTSLL
01CF  70A0018E    0291              JUMP   N140
01D0  70A02200    0292              JUMP   N150
01D1  148F0061    0293    N1        MOVM   NUPRS,MTSSP
01D2  46410041    0294              LOAD   1,XCN           CALCULATE
01D3  52400045    0295              SUBT   1,XCT           A NEW AVERAGE PULL
01D4  4C410066    0296              STOP   1,TEM1          RATE
01D5  10A80035    0297              COMP   TEM1,XCR        SET POINT IS GREATER
01D6  70A001F4    0298              JUMP   NUPRA-?         LENGTH IS GREATER
01D7  70070000    0299              NOP                    THAN XCR-BREAK POINT
01D8  46410048    0300              LOAD   1,XCN
01D9  52410035    0301              SUBT   1,XCR
01DA  46420034    0302              LOAD   2,KS
01DB  7400008F    0303              MULT
01DC  4C010060    0304              STOP   1,SAVEI
01DD  46410033    0305              LOAD   1,DRSPT
01DE  52410060    0306              SUBT   1,SAVEI
01DF  4C010071    0307              STOR   1,VOUT
01E0  0A0000FA    0308              TJMP   0(1),NUPRA      IS IT ENABLED
01E1  14710040    0309              MOVM   VOUT,DRSPA      YES
01E2  70A001FA    0310              JUMP   NUPRA
01E3  14330071    0311              MOVM   DRSPT,VOUT
01E4  1408F000    0312    NUPRA     DELY1   TN
01E5  70040000    0313              DELY2
```

FEP ASSEMBLY    PROCEDURE FOR CONSTANT DIAMETER-CRYSTAL PULLER                                    TIME 14.17.39

```
HLOC   INSTRUCTION   LINE   ERR  SOURCE TEXT

01FA   709A015A      0314                 JUMP   NUPPR
01FE   14C1C04F      0315        *
01FE   70990100      0316                 MOVM   MTSIL,NUPPS
0218   70940100      0317        NU60     JUMP   N1
                     0318        *
0200   14C2004F      0319        NU50     MOVM   MTSUL,NUPPS
0202   70940100      0320                 JUMP   N1
0204   14BC003F      0321        N61      MOVM   VCSLL,VCN
0206   14B9003F      0322                 JUMP   N60
0208   70940195      0323        N62      MOVM   VCSUL,VCN
020A   14BC003D      0324                 JUMP   N60
020C   70940186      0325        N63      MOVM   NUHL,DIALL
020E   14B9003F      0326                 JUMP   N10A
0210   14B9003F      0327        N64      MOVM   NUHL,DIAUL
0212   70940186      0328                 JUMP   N10
                     0329        *
                     0330        *   DIAMETER CONTROL ALGORITHM
                     0331        *
0214   14558C00      0332        DTPCL    DELY1  T4                  WAIT 10 SECONDS
0216   70940000      0333                 DELY2
0218   84007A1C      0334                 TJNE   7(1),*+4            IS IT TIME TO
021A   88017800      0335                 SET    23(1)               CHECK MOTORS, YES
                     0336        *
021C   46410039      0337                 LOAD   1,DIERR             GET, TROOS ERROR
021F   46420054      0338                 LOAD   2,KIN               MULTIPLY BY GAIN
0220   74000005      0339                 MULT                       ADD TO SUM
022F   46410033      0340                 ADD    1,DIAER             STORE RESULT IN
0224   46410035      0341                 STOR   1,DIAER             DIAM. ERROR SUMMATION
                     0342        *
0226   18310035      0343                 CWTL   DIAER,DIALL         CHECK FOR LIMITS
0229   7094027F      0344                 JUMP   DIA31
022A   70940282      0345                 JUMP   DIA21
022C   46410036      0346        D1       LOAD   1,DIERR             GET PROPORTIONAL
022F   46420054      0347                 LOAD   2,KPD               CONTROL
0230   74000005      0348                 MULT
0232   46410036      0349                 STOR   1,DDRPF             ADD
0234   46410034      0350                 ADD    1,DIAER             TO ERROR
0236   46410056      0351                 STOR   1,SAVE2             SUM AND STORE IN SAVE2
0238   46410039      0352                 LOAD   1,DIERR             DO DERIVATIVE CONTROL
```

FEP ASSEMBLY    PROCEDURE FOR CONSTANT DIAMETER-CRYSTAL PULLER                         TIME 14.17.39

```
HLOC   INSTRUCTION   LINE   ERR   SOURCE TEXT 0234   52410070      0353          SUBT    1,DIERL
0235   46420057      0354          LOAD    2,KDR
0236   74800086      0355          MULT                        MULTIPLY BY TWO
0240   60010080      0356          SLL     1,1
0242   4AC1006C      0357          STOR    1,DDEPR
0244   4F410066      0358          ADD     1,SAVE2             ADD TO ERROR
0246   4AC10066      0359          STOR    1,SAVE2             AND SAVE
0250   14380070      0360          MOVM    DIERR,DIERI
0252   18650030      0361          CNTL    SAVE2,DIALL         COMPARE SAVE2 W/UPPER & LOWER LIMITS
0254   70800298      0362          JUMP    DIA60
0246   70800296      0363          JUMP    DIA50
0250   1465C051      0365          MOVM    SAVE2,PRSPN
0252   8420EA56      0366          TJNF    15(1),*+4
0254   1651003C      0367          MOVM    DDSDN,PRSP
0256   8420A414      0368          TJNE    10(1),DTPCL
0260   80200800      0369          SET     7(1)
0262   34490800      0370          TURN    MOTOR(1)
0264   34240800      0371          TURN    10(1)
0266   34160800      0372          TURN    22(1)
0270   34220800      0373          TURN    34(1)
0272   342E0800      0374          TURN    46(1)
0274   1436006A      0375          MOVM    SPSP,TEM1
0276   6644006A      0376          MPA     TEM1,4
0300   090C606A      0377          OUTPF   SPCTL(10),TEM1
0302   1440006A      0378          MOVM    CLSP,TEM1
0304   6644006A      0379          MPA     TEM1,4
0306   0910606A      0380          OUTPF   CLCTL(10),TEM1
0310   1442006A      0381          MOVM    CSSP,TEM1
0312   6644006A      0382          MPA     TEM1,4
0314   0824606A      0383          OUTPF   CSCTL(10),TEM1
0316   1430006A      0384          MOVM    PRSP,TEM1
0320   6644006A      0385          MPA     TEM1,4
0322   080A606A      0386          OUTPF   PRCTL(10),TEM1
0324   70800214      0387          JUMP    DTPCL
0326   1438003A      0388          MOVM    DIALL,DIAER
0330   70800220      0389          JUMP    01
0332   143E003A      0390          MOVM    DIAUL,DIAER
0334   70800220      0391          JUMP    01
```

CHANGE PULL-RATE SET POINT
IS DIAMETER ENABLED
YES
ARE MOTORS ENABLED
YES
MOTOR INDICATOR ON
SET

FPWRD BITS ON
ALL MOTORS, & OUTPUT
SET POINTS

FEP ASSEMBLY    PROCEDURE FOR CONSTANT DIAMETER-CRYSTAL PULLER                                TIME 14.17.39

HLOC   INSTRUCTION   LINE   ERR   SOURCE TEXT

| HLOC | INSTRUCTION | LINE | | SOURCE TEXT | | |
|---|---|---|---|---|---|---|
| 0286 | 1435C051 | 0302 | | DIA50 | MOVM DIAIL,PRSON | |
| 0288 | 7080A257 | 0303 | | | JUMP DTRL | |
| 028A | 143D0051 | 0304 | | DIA60 | MOVM DIALL,PRSPN | |
| 028C | 7080A257 | 0305 | | | JUMP DTRL | |
| | | 0306 | | * | | |
| | | 0307 | | * CHECK ALARMS | | |
| 028E | 14608C04 | 0308 | | | MOVM ZERDA,(CLK,3) | |
| 0290 | 14888C00 | 0309 | | DRATE | JUMP T6 | |
| 0292 | 70940000 | 0400 | | DELY1 | | |
| 0294 | 2C305050 | 0401 | | DELY2 | | |
| 0296 | 84202290 | 0402 | | | TAPE DDC(5),STATS | READ STATUS |
| 0298 | 46410008 | 0403 | | | TJNE 32(0),PRATE | DO WE HAVE TEMP. CONTROL |
| 029A | 0C0E0290 | 0404 | | | LOAD 1,ADELG | YES, A/D OK |
| 029C | 8400A244 | 0405 | | | ADR 1,-1,PRATE | |
| 029E | 8400E214 | 0406 | | | TJNE 10(0),PR1 | MOTORS & RE OK |
| 02A0 | 34470000 | 0407 | | | TJNE 14(0),PR1 | |
| 02A2 | 34470000 | 0408 | | | TURN CPRES(1) | YES TURN STALL * ON |
| 02A4 | 20045001 | 0409 | | | TURN CPRES(0) | |
| 02A6 | 1474C06A | 0410 | | PR1 | AMT (CLK,3),1 | |
| 02A8 | 76C00511 | 0411 | | | MOVM CHO,TEMI | READ |
| 02AA | 1464C048 | 0412 | | | SUBR RDADS | SEED-TPANSDUCER |
| 02AC | 1475C06A | 0413 | | | MOVM TEMI,XCN | |
| 02AE | 76C00511 | 0414 | | | MOVM CH1,TEM1 | SAME FOR CRUCIBLE |
| 02B0 | 1432C062 | 0415 | | | SUBR RDADS | TRANSDUCER |
| 02B2 | 1422C0A3 | 0416 | | | MOVM XKS+1,XKS+1+2 | GO THRU |
| 02B4 | 4641C06A | 0417 | | | MOVM XKS,XKS+1 | 3-ELEMENT |
| 02B6 | 44920554 | 0418 | | | LOAD 1,TEM1 | AVERAGE |
| 02B8 | 76C000BF | 0419 | | | 1 2,=/0554 | FILTER |
| 02BA | 4AC10CA2 | 0420 | | | MULT | |
| 02BC | 4E41C0A3 | 0421 | | | STOR 1,XKS | |
| 02BE | 4F41C0A4 | 0422 | | | ADD 1,XKS+1 | |
| 02C0 | 4AC10C46 | 0423 | | | ADD 1,XKS+2 | |
| 02C2 | 1C044014 | 0424 | | | STOR 1,XCS | |
| 02C4 | 70B40200 | 0425 | | | COMPV (CLK,3),20 | |
| 02C6 | 70070000 | 0426 | | | JUMP PRATE | |
| 02C8 | 1460B804 | 0427 | | | NOP | |
| 02CA | 4AC4006F | 0428 | | | MOVM ZERDA,(CLK,3) | |
| 02CC | 46420066 | 0429 | | | STOR 4,SAVE2 | |
| 02CE | 44915FFC | 0430 | | | LOAD 2,SAVE2 | |
| | | | | | 1,=-4 | |

FEP ASSEMBLY   PROCEDURE FOR CONSTANT DIAMETER-CRYSTAL PULLER                              TIME 14.17.39

| HLOC | INSTRUCTION | LINE | ERR | SOURCE TEXT | | |
|---|---|---|---|---|---|---|
| 0200 | 1476506A | 0431 | | LOOP | MOVM | (CH2,2),TEM1 |
| 0202 | 41C1006D | 0432 | | | STOR | 1,SAVE1 |
| 0204 | 76000511 | 0433 | | | SUBR | RDADS |
| 0206 | 46410060 | 0434 | | | LOAD | 1,SAVE1 |
| 0208 | 4640006A | 0435 | | | LOAD | 0,TEM1 |
| 020A | 40C0FFFF | 0436 | | | FOR | 0,=-1 |
| 020C | 4AC0006A | 0437 | | | STOP | 0,TEM1 |
| 020E | 1454884B | 0438 | | | MOVM | TEM1,(DR,2) |
| 0250 | 4CC20001 | 0439 | | | ADD | 2,=1 |
| 02E2 | 00910200 | 0440 | | | ARB | 1,1,LOOP |
| 02E4 | 147A606A | 0441 | | | MOVM | CH6,TEM1 |
| 02E6 | 76000511 | 0442 | | | SUBR | RDADS |
| 02E8 | 146A0044 | 0443 | | | MOVM | TEM1,PF |
| 02EA | 30300A00 | 0444 | | | SJNE | DDC(1),PRATE |
| 02EC | 84907A00 | 0445 | | | TJNE | 7(1),PRATE |
| 02EE | 18420072 | 0446 | | | CWTL | MTS,SLL |
| 02F0 | 70070000 | 0447 | | | NOP | | |
| 02F2 | 70A03350 | 0448 | | | JUMP | DIAG7-2 |
| 02F4 | 88040000 | 0449 | | | SET | 4(0) |
| 02F6 | 18460072 | 0450 | | | CWTL | XCS,SLL |
| 02F8 | 70070000 | 0451 | | | NOP | | |
| 02EA | 70A03350 | 0452 | | | JUMP | DIAG8-2 |
| 02EC | 18480072 | 0453 | | | CWTL | DR,SLL |
| 02EE | 70070000 | 0454 | | | NOP | | |
| 0300 | 70A03350 | 0455 | | | JUMP | DIAG2-2 |
| 0302 | 88000000 | 0456 | | | SET | 0(0) |
| 0304 | 184C0072 | 0457 | | | CWTL | SS,SLL |
| 0306 | 70070000 | 0458 | | | NOP | | |
| 0308 | 89301000 | 0459 | | | JUMP | DIAG3-2 |
| 030A | 88010000 | 0460 | | | SET | 1(0) |
| 030C | 8400881D | 0461 | | | TJNE | 8(1),CHKE3 |
| 030E | 30330319 | 0462 | | | SJNE | STA3(0),CHKE3 |
| 0310 | 18490072 | 0463 | | | CWTL | CL,SLL |
| 0312 | 70070000 | 0464 | | | NOP | | |
| 0314 | 70A0335F | 0465 | | | JUMP | DIAG4-2 |
| 0316 | 88020000 | 0466 | | | SET | 2(0) |
| 0318 | 184F0072 | 0467 | | CHKE3 | CWTL | CS,SLL |
| 031A | 70070000 | 0468 | | | NOP | | |
| 031C | 70A03347 | 0469 | | | JUMP | DIAG6-2 |

Comments:
- LOOP (line 0431)
- DO WE CHECK MOTORS (0444)
- YES, IS MTS OK (0445)
- NO (0448)
- YES (0449)
- CRUCIBLE TRANSDUCE OK (0450)
- NO (0455)
- YES, CHECK PULL-RATE (0456)
- O.K. (0457)
- ERROR (0458)
- CHECK SEED-SPIN (0459)
- O.K. (0462)
- ERROR (0463)
- CRUCIBLE ON TAPER? (0464)
- YES, CHECK IT (0465)
- O.K. (0467)
- ERROR (0468)
- CHECK CRUC. SPIN (0469)
- ERROR

TIME 14.17.39

FEP ASSEMBLY    PROCEDURE FOR CONSTANT DIAMETER-CRYSTAL PULLER

| HLOC | INSTRUCTION | LINE | ERR | SOURCE TEXT | | | |
|------|-------------|------|-----|-------------|---|---|---|
| 031F | 88003000 | 0470 | | | SET | 3(0) | |
| 0320 | 88004000 | 0471 | | | SET | 10(0) | |
| 0321 | 18440072 | 0472 | | CHKF4 | CWTI | RF,SLI | |
| 0322 | 70070000 | 0473 | | | NOP | | |
| 0324 | 7080365 | 0474 | | | JUMP | DIAG5 | O.K. |
| 0326 | 88005000 | 0475 | | | SET | 5(0) | CHECK RF-LEVEL |
| 0328 | 7080290 | 0476 | | | JUMP | PRATE | ERROR |
| 032A | 84004322 | 0477 | | | TJNF | 10(0),CHKF4 | O.K. |
| 032C | 7480 | 0478 | | DIAG3 | DC | /7480 | |
| 032E | 00C2 | 0479 | | | DC | MS000 | SEND |
| 032F | 1602 | 0480 | | | DC | /1602 | SEED-SPIN MOTOR FAIL MESS. |
| 0330 | 88001800 | 0481 | | | SET | 1(1) | |
| 0331 | 7080365 | 0482 | | | JUMP | DIAG5 | |
| 0333 | 84001322 | 0483 | | | TJNF | 10(0),CHKF4 | |
| 0335 | 7480 | 0484 | | DIAG2 | DC | /7480 | PULL MOTOR FAIL MESS. |
| 0337 | 00C2 | 0485 | | | DC | MS000 | |
| 0338 | 0802 | 0486 | | | DC | /0802 | |
| 0339 | 88000800 | 0487 | | | SET | 0(1) | |
| 033A | 7080365 | 0488 | | | JUMP | DIAG1 | |
| 033C | 84001322 | 0489 | | | TJNF | 10(0),CHKF4 | |
| 033E | 7480 | 0490 | | DIAG4 | DC | /7480 | CRUCIBLE LIFT MOTOR FAIL |
| 0340 | 00C2 | 0491 | | | DC | MS000 | |
| 0341 | 1402 | 0492 | | | DC | /1402 | |
| 0342 | 88002800 | 0493 | | | SET | 2(1) | |
| 0343 | 7080365 | 0494 | | | JUMP | DIAG1 | |
| 0345 | 84001322 | 0495 | | | TJNF | 10(0),CHKF4 | |
| 0347 | 7480 | 0496 | | DIAG6 | DC | /7480 | CRUCIBLE SPIN MOTOR FAIL |
| 0349 | 00C2 | 0497 | | | DC | MS000 | |
| 034A | 1402 | 0498 | | | DC | /1402 | |
| 034B | 88003800 | 0499 | | | SET | 3(1) | |
| 034C | 7080235E | 0500 | | | JUMP | DIAG1 | |
| 034E | 84004322 | 0501 | | | TJNF | 10(0),CHKF4 | |
| 0350 | 7480 | 0502 | | DIAG7 | DC | /7480 | MTS FAILURE |
| 0352 | 00C2 | 0503 | | | DC | MS000 | |
| 0354 | 1702 | 0504 | | | DC | /1702 | |
| 0355 | 88004800 | 0505 | | | SET | 4(1) | |
| 0356 | 7080235E | 0506 | | | JUMP | DIAG1 | |
| 0358 | 84004322 | 0507 | | | TJNF | 10(0),CHKF4 | |
| 035A | 7480 | 0508 | | DIAG8 | DC | /7480 | |

FEP ASSEMBLY    PROCEDURE FOR CONSTANT DIAMETER-CRYSTAL PULLER                           TIME 14.17.39

HLOC    INSTRUCTION  LINE  ERR  SOURCE TEXT

| HLOC | INSTRUCTION | LINE | ERR | LABEL | OP | OPERANDS | COMMENT |
|------|-------------|------|-----|-------|-----|---------|---------|
| 035C | 00C2 | 0509 | | | DC | MS000 | |
| 035D | 1802 | 0510 | | | DC | /1802 | |
| 035E | 74000000 | 0511 | | DIAG1 | SEND | MSG6 | |
| 035F | 00FF | 0512 | | | DC | 10(1) | |
| 0360 | 80008800 | 0513 | | | SET | PRATE | |
| 0361 | 70A40200 | 0514 | | | JUMP | D5(0),PRATE | |
| 0363 | 84205200 | 0515 | | DIAG5 | TIME | D5(0),PRATE | ALREADY IN ERROR |
| 0365 | 7480 | 0516 | | | DC | /7480 | CALL MSG00 |
| 0367 | 00C2 | 0517 | | | DC | MS000 | SEND MESS. TO |
| 0368 | 1802 | 0518 | | | DC | /1802 | LINE PRINTER, CRT |
| 0369 | 74000000 | 0519 | | | SEND | MSG6 | |
| 036A | 00FF | 0520 | | | DC | 5(1) | |
| 036B | 88005800 | 0521 | | | SET | PRATE | |
| 036C | 70A40200 | 0522 | | | JUMP | PRATE | |
| 036D | | 0523 | | * | AVERAGE FILTER FOR AVG. PULL-RATE | | |
| 0371 | 14558C00 | 0524 | | AVCYC | DELY1 | T4 | |
| 0373 | 70940000 | 0525 | | | DELY2 | | |
| 0375 | 84208270 | 0526 | | | TIME | 11(0),A21 | THIS SEGMENT CALCULATE |
| 0377 | 88008800 | 0527 | | | SET | 11(1) | AVG. PULL RATE, AND |
| 0378 | 4AC43000 | 0528 | | | STOR | MDR,SAV4 | USES THE CDR AS A |
| 037B | 14540000 | 0529 | | | MOVM | ZERDA,CNTR3 | LIST POINTER |
| 037C | 4AC70001 | 0530 | | | STOR | CDR,SAVD7 | |
| 037E | 46410030 | 0531 | | A21 | LOAD | 1,PPSP | GET SET-POINT |
| 0381 | 44820000 | 0532 | | | L | 2,=/0060 | MULTIPLY BY 0.05 |
| 0383 | 74000080 | 0533 | | | MULT | | |
| 0385 | 4AC10040 | 0534 | | | STOR | 1,TEM1 | |
| 0387 | 46470004 | 0535 | | | LOAD | CDR,SAV4 | |
| 0388 | 14640CC4 | 0536 | | | MOVM | TEM1,(VCNS,7) | STORE IN LIST |
| 038B | 20A08001 | 0537 | | | AMT | SAV4,1 | INCR. POINTERS |
| 038D | 20A08001 | 0538 | | | AMT | CNTR3,1 | |
| 038E | 10208014 | 0539 | | | COMPV | CNTR3,20 | HAVE WE GONE THRU IT |
| 0390 | 70A40307 | 0540 | | | JUMP | A20 | 20 TIMES |
| 0393 | 70070000 | 0541 | | | NOP | | |
| 0395 | 88008000 | 0542 | | | SET | 11(0) | YES |
| 0397 | 14600030 | 0543 | | A20 | MOVM | ZERDA,VCN | GET |
| 0399 | 4482EEEC | 0544 | | | L | 2,=-20 | |
| 039B | 4AC40000 | 0545 | | | STOR | 4,SAVR4 | AVERAGE OF ALL |
| 039D | 46470080 | 0546 | | | LOAD | 7,SAVR4 | 20 ELEMENTS |
| 039F | 14C6C0C4 | 0547 | | | MOVM | (VCNS,CDR),TEM1 | |

TIME 14.17.39

FEP ASSEMBLY    PROCEDURE FOR CONSTANT DIAMETER-CRYSTAL PULLER

| HLOC | INSTRUCTION | LINE | ERR | SOURCE TEXT | | | |
|------|-------------|------|-----|-------------|---|---|---|
| 03A1 | 46410066 | 0548 | | | LOAD | 1,TEM1 | |
| 03A2 | 4F410038 | 0549 | | | ADD | 1,VCN | |
| 03A3 | 44C1003F | 0550 | | | STOR | 1,VCN | RESULT IN VCN |
| 03A4 | 20808001 | 0551 | | | AMT | SAVR4,1 | |
| 03A5 | 0CA10390 | 0552 | | | APR | 2,1,A31 | |
| 03A6 | 46470001 | 0553 | | | LOAD | 7,SAVR7 | |
| 03A7 | 30300871 | 0554 | | | SJNE | DDC(1),AVGVC | |
| 03A8 | 20330871 | 0555 | | | SJNE | STA3(1),AVGVC | TAPER ? |
| 03A9 | 7480 | 0556 | | | DC | /7480 | YES, SEND MESSAGE SAYING SO |
| 03AA | 00C2 | 0557 | | | DC | MSG00 | |
| 03AB | 1202 | 0558 | | | DC | /1202 | |
| 03AC | 74800000 | 0559 | | | SEND | | |
| 03AD | 00F5 | 0560 | | | DC | MSG6 | |
| 03AE | 30300871 | 0561 | A57 | | SJNE | DDC(1),AVGVC | DDC IN AUTO |
| 03AF | 46410043 | 0562 | | | LOAD | 1,DFSP | YES, DECREASE THE RF SET POINT |
| 03B0 | 44A21020 | 0563 | | | L | 2,=/1020 | BY 5 PER CENT EVERY 5 MINUTES |
| 03B1 | 74800006 | 0564 | | | MULT | | |
| 03B2 | 4AC10043 | 0565 | | | STOR | 1,RFSP | |
| 03B3 | 10470061 | 0566 | | | COMP | RFSD,RRUL | |
| 03B4 | 70A03C7 | 0567 | | | JUMP | *+4 | |
| 03B5 | 14610043 | 0568 | | | MOVM | RRUL,RFSP | |
| 03B6 | 14420060 | 0569 | | | MOVM | RFSP,TEM1 | |
| 03B7 | 66440006 | 0570 | | | MOA | TEM1,4 | |
| 03B8 | 0830A106 | 0571 | | | OUTDR | RECTL(10),TEM1 | |
| 03B9 | 14C09C00 | 0572 | | | DELY1 | TNA | |
| 03BA | 70040000 | 0573 | | | DELY2 | | |
| 03BB | 70A03B7 | 0574 | | | JUMP | A57 | |
| | | 0575 | | * * | TEMPERATURE CONTROL ALGORITHM | | |
| 03BC | 14658004 | 0576 | TEMCL | | MOVM | ZEROO,(CIK,3) | |
| 03BD | 145BBC00 | 0577 | | | DELY1 | T3 | |
| 03BE | 70040000 | 0578 | | | DELY2 | | |
| 03BF | 86208812 | 0579 | | | TJNF | IO(1),TODAA | RE-CONTROL ENABLED |
| 03C0 | 20460001 | 0580 | | | AMT | (CIK,3),1 | |
| 03C1 | 1CA4605A | 0581 | | | COMPV | (CIK,3),00 | WHEN COUNT = 00 SEND END TEMPERATURE |
| 03C2 | 708A03FF | 0582 | | | JUMP | TEM | CONTROL MESSAGE |
| 03C3 | 70070000 | 0583 | | | NOP | | |
| 03C4 | 84200303 | 0584 | | | TJNE | O(0),TEMCL-2 | |
| 03C5 | 88000800 | 0585 | | | SET | O(1) | |

FEP ASSEMBLY    PROCEDURE FOR CONSTANT DIAMETER-CRYSTAL PULLER                                TIME 14.17.39

```
HLOC   INSTRUCTION  LINE  ERR  SOURCE TEXT

03E7      7480      0587            DC    /7480
03E8      00C2      0588            DC    MSG6
03E9      1902      0589            DC    /1902
03EA  74800000      0590            SEND
03EC      00F5      0591            DC    MSG6
03ED  70840303      0592            JUMP  TEM1-2
03EF  34400800      0593   TEM      TURN  RFON(1)          RF LIGHT ON AND ENABLE
03F1  34340800      0594            TURN  RFENB(1)         RF CONTROLLER
03F3  46410050      0595            LOAD  1,RFLSP
03F5  52410044      0596            SUBT  1,RE             GET ERROR
03F7  4AC1006A      0597            STOR  1,TEM1
03F9  1864905F      0598            CNTL  TEM1,RFDLL       IS IT WITHIN DEAD-BAND
03FB  70070000      0599            NOP                    NO
03EC  70070000      0600            NOP                    NO
03FD  708A0411      0601            JUMP  A65              YES, HAS IT BEEN WITHIN
03FF  20258001      0602            AMT   KNT,1            THE DEAD-BAND FOR 3
0401  1C258003      0603            COMPV KNT,3            CONSECUTIVE COUNTS, NO
0403  70840305      0604            JUMP  TEM1             YES
0405  70070000      0605            NOP                    YES
0406  14600025      0606            MOVM  ZEROA,KNT        INITIALIZE TEMP. ERROR. SUM
0408  14500045      0607            MOVM  ERROF,TERRS      TERMINATE RF-CONTROL
040A  88C0A000      0608            SET   10(0)            ENABLE TEMP. CONTROL
040C  88C0F800      0609            SET   15(1)
040E  708A0303      0610            JUMP  TEM1-2
0411  46420055      0611   A65      MULT  2,KTRF           MULT. ERROR BY
0413  74800000      0612            NOP
0415  4E410060      0613            ADD   1,ERRRF          ADD & STORE IN
0417  4AC10060      0614            STOR  1,ERRRF          ERROR SUM
0419  46940089      0615            SRA   1,4              OUTPUT TO
041B  4AC1006A      0616            STOR  1,TEM1           RF CONTROLLER
041D  0830A06A      0617            OUTPF RFCTL(10),TEM1
041E  14690025      0618            MOVM  ZEROA,KNT
041F  708A0305      0619            JUMP  TEM1             START TEMP.
0421  1463A000      0620   TOOA     DFLY1 T2               CONTROL
0423  70040000      0621      *     DELY2

0427  46410041      0622            LOAD  1,MTSSP
0429  52410042      0623            SUBT  1,MTS            ERROR
042B  4AC10068      0624            STOR  1,TERRP
042D  46420062      0625            LOAD  2,KIT            MULT. ERROR BY GAIN FACTOR
```

FEP ASSEMBLY     PROCEDURE FOR CONSTANT DIAMETER-CRYSTAL PULLER                                TIME 14.17.39

HLOC   INSTRUCTION   LINE   ERR   SOURCE TEXT

| HLOC | INSTRUCTION | LINE | LABEL | OP | OPERANDS | COMMENT |
|------|-------------|------|-------|-----|----------|---------|
| 0425 | 74900086    | 0626 |       | MULT | 1,TERRS |        |
| 0431 | 46410045    | 0627 |       | ADD  | 1,TERRS | ADD TO ERROR |
| 0433 | 4AC10045    | 0628 |       | STOR | 1,TERRS | SUMATION |
| 0435 | 18459064    | 0629 |       | CWTL | TERRS,RELL |    |
| 0437 | 70A00477    | 0630 |       | JUMP | TE50    | TERRS LESS THAN LOWER LIMIT |
| 0438 | 70A00473    | 0631 |       | JUMP | TE40    | TERRS GREATER THAN UPPER LIMIT |
| 043A | 46410068    | 0632 | T1    | LOAD | 1,TERRP | MULTIPLY ERROR BY PROP. CONST. |
| 043C | 46420066    | 0633 |       | LOAD | 2,KPT   |        |
| 043E | 74900086    | 0634 |       | MULT |         |        |
| 0441 | 4AC10046    | 0635 |       | STOR | 1,TDERR |        |
| 0443 | 46410045    | 0636 |       | ADD  | 1,TERRS | ADD TO ERROR SUMATION |
| 0445 | 4AC10068    | 0637 |       | STOR | 1,SAVE1 | AND SAVE |
| 0447 | 46410068    | 0638 |       | LOAD | 1,SAVE1 |        |
| 0449 | 52410060    | 0639 |       | SURT | 1,TERRP | SUBTRACT PREVIOUS ERROR |
| 044A | 46420067    | 0640 |       | LOAD | 2,KDT   | FROM CURRENT ERROR AND MULTIPLY |
| 044B | 74900085    | 0641 |       | MULT |         | BY DER. CONSTANT |
| 044F | 4AC10047    | 0642 |       | STOR | 1,TDERR |        |
| 0451 | 46410060    | 0643 |       | ADD  | 1,SAVE1 | ADD TO |
| 0453 | 4AC10060    | 0644 |       | STOR | 1,SAVE1 | ERRORS |
| 0455 | 18590065    | 0645 |       | MOVM | TERRP,TERRI |   |
| 0457 | 18690064    | 0646 |       | CWTL | SAVE1,RELL | CHECK FOR LIMITS |
| 0459 | 70A92464    | 0647 |       | JUMP | TE80    |        |
| 045B | 70A0C46B    | 0648 |       | JUMP | TE70    |        |
| 045D | 14509052    | 0649 |       | MOVM | SAVE1,RESPN | GET NEW SET-PT |
| 045F | 04905802    | 0650 | TMC1  | TIME | 15(1),TEMC1-2 | IS TEMP ENABLED |
| 0461 | 14530043    | 0651 |       | MOVM | RESPN,RESP | YES |
| 0463 | 14436064    | 0652 |       | MOVM | RESP,TEM1 |   |
| 0465 | 4644006A    | 0653 |       | MOA  | TEM1,4  |        |
| 0467 | 08306064    | 0654 |       | OUTPE | RECTL(10),TEM1 | OUTPUT NEW SET-POINT |
| 0469 | 70A0A473    | 0655 |       | JUMP | TOOA    | TO RE CONTROLLER |
| 046B | 14650052    | 0656 | TE70  | MOVM | RELL,RESPN |   |
| 046D | 10AC0A55    | 0657 |       | JUMP | TMC1    |        |
| 046F | 14640052    | 0658 | TE80  | MOVM | RELL,RESPN |   |
| 0471 | 70A0A455    | 0659 |       | JUMP | TMC1    |        |
| 0473 | 16650045    | 0660 | TE40  | MOVM | RELL,TERRS |  |
| 0475 | 70810438    | 0661 |       | JUMP | T1      |        |
| 0477 | 16640045    | 0662 | TE50  | MOVM | RELL,TERRS |  |
| 0479 | 70810438    | 0663 |       | JUMP | T1      |        |
| 047C |             | 0664 | *     | MELT LEVEL CONTROL |    |    | rEP ASSEMBLY    PROCEDURE FOR CONSTANT DIAMETER-CRYSTAL PULLER                              TIME 14.17.39

HI.OC  INSTRUCTION  LINE  ERR SOURCE TEXT

```
047F  14888C00    0665         MELT1    DELY1 T6
047D  70040000    0666                  DELY2
047E  14000085    0667                  MOVM  K1,KF           INITIALIZE FUDGE FACTOR
0480  44C4000F    0668                  STOR  4,SAVEK         AND POINTER
0481  8400F810    0669                  TJNE  15(1),MELTD     ENABLED BY POLL PROCEDURE
0483  46410032    0670                  LOAD  1,DIAM          CALCULATE
0487  46420032    0671                  LOAD  2,DIAM          DIAMETER-SQUARE
0487  74800005    0672                  MULT
0489  44C10000    0673                  STOR  1,DSQK1         SAVE
048A  46410000    0674                  LOAD  1,XK1           GET
048B  4E410000    0675                  ADD   1,XKC           INITIAL
048C  4AC10008    0676                  STOR  1,H             HEIGHT "H"
048D  70804AF     0677                  JUMP  MELT1
048E  14A1FC00    0678                  MOFL
048F  70040000    0679         MELT2    DELY2
0490  10400000    0680                  COMP  XCS,H           NEW POS .GE. H
0491  708A04AR    0681                  JUMP  MELT1           NO
0492  70070000    0682                  NOP                   YES.
0493  46410008    0683                  LOAD  1,H             CALCULATE NEW "H"
0494  4E410000    0684                  ADD   1,DXK
0495  4AC10000    0685                  STOR  1,H
0496  20CF0001    0686                  AMT   SAVEK,1         INCREMENT POINTER
0497  46420005    0687                  LOAD  2,SAVEK         GET NEW
0498  14005AF     0688                  MOVM  (K1,2),KF       FUDGE FACTOR
0499  46410008    0689                  LOAD  1,KF            CALCULATE
049A  46420000    0690                  LOAD  2,DSQK1         NEW SET-POINT
049B  74800005    0691                  MULT
049C  44C10000    0692                  STOR  1,CLSP          CRUCIBLE LIFT
049D  10440061    0693                  COMP  CLSP,PPUL
049E  70A04AD     0694                  JUMP  MELT3
049F  14A1C00A    0695                  MOVM  PPUL,CLSP
04A0  8400F810    0696         MELT3    TJNE  15(1),MELTD     CHECK FOR UPPER
04A8  70A04AF     0697                  JUMP  MELT2           LIMIT
04AC                           *
04B0                           *        AVERAGE FILTER FOR TEM CONTROL,25 ELEMENTS, USES CBB
      0701                     *        FOR POINTER, SIMILAR TO AVGVC
04B1  14988C00    0703         KLUDG    DELY1 T6
```

FEP ASSEMBLY    PROCEDURE FOR CONSTANT DIAMETER-CRYSTAL PULLER       TIME 14.17.39

| HLOC | INSTRUCTION | LINE | ERR | SOURCE TEXT | | |
|---|---|---|---|---|---|---|
| 04C3 | 70040000 | 0704 | | | DELY2 | |
| 04C5 | 84008000 | 0705 | | | TJMF | 11(0),K214 |
| 04C7 | 88008800 | 0706 | | | SET | 11(1) |
| 04C9 | 4AC40080 | 0707 | | | STOR | MDR,SVR4 |
| 04CB | 14600080 | 0708 | | | MOVM | ZERCA,CNTR1 |
| 04CD | 147D006A | 0709 | | K21 | MOVM | CH10,TEM1 |
| 04CF | 76000511 | 0710 | | | SURR | RDADS |
| 04D1 | 4AC70081 | 0711 | | | STOR | 7,SAVR7 |
| 04D3 | 4641006A | 0712 | | | LOAD | 1,TFM1 |
| 04D5 | 44920004 | 0713 | | | L | 2,=/0044 |
| 04D7 | 74800085 | 0714 | | | MULT | |
| 04D9 | 4AC1006A | 0715 | | | STOR | 1,TEM1 |
| 04DB | 46470080 | 0716 | | | LOAD | 7,SVR4 |
| 04DD | 146ACCDC | 0717 | | | MOVM | TEM1,(MTSS,7) |
| 04DF | 14600042 | 0718 | | | MOVM | ZERCA,MTS |
| 04E1 | 4AC40080 | 0719 | | | STOR | 4,SAVR4 |
| 04E3 | 4432EFE7 | 0720 | | | L | 2,=-25 |
| | | 0721 | | * | | |
| 04E5 | 46470080 | 0722 | | K31 | LOAD | 7,SAVR4 |
| 04E7 | 14DFE06A | 0723 | | | MOVM | (MTSS,CRR),TEM1 |
| 04E9 | 4641006A | 0724 | | | LOAD | 1,TFM1 |
| 04EB | 4541004? | 0725 | | | ADD | 1,MTS |
| 04ED | 4AC10042 | 0726 | | | STOR | 1,MTS |
| 04EF | 20808001 | 0727 | | | AWT | SAVR4,1 |
| 04F1 | 0CA10455 | 0728 | | | ARB | 2,1,K31 |
| 04F3 | 46470081 | 0729 | | | LOAD | 7,SAVP7 |
| 04F5 | 4641004? | 0730 | | | LOAD | 1,MTS |
| 04F7 | 44920004 | 0731 | | | L | 2,=/0044 |
| 04F9 | 74800085 | 0732 | | | MULT | |
| 04FB | 4AC1006A | 0733 | | | STOR | 1,TEM1 |
| 04FD | 46470080 | 0734 | | | LOAD | 7,SVR4 |
| 04FF | 146ACCDC | 0735 | | | MOVM | TEM1,(MTSS,7) |
| 0501 | 20808001 | 0736 | | | AWT | SVR4,1 |
| 0503 | 20808001 | 0737 | | | AWT | CNTR1,1 |
| 0505 | 1C888010 | 0738 | | | COMPY | CNTP1,25 |
| 0507 | 70800505 | 0739 | | | JUMP | *+6 |
| 0509 | 00000000 | 0740 | | | NOP | |
| 050B | 80700000 | 0741 | | | SFT | 11(0) |
| 050D | 46470081 | 0742 | | | LOAD | CRR,SAVP7 |

MULTIPLY BY 0.04

GET THE AVERAGE
OF ALL THE
AVERAGE

OUTPUT SAVED AT LOCATION MTS

GET AVG.
MULTIPLY BY 0.04

IN ELEMENTS LIST

TEP ASSEMBLY   PROCEDURE FOR CONSTANT DIAMETER-CRYSTAL PULLER                                    TIME 14.17.39

| HLOC | INSTRUCTION | LINE | ERR | SOURCE TEXT | | | |
|------|-------------|------|-----|-------------|---|---|---|
| 050F | 7090A0C1 | 0743 | | | JUMP | KLUDG | SELECT MULTIPLEXER |
| 0511 | 08407068 | 0744 | | | OUTPE | MPX(7),TEM1 | |
| 0513 | 34460800 | 0745 | | RDADS | TURN | PROBE(1) | STROBE ON |
| 0515 | 34460000 | 0746 | | | TURN | PROBE(0) | & OFF |
| 0517 | 44810014 | 0747 | | | L | 1,=20 | SET LOOP COUNTER |
| 0519 | 2040000E | 0748 | | RDAD | SJNE | CONVF(0),RDADA | IS BUSY OFF |
| 051B | 14690008 | 0749 | | | MOVM | ZEROA,ADFLG | YES, ZERO FLAG |
| 051D | 2640006A | 0750 | | | INDE | ATOD(12),TEM1 | AND READ |
| 051F | 6244006A | 0751 | | | MLL | TEM1,4 | POSITION 0 POINT |
| 0521 | 72820002 | 0752 | | | RETRN | | |
| 0523 | 0E9F0510 | 0753 | | RDAD1 | AD3 | 1,-1,RDAD | DECR. LOOP |
| 0525 | 1CD88000 | 0754 | | | COMPV | ADFLG,0 | IS FAIL FLAG = 1 |
| 0527 | 70070000 | 0755 | | | NOP | | NO |
| 0529 | 72820002 | 0756 | | | RETRN | | |
| 052B | 14750008 | 0757 | | | MOVM | CH1,ADFLG | ERROR, SET ERR. FLAG |
| 052D | 4C00006E | 0758 | | | STOR | 0,TEM2 | |
| 052F | 7480 | 0759 | | | DC | /7480 | CALL MSG00 |
| 0530 | 0002 | 0760 | | | DC | MSG00 | TO SEND |
| 0531 | 1102 | 0761 | | | DC | /1102 | MESS. TO |
| 0532 | 74300000 | 0762 | | | SEND | | |
| 0534 | 0005 | 0763 | | | DC | MSG6 | |
| 0535 | 4640006E | 0764 | | | LOAD | 0,TEM2 | |
| 0537 | 72820002 | 0765 | | | RETRN | | |
| | | 0766 | | * | | | |
| | | 0767 | | * | | | |
| 0538 | | 0768 | | FELTR | 18000 FILTER (AVERAGE FILTER, 20 ELEMENTS, USES | | |
| | | 0769 | | | CR8 AS POINTER). | | |
| 0539 | 14000000 | 0770 | | | DELY1 | T6 | |
| 053B | 70040000 | 0771 | | | DELY2 | | |
| 053D | 04008004 | 0772 | | | TINE | 11(0),121A | |
| 053F | 88208800 | 0773 | | | SFT | 11(1) | |
| 0541 | 4C64008A | 0774 | | | STOR | MDR,SVR5 | |
| 0543 | 14690008 | 0775 | | | MOVM | ZEROA,CNTR2 | |
| 0545 | 147B006A | 0776 | | 121 | MOVM | CH9,TEM1 | |
| 0547 | 76D00511 | 0777 | | | SUBR | RDADS | |
| 0549 | 4AC70081 | 0778 | | | STOR | CR8,CSAVR7 | |
| 054B | 4641006A | 0779 | | | LOAD | 1,TEM1 | |
| 054D | 44820008 | 0780 | | | L | 2,=/00C0 | |
| 054F | 74900000 | 0781 | | | MULT | | MULTIPLY BY 0.05 |
| 0551 | 4AC1006A | | | | STOR | 1,TEM1 | |

TIME 14.17.39

FEP ASSEMBLY    PROCEDURE FOR CONSTANT DIAMETER-CRYSTAL PULLER

HLOC  INSTRUCTION LINE  FOR SOURCE TEXT

```
0553  46470084  0782              LOAD   CRR,SAVR5
0555  1464C04E  0783              MOVM   TEM1,(IRS,7)
0557  20848001  0784              ANT    SAVR5,1
0558  2089A001  0785              ANT    CNTR2,1
055A  1C8C0014  0786              CCMDV  CNTR2,20
055C  2084A563  0787              JUMP   *+6
055E  00000000  0788              NOP
055F  88300000  0789              SET    11(0)
0561  1466003B  078A              MOVM   ZERDA,DIERR
0563  44C40088  078B              STOR   MOR,SAVR4
0565  4487FFCC  078C              1      2,-20                  TAKE AVERAGE OF
0567                                                            20 READINGS
0568  4647008C  078D              LOAD   CRR,SAVR4
056A  1465E04A  078E              MOVM   (IRS,CRR),TEM1
056C  4641005A  078F              LOAD   1,TEM1
056E  4E410038  0790              ADD    1,DIERR
0570  4AC10038  0791              STOP   1,DIERR                OUTPUT SAVED AT DIERR
0571  20800001  0792              AMT    SAVR4,1
0573  0CA10566  0793              ADR    2,1,131
0575  46470001  0794              LOAD   CRR,SAVR7
0577  709A0538  0795              JUMP   TFLTR
0579            0796              MDATA
       0797                       MDUMY  6
0003   0798   FLAGS    BSS   0
0004   0799   CMSG     BSS   6
0005  4307    079A   SMA      DC    /4307
0006  0A0D    079B   SMR      DC    /0A0D
0007  2020    079C   SPECS    DC    /2020
0008   079D   DIAM     BSS   32
0009   079E   PPSET    DC    0                                  SPEC CARD
000A   079F   XC       DC    0                                  DIAMETR
000B   07A0   XCR      DC    0                                  INITIAL AVERAGE DIAM
000C   07A1   SPSP     DC    0                                  PULL RATE SLOPE
000D   07A2   CSSP     DC    0                                  CRYSTAL BREAK POINT
000E   07A3   DIERR    DC    0                                  SEED SPIN SET POINT
000F   07A4   PPSP     DC    0                                  CRUC SPIN SET POINT
0010   07A5   DPSP     DC    1                                  CURRENT IRODS READING
0011   07A6   DIAM     BSS   1                                  PULL RATE SET POINT
0012   07A7   DPRR     DC    0                                  DIAMETER ERROR SUM.
0013   07A8   DPDR     DC    0                                  DIAMETER PROP. CONTROL
0020  01E0   07A9   DTAL     DC    /01E0                        DIAMETER DERIVATIVE CONTROL
                                                                DIAMETER LOWER LIM.
```

FEP ASSEMBLY    PROCEDURE FOR CONSTANT DIAMETER-CRYSTAL PULLER                           TIME 14.17.39

| HLOC | INSTRUCTION | LINE | ERR | SOURCE | TEXT | | |
|---|---|---|---|---|---|---|---|
| 0034 | 0360 | 0021 | | DIAUL | DC | /0360 | DIAM UPPER LIMIT |
| 0035 | 0000 | 0022 | | VCN | DC | 0 | FILTR OUT- VC |
| 0036 | 0000 | 0023 | | PRSPA | DC | 0 | PULL RATE AVG SET POINT |
| 0037 | 0000 | 0024 | | MTSSP | DC | 0 | MTS SET POINT |
| 0038 | 0000 | 0025 | | MTS | DC | 0 | OUTPUT FROM TEMPERATURE FILTER |
| 0039 | 0000 | 0026 | | RESP | DC | 0 | RF SET POINT |
| 003A | 0000 | 0027 | | RF | DC | 0 | RF SENSOR READING |
| 003B | 0000 | 0028 | | TFRRS | PSS | 1 | TEMPERATURE ERROR SUM. |
| 003C | 0000 | 0029 | | TPRPF | DC | 0 | TEMPERATURE PROP. CONTROL |
| 003D | 0000 | 0030 | | TPERP | DC | 0 | TEMPERATURE DERR. CONTROL |
| 003E | 0000 | 0031 | | XCN | DC | 0 | SEED TRANSDUCER |
| 003F | 0000 | 0032 | | XCS | DC | 0 | CRICIBLE TRANSDUCER |
| 0040 | 0000 | 0033 | | CLSP | DC | 0 | CRUC LIFT SET POINT |
| 0041 | 0000 | 0034 | | DR | DC | 0 | PULL RATE TACH READING |
| 0042 | 0000 | 0035 | | SC | DC | 0 | SEED SPIN TACH |
| 0043 | 0000 | 0036 | | CL | DC | 0 | CRUC LIFT TACH |
| 0044 | 0000 | 0037 | | CS | DC | 0 | CRUC SPIN TACH |
| 0045 | 0000 | 0038 | | VDPS | DC | 0 | ERROR SUM FOR VC PROFILE |
| 0046 | 0000 | 0039 | | STATS | DC | 0 | STATUS SWITCHES |
| 0047 | 0000 | 0040 | | RESPN | DC | 0 | OUTPUT FROM DIAMETER CONTROL |
| 0048 | 0000 | 0041 | | RESPN | DC | 0 | RFSP FROM VCAVG |
| 0049 | 0400 | 0042 | | KD | DC | /0400 | LIMIT GAIN |
| 004A | 0015 | 0043 | | KID | DC | /0015 | DIAM. GAIN FACTOR INTEGRAL |
| 004B | 00A0 | 0044 | | TA | DC | 160 | SAMPLING PERIOD FOR DIAMETER |
| 004C | 0100 | 0045 | | KPE | DC | /0100 | DIAM. PROP. CONSTANT |
| 004D | 5500 | 0046 | | KDD | DC | /5500 | DERIVATIVE CONSTANT FOR DIA. |
| 004E | 0000 | 0047 | | LIINT | DC | 0 | INITIAL DIA LOW LIM |
| 004F | 0000 | 0048 | | ULINT | DC | 0 | INITIAL DIA UPP LIM |
| 0050 | 0000 | 0049 | | VCTOP | DC | 0 | TOP PULL RATE |
| 0051 | 0004 | 0050 | | T2 | DC | 4 | SAMPLING PERIOD FOR RF |
| 0052 | 0000 | 0051 | | RFLSP | DC | 0 | RF LEVEL SET PT |
| 0053 | 0000 | 0052 | | RFDLL | DC | 0 | RF DEAD BAND LOW LIM |
| 0054 | 0000 | 0053 | | RFDUL | DC | 0 | RF DEAD BAND UPPER LIMIT |
| 0055 | 0000 | 0054 | | KIRE | DC | 0 | RF INT GAIN |
| 0056 | 0000 | 0055 | | ERRRF | DC | 0 | RF ERROR SUM |
| 0057 | 3FFF | 0056 | | PRUL | DC | /3FFF | PULL RATE DAC UPPER LIMIT |
| 0058 | 0020 | 0057 | | KIT | DC | /0020 | TEMPERATURE GAIN FACTOR INTEGRAL |
| 0059 | 04B0 | 0058 | | T3 | DC | 1200 | SAMPLING PERIOD FOR TEMPERATURE |
| 005A | 0000 | 0059 | | RFLL | DC | 0 | RF LOW LIMIT |

FEP ASSEMBLY    PROCEDURE FOR CONSTANT DIAMETER-CRYSTAL PULLER                                TIME 14.17.39

HLOC    INSTRUCTION    LINE    ERR    SOURCE TEXT

| HLOC | INSTRUCTION | LINE | ERR | SOURCE | | TEXT |
|---|---|---|---|---|---|---|
| 0065 | 7000 | 0060 | | DFUL | DC | /7000  RF D/A MAX. ALLOWABLE VALU |
| 0066 | 0000 | 0061 | | KPT | DC | 0      TEMP. PROP. CONST. |
| 0067 | 0000 | 0062 | | KDT | DC | 0      TEMP. DER. CONST. |
| 0068 | 0800 | 0063 | | RECVF | DC | /0800  RF CONV FACTOR |
| 0069 | 0000 | 0064 | | ZEROA | BSS | 0 |
| 006A | | 0065 | | TEM1 | BSS | 1 |
| 006B | | 0066 | | TERR2 | BSS | 1      TEMPERATURE ERROR -NOW |
| 006C | | 0067 | | TEROL | BSS | 1      TEMPERATURE ERROR-LAST |
| 006D | | 0068 | | SAVE1 | BSS | 1 |
| 006E | | 0069 | | SAVE2 | BSS | 1 |
| 006F | | 0070 | | TEM2 | BSS | 1 |
| 0070 | | 0071 | | QTEPL | BSS | 1      PREVIOUS ERROR FROM TRODS |
| 0071 | 0000 | 0072 | | VOUT | DC | 0      OUTPUT FRM DECREASING AVG PULL RATE |
| 0072 | 0100 | 0073 | | SLL | DC | /0100  SENSOR'S LOW LIMIT |
| 0073 | 7800 | 0074 | | SUL | DC | /7800  SENSOR'S UPPER LIMIT |
| 0074 | 0000 | 0075 | | CH1 | DC | 0      SEED TRANSDUCER |
| 0075 | 0001 | 0076 | | CH2 | DC | 1      CRUCIBLE TRANSDUCER |
| 0076 | 0002 | 0077 | | CH3 | DC | 2      SEED LIFT TACH |
| 0077 | 0003 | 0078 | | CH4 | DC | 3      SEED SPIN TACH |
| 0078 | 0004 | 0079 | | CH5 | DC | 4      CRUCIBLE LIFT TACH |
| 0079 | 0005 | 0080 | | CH6 | DC | 5      CRUCIBLE SPIN TACH |
| 007A | 0006 | 0081 | | CH8 | DC | 6      RF LEVEL |
| 007B | 0009 | 0082 | | CH9 | DC | 9      TRODS |
| 007C | 0008 | 0083 | | CH10 | DC | 10     MELT LEVEL |
| 007D | 0000 | 0084 | | XK10 | DC | 0      MELT TEMP |
| 007E | 0000 | 0085 | | XKIN | DC | 0      LOW LIMIT INIT. CRUC. POS. |
| 007F | 0000 | 0086 | | SAVP4 | DC | 0      HI LIMIT INIT CRUC POS |
| 0080 | 0000 | 0087 | | SAVP7 | DC | 0 |
| 0081 | 0010 | 0088 | | TPGL | DC | 16     ROLL SAMPLING RATE |
| 0082 | 0000 | 0089 | | TRNM1 | DC | 0      TRODS N-1 VALUE |
| 0083 | 0000 | 0090 | | TRMIN | DC | 0      TRODS MIN VALUE |
| 0084 | 0000 | 0091 | | TDA | DC | 0      NOT USED |
| 0085 | 0050 | 0092 | | VCR | DC | 80     POLL PULL RATE |
| 0086 | 0000 | 0093 | | TURN | DC | 0      ROLL TURN CONSTANT |
| 0087 | 0005 | 0094 | | TS | DC | 5      SAMPLING PEROD FOR MTS FILTE |
| 0088 | 0000 | 0095 | | SVP4 | DC | 0 |
| 0089 | 0000 | 0096 | | SVP5 | DC | 0 |
| 008A | 0000 | 0097 | | SVP7 | DC | 0 |
| 008B | 0000 | 0098 | | CNT-1 | DC | 0 |

FEP ASSEMBLY    PROCEDURE FOR CONSTANT DIAMETER-CRYSTAL PULLER                          TIME 14.17.39

HLOC  INSTRUCTION  LINE  ERR  SOURCE TEXT

```
008C  0000  0000              CNT02  DC    0                  CONSTANT
008D  0000  0000              KP5    DC    /0000              H=XKI+XKC
008E  0000  0001              4      DC    0                  FUDGE FACTOR IN USE
008F  0000  0002              KF     DC    0                  MELT LEVEL FUDGE FACTORS
0090        0003              K1     BSS   11                 INIT CRUC POSITION
009B  0000  0004              XKT    DC    0                  CONSTANT = 0.632 INCHES
009C  0000  0005              YKC    DC    0                  NOT USED
009D  0000  0006              VKI    DC    0                  CONSTANT =0.32 INCHES
009E  0000  0007              OXK    DC    0
009F  0000  0008              SAVEK  DC    0
00A0  0000  0009              DSOM1  DC    0                  DIAMETER SQUARE
00A1  0078  0010              MOFL   DC    120                MELT LEVEL SAMPLING PERIOD
00A2        0011              XKS    BSS   3                  CRUCIBLE TRANSDUCER FILTER ELEMENTS
00A5        0012              TPS    BSS   20.                TRODS OUTPUT FILTER ELEMENTS
00B8  0708  0013              TN     DC    1800               SAMPLING PERIOD FOR VC PROFILE
00B9  0000  0014              NULI   DC    0                  LOW LIMIT FOR VC PROFILE
00BA  0000  0015              NUUL   DC    0                  UP LIMIT FOR VC PROFILE
00BB  0000  0016              VCSIL  DC    0                  AVG PULL SUM LO LIM
00BC  0000  0017              VCSUL  DC    0                  AVG PULL SUM UP LIM
00BD  0000  0018              SAVER  DC    0
00BE  0000  0019              XCT    DC    0                  INITIAL SEED TRANSDUCER RDNG
00BF  0BB8  0020              TNA    DC    3000               5 MINUTE DELAY
00C0  0000  0021              MTSLL  DC    0                  MTS LO LIMIT
00C1  0000  0022              MTSUL  DC    0                  MTS UP LIMIT
00C2  0000  0023              KIT    DC    0                  MTS INTEGRAL CONSTANT
00C3        0024              VCNS   BSS   20                 PULL RATE SET POINT FILTER ELEMENTS
00C4  1000  0025              KD1    DC    /1000              CONSTANT
00D8  0000  0026              CNT03  DC    0
00D9  0000  0027              SAV4   DC    0
00DA  0000  0028              ADEIC  DC    0                  =1 IF A/D IN ERROR
00DB        0029              MTSS   BSS   25                 TEMPERATURE FILTER ELEMENTS
00F4  0F02  0030              MCG5   DC    /0F02              SET UP PULLER NUMBER MESSAGE
00F5  2020  0031              MSG6A  DC    /2020
0932                          MSG6B  DMES  # PULLER NO.62#
0940                                 END
```

Figure 47:
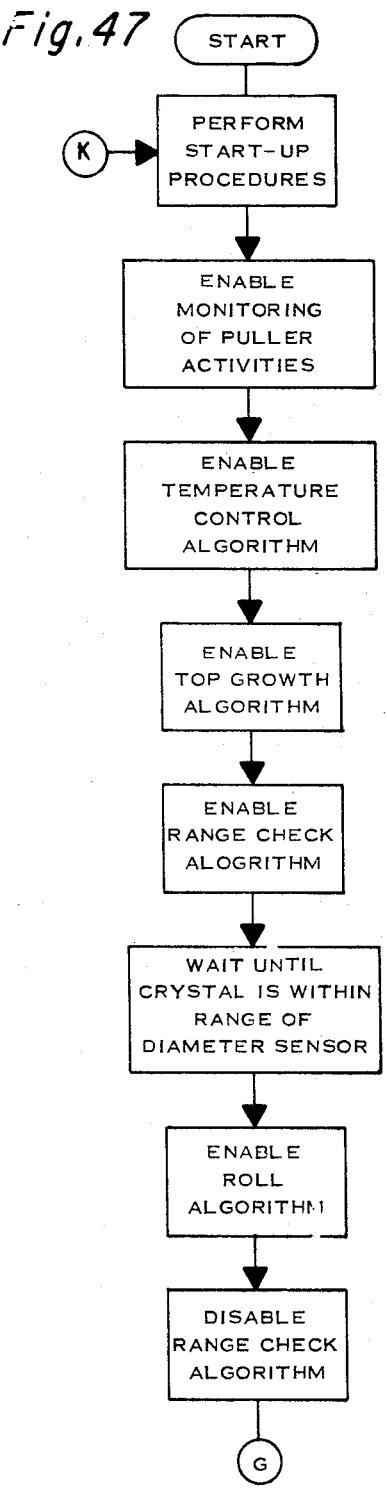
FIGS. 47–49 are flow charts of the sequence in which the algorithms are executed to pull a crystal under computer control.
Figure 48:
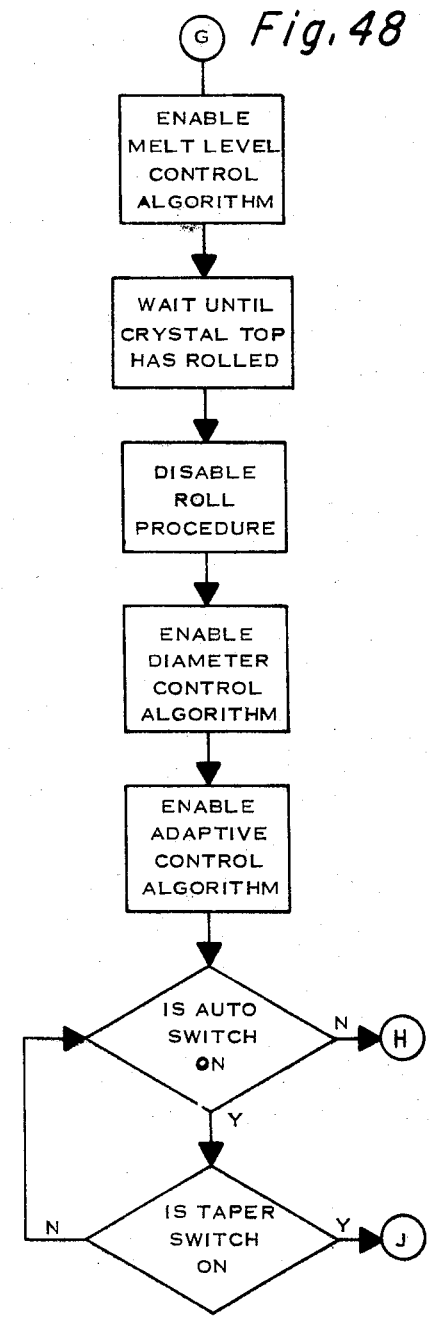
Figure 49:
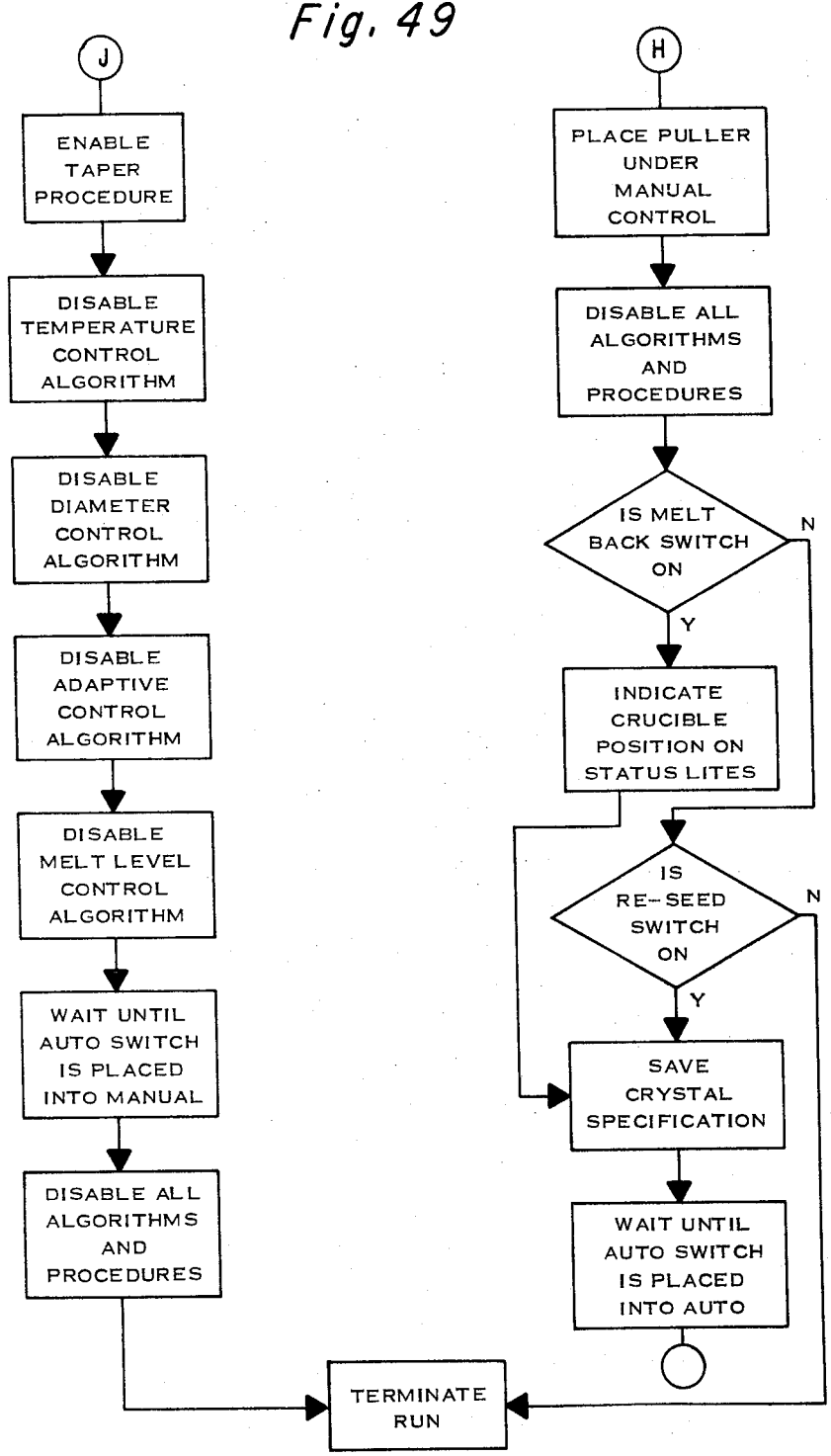

Each of the control algorithms having now been described in detail, the flow charts of FIGS. 47-49 illustrate the normal sequence of execution of the algorithms or portions thereof during the growth of a crystal under computer control. The computer first performs what may be referred to as start up procedures, including such matters as checking to ensure that the crystal specification card has been loaded, checking the position of the mode switch, and initializing various parameters. The computer then checks to ensure that the system is functioning normally, checking such matters as integrity of the motor speeds and integrity of sensor outputs, and if the system is functioning normally, the computer is now enabled to monitor the activities of the crystal puller. The computer then successively enables the temperature control algorithm, the top growth algorithm and the range check algorithm. When the diameter of the crystal is within the range of the diameter sensor, the computer will successively enable the roll algorithm, disable the range check algorithm, and enable the melt level control algorithm. When the top of the crystal has been rolled, the computer then successively disables the roll algorithm, enables the diameter control algorithm and and enables the adaptive control algorithm. The computer next monitors the position of the mode switch. If the mode switch is in auto the computer then monitors the position of the paper switch (STAT3). If the taper switch is not on, the computer again monitors the position of the mode switch. The computer continues to successively monitor the mode switch and STAT3 switch until one or the other has been turned on by the operator. During this period of time the temperature control algorithm, melt level control algorithm, diameter control algorithm and adaptive control algorithm are all enabled, and the crystal puller is pulling a controlled diameter crystal under computer control.

The operator will have placed the mode switch in the manual position if he desires to re-seed, melt-back or terminate the run. When the computer observes that the mode switch is in the manual position, it will then switch control of the crystal puller to the manual control panel and disable all algorithms. The computer now checks to see if the melt-back switch (STAT1) is on. If the melt-back switch is on, the computer will operate status lights 1 and 2 to indicate the crucible position. If the melt-back switch is not on, the computer will check the position of the re-seed switch (STAT2). If the re-seed switch is not on, the computer will terminate the run. If either the melt-back switch or the re-seed switch is on, the computer will save the crystal specification data which has been read in from the crystal specification card. It will then remain idle until the mode switch is once again placed in the auto position, and will then begin anew with the start up procedures.

At the end of the run the operation will place the STAT3 switch on to taper the crystal. When the computer observes that the STAT3 switch is on it will enable the taper procedure and then successively disable the temperature control algorithm, the diameter control algorithm, the adaptive control algorithm and the melt level control algorithm. When tapering of the crsytal has been completed, the operator will place the mode switch in the manual position. When the computer now observes that the mode switch is in the manual position is disables all algorithms and terminates the run.

Orderly execution of the various algorithms and procedures is controlled by the monitor program. The timing of execution is according to the delay blocks previously described in connection with the flow charts, with the monitor program returning program control to the respective algorithms at the end of a fixed time delay. At the end of each such time delay, whether or not the respective algorithm is executed is dependent on the state of a bit in a flag word, with one state of the respective bit indicating that the algorithm is enabled and the other state thereof indicating that the algorithm is not enabled. If an algorithm is currently disabled, the monitor program will again return to this algorithm at the end of the appropriate time delay. The algorithms can be executed only when they have been enabled. As is apparent from previous discussion herein, enabling and disabling of algorithms is performed by various ones of the algorithms and not by the monitor program.

In addition to system timing and sequencing execution of the algorithms, the monitor program is also responsible for interfacing with the peripherals for input-output functions and for system interrupts. These latter mentioned activities are standard operations performed in a conventional manner. Therefore, the description herein includes a complete description of the monitor program in all essential respects.

In a specific embodiment of this invention a single TI-960 process control digital computer simultaneously controls the operations of six Czochralski crystal pullers. Under control of a monitor program the computer orderly controls the six crystal pullers utilizing the algorithms and procedures previously described herein. The monitor program employs the programming technique which is described in detail in application Ser. No. 134,387, filed Apr. 16, 1971, entitled "Segmented Asynchronous Operation of an Automated Assembly Line" by Claude D. Head, III, and assigned to the assignee of this invention (TI-4452). This aspect of the monitor program of this embodiment is in fact substantially identical to the program embodiment disclosed in said application, with the exception that a separate data base is provided for each of the six crystal pullers whereas the program embodiment of application Ser. No. 134,387 utilizes a single data base for a plurality of asynchronously operated machines. The above identified application Ser. No. 134,387 is hereby incorporated by reference.

The following table (TABLE III) is a list of specifications for a typical phosphorous doped silicon crystal of 2.10 inch nominal diameter which may be pulled utilizing the system of this invention:

TABLE III

| Parameter | Specification Value | Units |
|---|---|---|
| charge size | 4000 | grams |
| nominal diameter | 2.10 | inches |
| initial average pull rate | 1.00 | mils/sec |
| break point | 0.0 | inches |
| decrement at breakpoint | 0.0 | mils/sec/inch |
| crystal spin rate | 35.00 | RPM |
| crucible spin rate | 6.00 | RPM |

The initial average pull rate, break point, decrement at break point, crystal spin rate and crucible spin rate are all input on the specification card. The resulting crystal will have a typical resistivity on the order of 3-5 ohm-cm when the dopant concentration is 20 parts phosphorous per billion parts silicon.

The following table (TABLE IV) is a list of specifications for a typical boron doped silicon crystal of 2.10 nominal diameter which may be pulled utilizing the system of this invention.

TABLE IV

| Parameter | Specification Value | Units |
|---|---|---|
| charge size | 4000 | grams |
| nominal diameter | 2.10 | inches |
| initial average pull rate | 0.75 | mils/sec |
| break point | 0.0 | inches |
| decrement at break point | 0.0 | mils/sec/inch |
| crystal spin rate | 6.00 | RPM |
| crucible spin rate | 6.00 | RPM |

The above parameters, with the exceptions of charge size and nominal diameter, are input on the specification card. The resulting crystal will have a typical resistivity on the order of 4–7 ohm-cm when the boron concentration is 38 parts per billion parts silicon.

In the specific embodiment of this invention wherein six crystal pullers are controlled, the operator first must ensure that the mode switch on the MMI unit for the appropriate crystal puller is in the manual position, and then he types an INITn message into either the thermal printer or the CRT, wherein n is the number assigned to the puller. A "READ SPEC CARD" message will then be exhibited on the CRT. The operator then places the crystal specification card in the card reader hopper and presses the START button to read in the specification data. Thereafter the computer is enabled to take control of the crystal puller when the mode switch is placed in the auto position.

It is apparent from the description herein that very little skill and/or training is required on the part of the operator. One relatively unskilled operator can simultaneously supervise the controlled diameter pulling of high quality crystal rods by a plurality of crystal pullers. The crystal pulling system of this invention has been successfully used to grow silicon single crystals having a nominal diameter in excess of 3 inches, to a diameter tolerance of less than ±30 mils.

Although the present invention has been described in detail with reference to specific embodiments thereof, it is anticipated that various modifications within the scope of the invention will now suggest themselves to those skilled in the relevant arts.

I claim:

1. In a system for pulling single crystal ingots of predetermined diameter profile from a melt of material including a crystal puller of the type having heater means, means for pulling the crystal ingot from said melt as said crystal solidifies, means controlling the pull rate of said means for pulling, crystal diameter sensor means, pull rate sensor means, and melt temperature sensor means, the combination comprising:

a. means responsive to change in the output of said crystal diameter sensor means to cause said means controlling the pull rate to change the pull rate of said crystal pulling means; and b. means responsive to said melt temperature sensor, said pull rate sensor, and said crystal diameter sensor to change the power input level to said heater means thereby to adjust said melt temperature and maintain the crystal pull rate within predetermined limits during the growth of said crystal ingots of predetermined diameter profile.

2. The combination defined in claim 1 wherein said last-named means includes means determining the average pull rate of said crystal pulling means and means maintaining the average pull rate at a previously determined value.

* * * * *